(12) United States Patent  
Theriault et al.

(10) Patent No.: US 9,256,009 B2  
(45) Date of Patent: Feb. 9, 2016

(54) TUNABLE ACOUSTIC GRADIENT INDEX OF REFRACTION LENS AND SYSTEM

(71) Applicants: Christian Theriault, Princeton, NJ (US); Craig B. Arnold, Princeton, NJ (US)

(72) Inventors: Christian Theriault, Princeton, NJ (US); Craig B. Arnold, Princeton, NJ (US)

(73) Assignee: TAG OPTICS INC., Princeton, NJ (US)

( * ) Notice: Subject to any disclaimer, the term of this patent is extended or adjusted under 35 U.S.C. 154(b) by 356 days.

(21) Appl. No.: 13/625,285

(22) Filed: Sep. 24, 2012

(65) Prior Publication Data

US 2013/0141782 A1  Jun. 6, 2013

Related U.S. Application Data

(60) Provisional application No. 61/537,802, filed on Sep. 22, 2011.

(51) Int. Cl.
   *G02B 3/14* (2006.01)
   *G02B 21/00* (2006.01)
   *G02B 3/00* (2006.01)
   *G02B 21/02* (2006.01)

(52) U.S. Cl.
   CPC .............. *G02B 3/14* (2013.01); *G02B 3/0087* (2013.01); *G02B 21/00* (2013.01); *G02B 21/025* (2013.01)

(58) Field of Classification Search
   CPC ........ G02B 3/14; G02B 21/00; G02B 3/0087; G02B 21/025
   USPC .......................... 359/368, 305–314, 655, 644
   See application file for complete search history.

(56) References Cited

U.S. PATENT DOCUMENTS 3,399,013 A   *  8/1968  Aas et al. ...................... 359/310
7,724,426 B2  *  5/2010  Yamashita et al. ............ 359/368
2002/0159146 A1 * 10/2002 Leimbach et al. ............. 359/388

OTHER PUBLICATIONS

Nicolas Olivier et al., "Two-photon microscopy with simultaneous standard and extended depth of field using a tunable acoustic gradient-index lens", Optics Letters, vol. 34, No. 11, Jun. 1, 2009.*

* cited by examiner

*Primary Examiner* — Frank Font
(74) *Attorney, Agent, or Firm* — Barnes & Thornburg LLP; Thomas J. McWilliams; Edward F. Behm, Jr.

(57) ABSTRACT

A microscope, comprising a stage onto which is placed an item, a lens having a tunable acoustic gradient index of refraction (TAG lens) sufficiently proximate to said stage to magnify an image of the item, a viewing point for providing for viewing of the magnified image, and a pulsed illuminator capable of illuminating the stage and synchronously pulsed with an operating frequency of the TAG lens.

3 Claims, 30 Drawing Sheets

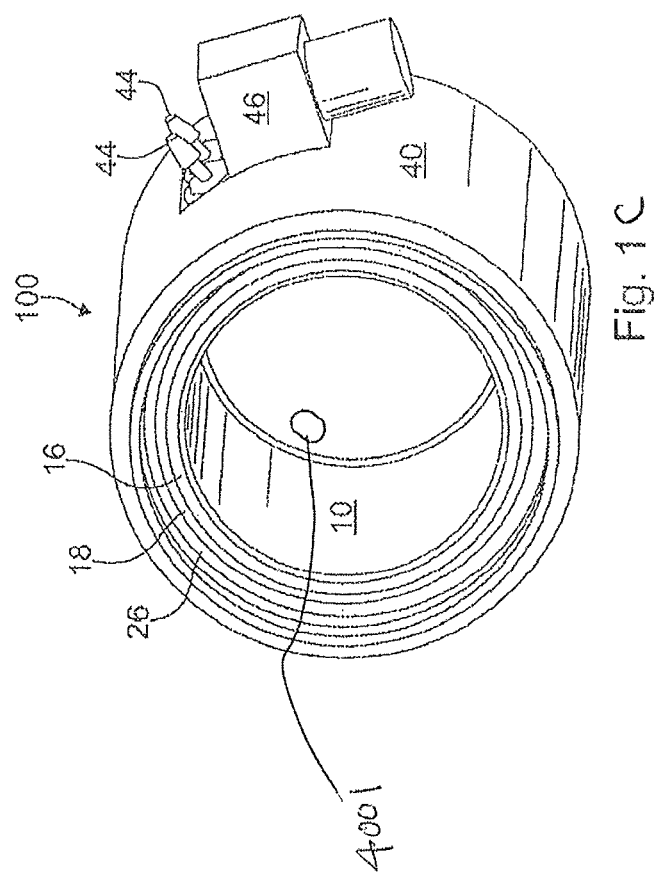

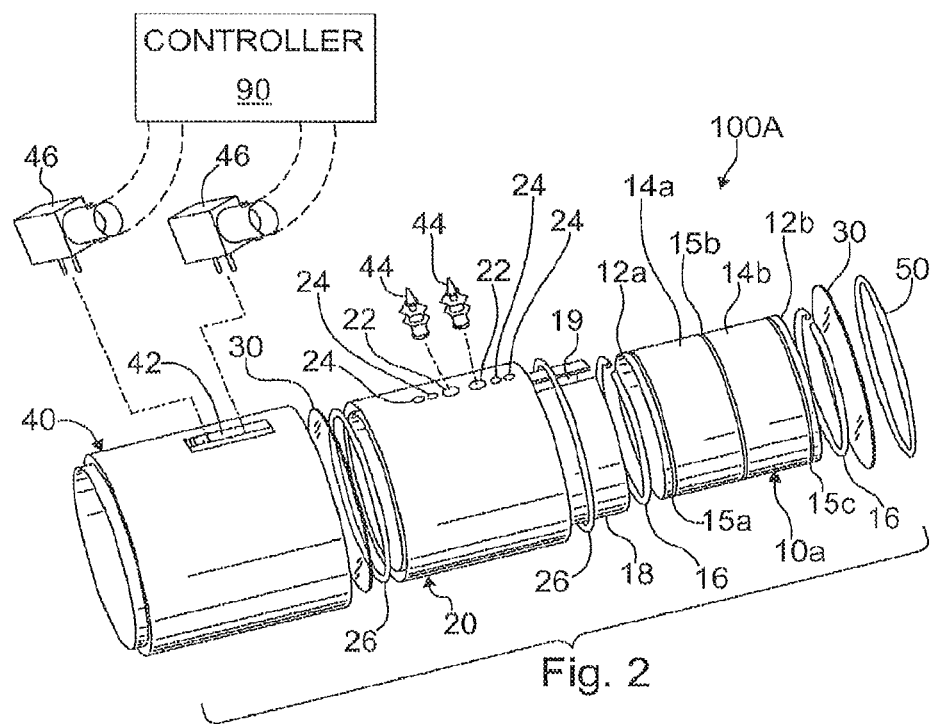

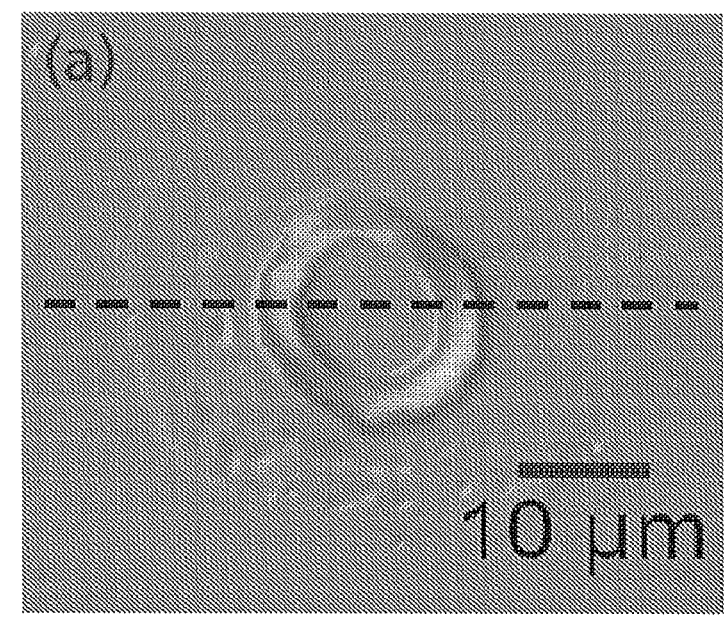
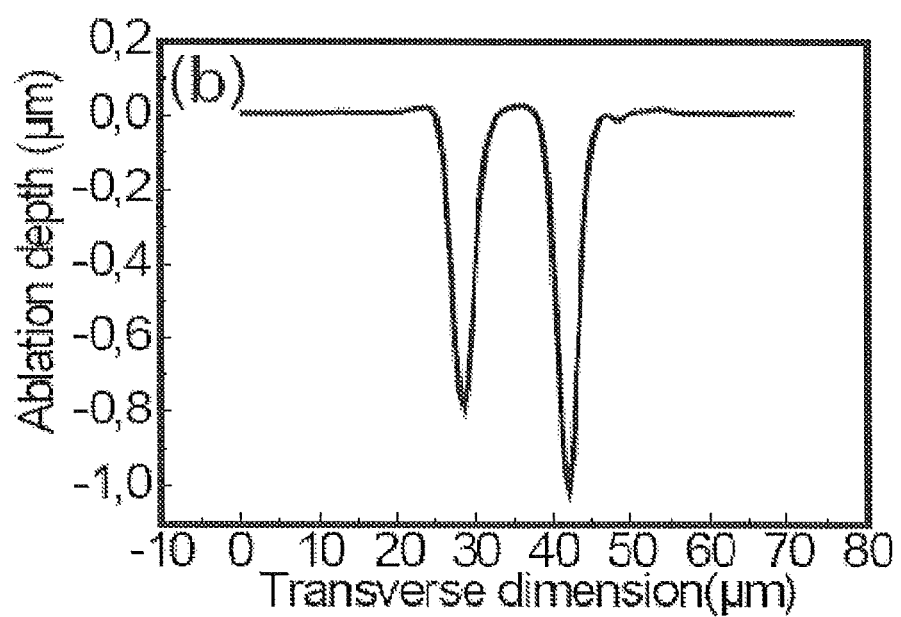
FIG. 31

TUNABLE ACOUSTIC GRADIENT INDEX OF REFRACTION LENS AND SYSTEM

FIELD OF THE INVENTION

The present invention relates generally to a tunable acoustic gradient index of refraction (TAG) lens, and more particularly, but not exclusively, to a TAG lens that is configured to permit dynamic focusing and imaging.

BACKGROUND OF THE INVENTION

When it comes to shaping the intensity patterns, wavefronts of light, or position of an image plane or focus, fixed lenses are convenient, but often the need for frequent reshaping requires adaptive optical elements. Nonetheless, people typically settle for whatever comes out of their laser, be it Gaussian or top hat, and use fixed lenses to produce a beam with the desired characteristics. In laser micromachining, for instance, a microscope objective will provide a sharply focused region of given area that provides sufficient power density to ablate the materials.

However, in a variety of applications, it is useful or even necessary to have feedback between the beam properties of the incident light and the materials processes that are induced. A classical example is using a telescope to image distant objects through the atmosphere. In this case, the motion of the atmosphere causes constant perturbations in the wavefront of the light. One can measure the fluctuations and, using adaptive elements, adjust the wavefront to cancel out these effects. Still other, laboratory-based, imaging applications such as ophthalmologic scanning, confocal microscopy or multiphoton microscopy on living cells or tissue, would benefit greatly from the use of direct feedback to correct for wavefront aberrations induced by the sample under investigation, or to provide rapid scanning through focal planes.

Advanced materials processing applications also require precise beam intensity or wavefront profiles. In these cases, unlike imaging, one is modifying the properties of a material using the laser. For instance, laser forward-transfer techniques such as direct-write printing can deposit complex patterns of materials—such as metal oxides for energy storage or even living cells for tissue engineering—onto substrates. In this technique, a focused laser irradiates and propels a droplet composed of a mixture of a liquid and the material of interest toward a nearby substrate. The shape of the intensity profile of the incident laser plays a critical role in determining the properties of the deposited materials or the health of a transferred cell. In cases such as these, the ability to modify the shape of the incident beam is important, and with the ability to rapidly change the shape, one adds increased functionality by varying the laser-induced changes in a material from one spot to another.

Even traditional laser processes like welding or cutting can benefit from adaptive optical elements. In welding, a continuous-wave laser moves over a surface to create a weld bead between the two materials. Industrial reliability requires uniform weld beads, but slight fluctuations in the laser, the material, or the thermal profile can diminish uniformity. Therefore, with feedback to an adaptive optical element, more consistent and regular features are possible.

Whether the purpose is to process material, or simply to create an image, the applications for adaptive optics are quite varied. Some require continuous-wave light, others need pulsed light, but the unifying requirement of all applications is to have detailed control over the properties of the light, and to be able to change those properties rapidly so that the overall process can be optimized.

Fixed optical elements give great choice in selecting the wavefront properties of a beam of light, but there exist few techniques for modifying the beam temporally. The simplest approach is to mount a lens or a series of lenses on motion control stages. Then one can physically translate the elements to deflect or defocus the beam. For instance, this technique is useful for changing the focus of a beam in order to maintain imaging over a rough surface, or changing the spot size of a focused beam on a surface for laser micromachining. However, this approach suffers from a drawbacks related to large scale motion such as vibrations, repeatability and resolution. Moreover, it can be slow and inconvenient for many industrial applications where high reliability and speed are needed. Nonetheless, for certain applications such as zoom lenses on security cameras, this is a satisfactory technique. Recently, more advanced methods of inducing mechanical changes to lenses involve electric fields or pressure gradients on fluids and liquid crystals to slowly vary the shape of an element, thereby affecting its focal length.

When most people think of adaptive optical elements, they think of two categories, digital micromirror arrays and spatial light modulators. A digital mirror array is an array of small moveable mirrors that can be individually addressed, usually fabricated with conventional MEMS techniques. The category also includes large, single-surface mirrors whose surfaces can be modified with an array of actuators beneath the surface. In either case, by controlling the angle of the reflecting surfaces, these devices modulate the wavefront and shape of light reflected from them. Originally digital mirror arrays had only two positions for each mirror, but newer designs deliver a range of motion and angles.

Spatial light modulators also modify the wavefront of light incident on them, but they typically rely on an addressable array of liquid crystal material whose transmission or phase shift varies with electric field on each pixel.

Both digital mirror arrays and spatial light modulators have broad capabilities for modulating a beam of light and thereby providing adaptive optical control. These are digital technologies and can therefore faithfully reproduce arbitrary computer generated patterns, subject only to the pixilation limitations. These devices have gained widespread use in many commercial imaging and projecting technologies. For instance, digital mirror arrays are commonly used in astronomical applications, and spatial light modulators have made a great impact on projection television and other display technology. On the research front, these devices have enabled a myriad of new experiments relying on a shaped or changeable spatial pattern such as in optical manipulation, or holography.

Although current adaptive optical technologies have been successful in many applications, they suffer from limitations that prevent their use under more extreme conditions. For instance, one of the major limitations of spatial light modulators is the slow switching speed, typically on the order of only 50-100 Hz. Digital mirror arrays can be faster, but their cost can be prohibitive. Also, while these devices are good for small scale applications, larger scale devices require either larger pixels, leading to pixilation errors, or they require an untenable number of pixels to cover the area, decreasing the overall speed and significantly increasing the cost. Finally, these devices tend to have relatively low damage thresholds, making them suitable for imaging applications, but less suitable for high energy/high power laser processing. Accordingly, there is a need the in the field of adaptive optics for

SUMMARY OF THE INVENTION

To overcome some of the aforementioned limitations, the present invention provides an adaptive-optical element termed by the inventors as a "tunable-acoustic-gradient index-of-refraction lens", or simply a "TAG lens." In one exemplary configuration, the present invention provides a tunable acoustic gradient index of refraction lens comprising a casing having a cavity disposed therein for receiving a refractive material capable of changing its refractive index in response to application of an acoustic wave thereto. To permit electrical communication with the interior of the casing, the casing may have an electrical feedthrough port in the casing wall that communicates with the cavity. A piezoelectric element may be provided within the casing in acoustic communication with the cavity for delivering an acoustic wave to the cavity to alter the refractive index of the refractive material. In the case where the refractive material is a fluid, the casing may include a fluid port in the casing wall in fluid communication with the cavity to permit introduction of a refractive fluid into the cavity. Additionally, the casing may comprise an outer casing having a chamber disposed therein and an inner casing disposed within the chamber of the outer casing, with the cavity disposed within the inner casing and with the piezoelectric element is disposed within the cavity.

In one exemplary configuration the piezoelectric element may comprise a cylindrical piezoelectric tube for receiving the refractive material therein. The piezoelectric tube may include an inner cylindrical surface and an outer cylindrical surface. An inner electrode may be disposed on the inner cylindrical surface, and the inner electrode may be wrapped from the inner cylindrical surface to the outer cylindrical surface to provide an annular electric contact region for the inner electrode on the outer cylindrical surface. In another exemplary configuration, the piezoelectric element may comprise a first and a second planar piezoelectric element. The first and second planar piezoelectric elements may be disposed orthogonal to one another in an orientation for providing the cavity with a rectangular cross-sectional shape.

The casing may comprise an optically transparent window disposed at opposing ends of the casing. At least one of the windows may include a curved surface and may have optical power. One or more of the windows may also operate as a filter or diffracting element or may be partially mirrored.

In another of its aspects, the present invention provides a tunable acoustic gradient index of refraction optical system. The optical system may include a tunable acoustic gradient index of refraction lens and at least one of a source of electromagnetic radiation and a detector of electromagnetic radiation. A controller may be provided in electrical communication with the tunable acoustic gradient index of refraction lens and at least one of the source and the detector. The controller may be configured to provide a driving signal to control the index of refraction of the lens. The controller may also be configured to provide a synchronizing signal to time at least one of the emission of electromagnetic radiation from the source or the detection of electromagnetic radiation by the detector relative to the electrical signal controlling the lens. In so doing, the controller is able to specify that the source irradiates the lens (or detector detects the lens output) when a desired refractive index distribution is present within the lens. In this regard, the source may include a shutter electrically connected to the controller (or detector) for receiving the synchronizing signal to time the emission of radiation from the source (or detector).

The controller may be configured to provide a driving signal that causes the focal length of the lens to vary with time to produce a lens with a plurality of focal lengths. In addition, the controller may be configured to provide a synchronizing signal to time at least one of the emission of electromagnetic radiation from the source or the detection of electromagnetic radiation by the detector to coincide with a specific focal length of the lens. In another exemplary configuration, the controller may be configured to provide a driving signal that causes the lens to operate as at least one of a converging lens and a diverging lens. Likewise the controller may be configured to provide a driving signal that causes the lens to operate to produce a Bessel beam output or a multiscale Bessel beam output. Still further, the controller may be configured to provide a driving signal that causes the optical output of the lens to vary with time to produce an output that comprises a spot at one instance in time and an annular ring at another instance in time. In such a case, the controller may be configured to provide a synchronizing signal to time at least one of the emission of electromagnetic radiation from the source or the detection of electromagnetic radiation by the detector to coincide with either the spot or the annular ring output from the lens. As a further example, the controller may be configured to provide a driving signal that causes the optical output of the lens to vary with time to produce an output that comprises a phase mask or an array of spots. To facilitate the latter, the lens may comprise a rectangular or square cross-sectional shape.

As a still further exemplary configuration the controller may be configured to provide a driving signal that creates a substantially parabolic refractive index distribution, where the refractive index in the lens varies as the square of the radius of the lens. The substantially parabolic refractive index distribution may exist substantially over the clear aperture of the lens or a portion of the aperture. In turn, the source of electromagnetic radiation may emit a beam of electromagnetic radiation having a width substantially matched to the portion of the clear aperture over which the refractive index distribution is substantially parabolic. In this regard the source may include an aperture to define the width of the emitted beam. Alternatively, the controller may be configured to provide a driving signal that creates a plurality of substantially parabolic refractive index distributions within the lens. The driving signal may comprise a sinusoid, the sum of at least two sinusoidal driving signals of differing frequency and/or phase, or may comprise a waveform other than a single frequency sinusoid.

In another of its aspects, the present invention provides a method for driving a tunable acoustic gradient index of refraction lens to produce a desired refractive index distribution within the lens. The method includes selecting a desired refractive index distribution to be produced within the lens, determining the frequency response of the lens, and using the frequency response to determine a transfer function of the lens to relate the index response to voltage input. In addition the method includes decomposing the desired refractive index distribution into its spatial frequencies, and converting the spatial frequencies into temporal frequencies representing the voltage input as an expansion having voltage coefficients. The method further includes determining the voltage coefficients from the representation of the decomposed refractive index distribution, and using the determined voltage coefficients to determine the voltage input in the time domain. The method then includes driving a tunable acoustic gradient index of refraction lens with the determined voltage input. In this method, the decomposed refractive index distribution may be converted into discrete spatial frequencies to provide a discretized representation of the decomposed refractive index distribution.

In yet another of its aspects, the invention provides a method for controlling the output of a tunable acoustic gradient index of refraction optical lens. The method includes providing a tunable acoustic gradient index of refraction lens having a refractive index that varies in response to an applied electrical driving signal, and irradiating the optical input of the lens with a source of electromagnetic radiation. In addition the method includes driving the lens with a driving signal to control the index of refraction within the lens, and detecting the electromagnetic radiation output from the driven lens with a detector. The method then includes providing a synchronizing signal to the detector to select a time to detect the electromagnetic radiation output from the driven lens when a desired refractive index distribution is present within the lens.

In still a further aspect of the invention, a method is provided for controlling the output of a tunable acoustic gradient index of refraction optical lens. The method includes providing a tunable acoustic gradient index of refraction lens having a refractive index that varies in response to an applied electrical driving signal, and irradiating the optical input of the lens with a source of electromagnetic radiation. In addition the method includes driving the lens with a driving signal to control the index of refraction within the lens, and detecting the electromagnetic radiation output from the driven lens with a detector. The method then includes providing a synchronizing signal to the detector to select a time to detect the electromagnetic radiation output from the driven lens when a desired refractive index distribution is present within the lens.

BRIEF DESCRIPTION OF THE DRAWINGS

The foregoing summary and the following detailed description of the preferred embodiments of the present invention will be best understood when read in conjunction with the appended drawings, in which:

FIG. 1C schematically illustrates an isometric view of assembled the TAG lens of FIG. 1A;

FIG. 2 schematically illustrates an exploded view of an exemplary configuration of a TAG lens similar to that of FIG. 1A but having a piezoelectric tube that is segmented along the longitudinal axis;

FIG. 21A illustrates the predicted index profile at one instant in time, with a linear approximation to the central peak (dashed line);

FIG. 21B illustrates the predicted index profile one half-period later in time than that shown in FIG. 21A, with linear approximations made to the two central peaks (dashed line), with the scale of the spatial axis set by the driving frequency, in this case, 497.5 kHz;

FIGS. 21C and 21D illustrate theoretical predictions for the instantaneous intensity patterns corresponding to a and b, respectively, observed with 355 nm laser light 50 cm behind the TAG lens with $n_A=1.5\times10^{-5}$ and scale bars set at 2 mm long;

FIGS. 21E and 21F show stroboscopic experimental images obtained in conditions identical to those of FIGS. 21C and 21D with the laser repetition rate synchronized to the TAG driving frequency and TAG lens driving amplitude of 5 V;

FIGS. 31A and 31B illustrate a micromachined ring on the surface of a polyimide sample, with FIG. 31A showing an optical micrograph of micromachined ring structure and FIG. 31B showing the profilometry analysis through the dashed line in FIG. 31A demonstrating that material is removed over a depth of approximately 0.9 μm with little recast material;

DETAILED DESCRIPTION OF THE INVENTION

Figure 1A:
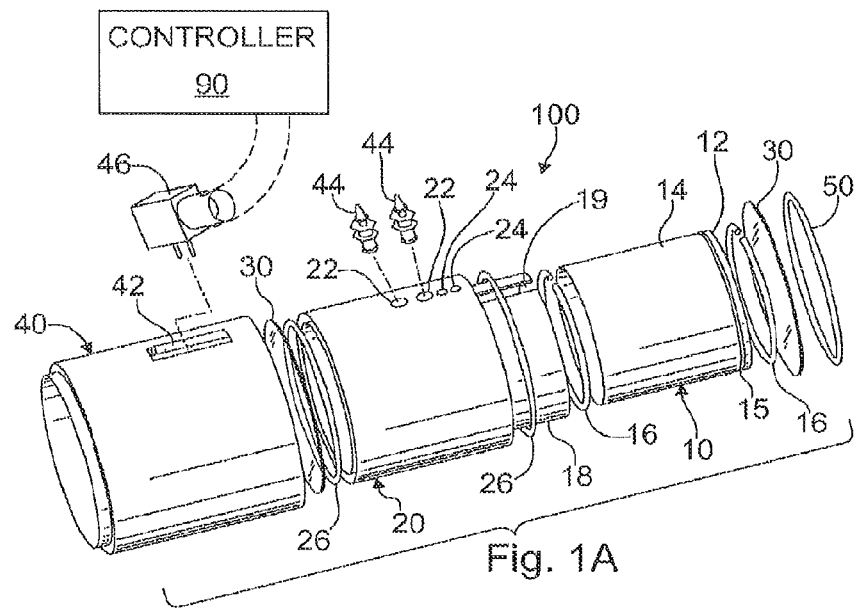
FIG. 1A schematically illustrates an exploded view of an exemplary configuration of a TAG lens in accordance with the present invention having a cylindrical shape.
Figure 1B:
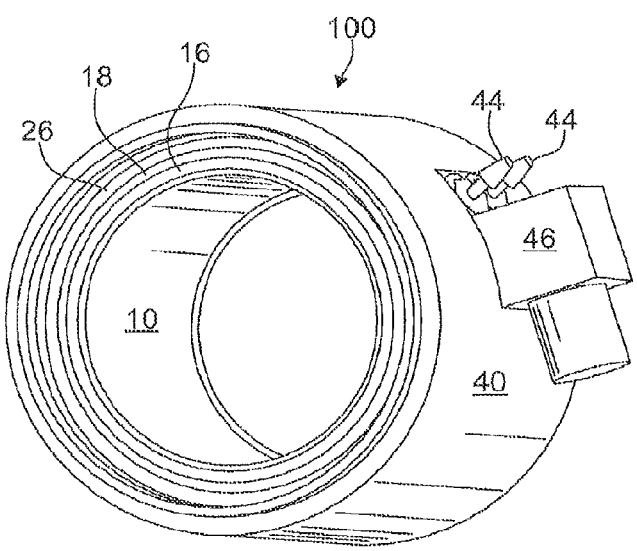
FIG. 1B schematically illustrates an isometric view of assembled the TAG lens of FIG. 1A.

Referring now to the figures, wherein like elements are numbered alike throughout, FIGS. 1B, 1B schematically illustrates an exemplary configuration of a TAG lens 100 in accordance with the present invention having a cylindrical shape. The TAG lens 100 is a piezoelectrically driven device that uses sound waves to modulate the wavefront of an incident light beam. The lens 100 is composed of a hollow piezoelectric tube 10 that is constrained by two transparent windows 30 on either end for optical access and filled with a refractive material, such as a gas, solid, liquid, plasma, or optical gain medium, for example. The TAG lens 100 works by creating a standing acoustic wave in the refractive liquid. The acoustic standing wave is created by applying an alternating voltage, typically in the radio-frequency range, to the piezoelectric tube 10 by a controller 90. The controller 90 may include a function generator passed through an RF amplifier and impedance matching circuit.

Turning to FIGS. 1A, 1B in more detail, the TAG lens 100 includes a piezoelectric tube 10 having a generally cylindrical shape, though other shapes such as a square, triangular, hexagonal cross-section, etc. may be used by utilizing multiple piezoelectric elements as described below. The piezoelectric tube 10 includes an outer electrode 14, and an inner electrode which may be wrapped from the inside surface of the piezoelectric tube 10 to the outer surface of the tube 10 (using a conductive copper tape adhered to the inside and wrapped around to the outside, for example) to provide an annular electrode contact region 12 for the inner electrode. The annular electrode contact region 12 and the outer electrode 14 may be electrically separated from one another by an annular gap 15 disposed therebetween. While a single piezoelectric tube 10 is shown, multiple tubes can be used end-to-end or a single piezoelectric tube 10a can be segmented along the longitudinal axis into different zones 14a, 14b which can be separately electrically addressed and driven to permit separate electrical signals to be delivered to each tube or zone 14a, 14b, FIG. 2. For example, the piezoelectric tube 10a may include an annular gap 15b disposed between the two ends of the tube 10a to electrically isolate two outer electrode zones 14a, 14b from one another along the axis of the tube 10a. A similar electrical gap may be provided internally to the tube 10a to electric isolate to inner electrode zones. Each of the separated inner electrode zones may be wrapped to a respective end of the tube 10a to provide a respective annular electrode contact region 12a, 12b disposed at opposing ends of the tube 10a. Each of the separate longitudinal zones 14a, 14b may then be driven by a separate signal. Such a configuration can, for example, permit a single TAG lens to be operated as if it were a compound lens system, with each tube or longitudinal zone 14a, 14b corresponding to a separate optical elemerit or lens. Additionally, the piezoelectric tube 10 may be segmented circumferentially so that multiple electrically addressable zones may exist at a given longitudinal location. Likewise, electrically addressable zones that have an arbitrary shape and size may be provided on the inner and outer cylindrical surfaces of the piezoelectric tube 10, where a given zone on the inner cylindrical surface may (or may not) coincide with an identical zone on the outer surface.

A cylindrical gasket 18 having an inner diameter larger than the outer diameter of the piezoelectric tube 10 may be provided to slide over the piezoelectric tube 10 to center and cushion the piezoelectric tube 10 within the rest of the structure. An opening, such as slot 19, may be provided in the cylindrical spacer gasket 18 to permit access to the piezoelectric tube 10 for purpose of making electrical contact with the piezoelectric tube 10 and filling the interior of the piezoelectric tube 10 with a suitable material, e.g., a fluid (liquid or gas). The spacer gasket 18 may be housed within a generally cylindrical inner casing 20 which may include one or more fluid ports 22 in the sidewall through which fluid may be introduced into or removed from the inner casing 20 and the interior of the piezoelectric tube 10 disposed therein. One or more outlet/inlet ports 44 having barbed protrusions may be provided in the fluid ports 22 to permit tubing to be connected to the outlet/inlet ports 44 to facilitate the introduction or removal of fluid from the TAG lens 100. In this regard the inner casing 20, spacer gasket 18, and piezoelectric tube 10 are configured so that fluid introduced through the inlet port 44 may travel past the spacer gasket 18 and into the interior of the piezoelectric tube 10. In addition, one or more electrical feedthrough ports 24 may be provided in a sidewall of the inner casing 20 to permit electrical contact to be made with the piezoelectric tube 10. For instance, wires may be extended through the electrical feedthrough ports 24 to allow electrical connection to the piezoelectric tube 10.

At either end of the inner casing 20 transparent windows 30 may be provided and sealed into place to provide a sealed enclosure for retaining a refractive fluid introduced through the inlet port 44 within the inner casing 20. To assist in creating a seal, an O-ring 26 may be provided between the ends of the inner casing 20 and the transparent windows 30, and the end of the inner casing 20 may include an annular groove into which the O-rings 26 may seat. Likewise spacer O-rings 16 may be provided between the ends of the piezoelectric tube 10 and the transparent windows 30. The windows 30 may comprise glass or any other optical material that is sufficiently transparent to the electromagnetic wavelengths at which the lens 100 is to be used. For instance, the windows 30 may be partially mirrored, such to be 50% transparent, for example. In addition, the windows 30 may comprise flat slabs or may include curved surfaces so that the windows 30 function as a lens. For example, one or both of the surfaces of either of the windows 30 may have a concave or convex shape or other configuration, such as a Fresnel surface, to introduce optical power. Further, the windows 30 may be configured to manipulate the incident optical radiation in other manners, such as filtering or diffracting.

Thus, the casing of the present invention may be multi-stage casing, that is, may include multiple concentric layers, such as inner casing 20 immediately adjacent the fluid/viscous fluid element of the present invention; piezo tube 10 concentric about the inner casing to provide the acoustic tuning wave, and cylinder 18 concentric about the piezo tube. In such embodiments, for example, the piezo element may provide acoustic wave tuning of the fluid/viscous element in order to provide the functionality discussed hereinthroughout, by way of non-limiting example.

However, in additional and alternative embodiments, varying numbers of concentric layers, and/or a single casing layer herein optionally referred to as solely inner casing 20, may be provided, such as wherein tuning of the fluid/viscous element may occur by additional and/or alternative means, and/or such as wherein an improved seal of inner casing 20 is provided, along with, for example, piezoelectric capability embedded in inner casing 20. By way of non-limiting example, feedback may be used in order to modify the pressure of the fluid/viscous element provided by the acoustic tuning, thereby modifying performance of the lensing provided by the fluid/viscous element. Such feedback may lead to automated or manual modification, and may be provided using automated or manual sensing. For example, TAG lens performance may be automatically assessed by measuring output effect on a known source, and lens performance may be modified automatically by modification to the acoustic tuning provided by a single layer casing. Likewise, temperature controls may be provided at the casing, such as to control the fluid/viscous element's temperature, and/or to thereby modify performance of the lensing provided by the fluid/viscous element.

Further, such temperature control may be provided apart from the casing layer or layers, or may be embedded within the casing layer or layers. By way of non-limiting example, heating and/or cooling elements may be embedded in a single layer casing in accordance with the present invention.

Multiple control elements, such as multiple piezo elements in or associated with inner casing 20, piezo element(s) and pressure element (s), or the like, may be used to provide an acoustically tunable multi-stage, or "compound," lens. Thereby, the present invention may be used to provide, for example, a "zoom" lens embodiment, by way of non-limiting example. In such compound lens embodiments, it will be understood that automated control of the lensing controls is preferable, in part because of the high frequency control (in the nanoseconds range) necessary to maintain uniform performance of the compound lens stages.

TAG lens performance, particular in the afore-discussed single casing 20 embodiment, may be preferably maintained by tuning to the desired lensing, and thereafter maintaining performance of the fluid/viscous element by preventing undesired modifications to the fluid/viscous element, i.e., particularly by preventing leakage, such as in the single casing 20 embodiment, by preventing temperature fluctuations, and the like. Such leakage may occur, for example, due to changes in the volume of the fluid/viscous element, such as may occur during lensing. Such temperature fluctuation may occur, for example, based on changes in environmental conditions external to the lensing environment.

Undesired modification may be prevented, as discussed, through improved lens control, and through provision of an optimally sealed lens chamber. Additionally and alternatively, as illustrated in FIG. 1C, a compressible component 4001, such as a bubble, bladder, or the like may be provided within the chamber containing the fluid/viscous element, such as to allow for control of and/or compensation for changes that may occur within the closed lensing system. The compressible component may, in certain preferred embodiments, be out of the optical sight line for the lensing. The compressible component may be self-enclosed or not, may be gaseous, and may preferable be constituted of an element that will not chemically interact, or otherwise bleed into, the fluid/viscous element, such as air.

The compressible component 4001 may be of a small, controlled volume when compared to the volume of the fluid/viscous element. The compressible component preferably behaves, or is controlled to behave, to allow the fluid/viscous element to expand and contract without rupturing the gasket 18, tube 10 or casing 20, and/or without increasing the static pressure of the fluid/viscous element. The compressible component may be air, as mentioned herein, or any compressible material, such as any gas, or a polymer, gel, or solid having a lower modulus that the shell or casing surrounding the fluid/viscous element.

In the exemplary embodiment of an unenclosed bubble, it is preferable that the bubble be of a controlled volume, such as to allow for repeatability of lens performance across lenses, and further that the bubble be located and maintained in a region of the fluid/viscous element reservoir that is not in the optical performance path. By way of non-limiting example, the compressible component may be located in a secondary reservoir partially partitioned from a primary reservoir that provides the lensing of the present invention.

Thereby, the compressible component 4001 improves lens performance, lens efficiency, and lens lifetime. Additionally, the compressible component eases lens manufacturing processes, at least in that the presence of the compressible component alleviates the need to completely remove all air and/or other gases from the fluid/viscous element prior to or after sealing the lens system.

Referencing again inner casing 20, the inner casing 20 and transparent windows 30 may be dimensioned to fit within an outer casing 40 which may conveniently be provided in the form of a 2 inch optical tube which is a standard dimension that can be readily mounted to existing optical components. To secure the inner casing 20 within the outer casing 40, the outer casing 40 may include an internal shoulder against which one end of the inner casing 20 seats. In addition, the outer casing 40 may be internally threaded at the end opposite to the shoulder end. A retaining ring 50 may be provided that screws into the outer casing 40 to abut against the end of the inner casing 20 to secure the inner casing 20 with and the outer casing 40. The outer casing 40 may include an access port 42, which may be provided in the form of a slot, through which the inlet/outlet ports 44 and electrical connections, such as a BNC connector 46, may pass. In order to supply the driving voltage to lens the 100, a controller 90 may be provided in electrical communication with the connector 46, which in turn is electrically connected to the piezoelectric tube 10, via the annular electrode contact region 12 and outer electrode 14, for example.

Figure 3A:
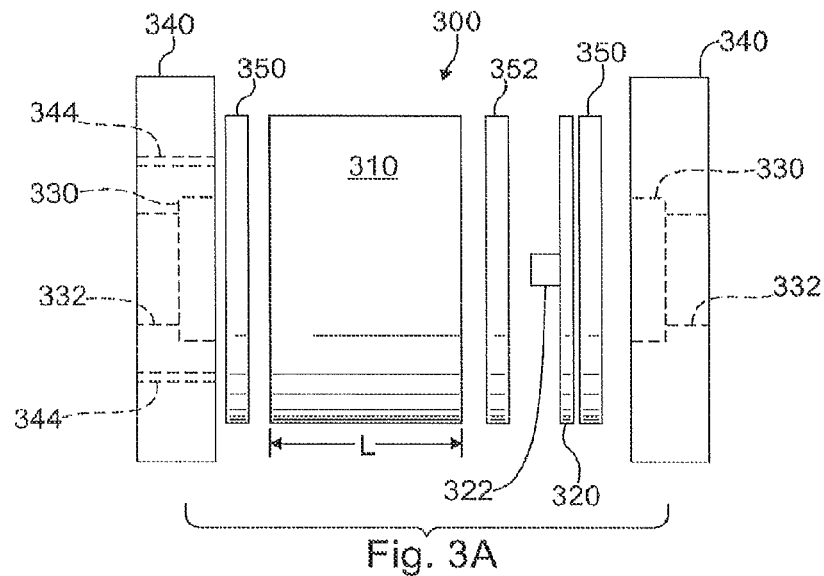
FIGS. 3A and 3B schematically illustrate an exploded side-elevational view and isometric view, respectively, of another exemplary configuration of a TAG lens in accordance with the present invention.
Figure 3B:
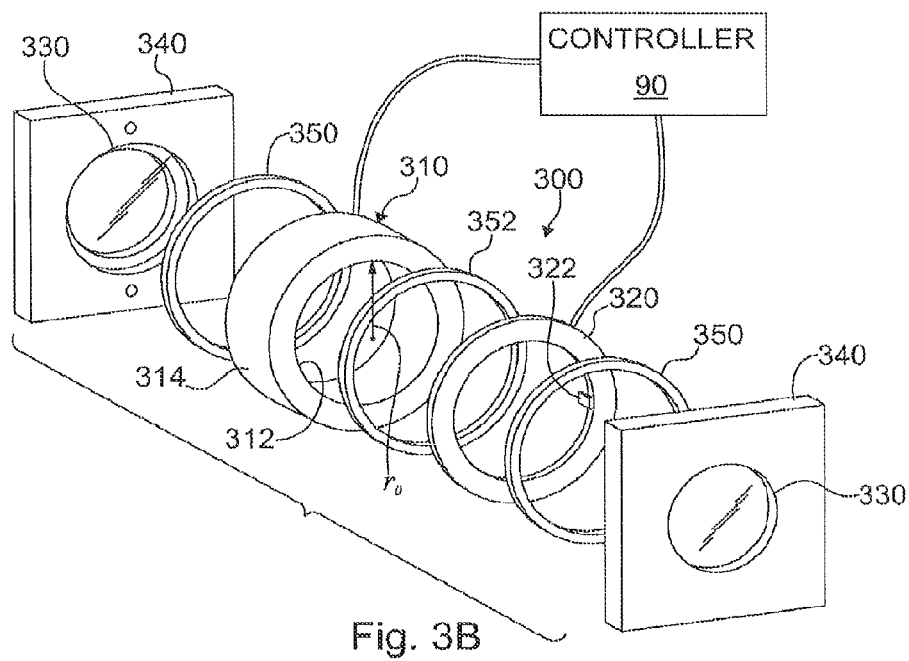

Turning next to FIGS. 3A and 3B, an additional exemplary configuration of a cylindrical TAG lens 300 in accordance with the present invention is illustrated. Among the differences of note between the TAG lens 300 of FIGS. 3A and 3B in the TAG lens 100 of FIGS. 1A and 1B are the manner in which electrical contact is made with the inner surface of the piezoelectric tube 310 and the relatively fewer number of parts. The TAG lens 300 includes a piezoelectric tube 310 which may be similar in configuration to the piezoelectric tube 10 of the TAG lens 100. In order to make contact with the inner electrode surface 312, an inner electrode contact ring 320 may be provided that includes an inner electrode contact tab 322 which may extend into the cavity of the piezoelectric tube 310 to make electrical contact with the inner electrode surface 312. To prevent electrical communication between the inner electrode contact ring 320 and the outer electrode 314, an annular insulating gasket 352 may be provided between the piezoelectric tube 310 and the inner electrode contact ring 320.

To create a sealed enclosure internal to the piezoelectric tube 310 in which a refractive fluid may be contained, two housing end plates 340 may be provided to be sealed over the ends of the piezoelectric tube 310. In this regard, annular sealing gaskets 350 may be provided between the ends of the piezoelectric tube 310 and the housing end plates 340 to help promote a fluid-tight seal. The housing end plates 340 may include a cylindrical opening 332 through which electromagnetic radiation may pass. In addition, the housing end plates 340 may include windows 330 disposed within the opening 332, which may include a shoulder against which the windows 330 seat. A refractive fluid may be introduced and withdrawn from the lens 300 through optional fill ports 344, or by injecting the refractive fluid between the sealing gasket 350 and the housing end plates 340 using a needle. An electrical driving signal may be provided by a controller 390 which is electrically connected to the outer electrode 314 and the inner electrode contact ring 320 by wires 316 to drive the piezoelectric tube 310. Like the controller 90 of FIG. 1A, the controller 390 may include a function generator passed through an RF amplifier and impedance matching circuit. Though the lens 300 of FIG. 3 contains fewer parts than the lens 100 of FIG. 1A, the lens 100 may be more convenient to use due to the increased ease with which the lens 100 may be filled and sealed. In addition, the electrode configuration of the lens 100, specifically the inclusion of the annular electrode contact region 12 for making electrical contact with the inner electrode of the piezoelectric tube 10, may lead to the creation of more axisymmetric acoustic waves (i.e., about the longitudinal axis of the piezoelectric tube 10) than would be possible with the point contact provided by contact tab 322 of the lens 300.

Figure 4A:
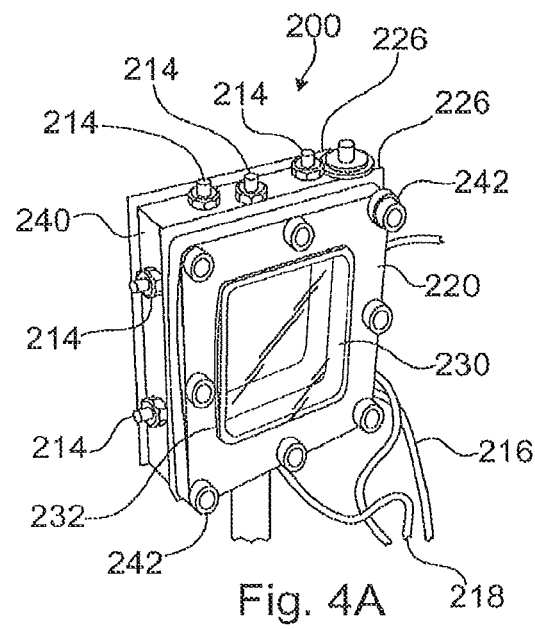
FIG. 4A schematically illustrates an isometric view of another exemplary configuration of a TAG lens in accordance with the present invention having a rectangular shape.
Figure 4B:
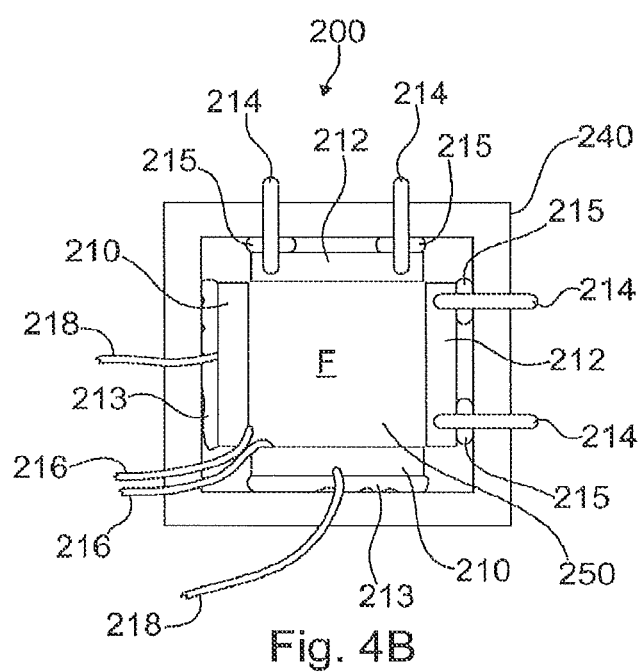
FIG. 4B schematically illustrates the rectangular center casing of the lens of FIG. 4A.

Turning next to FIGS. 4A and 4B, an alternative exemplary configuration of a rectangular TAG lens 200 in accordance with the present invention is illustrated. The lens 200 may include two piezoelectric plates 210 oriented 90° with respect to one another to provide two sides of the square cross-section of the rectangular enclosure, FIG. 3B. To complete the square cross-sectional shape of the lens cavity two planar walls 212 may be provided opposite the two piezoelectric plates 210. Providing two piezoelectric plates 210 can be useful for generating arbitrary patterns by combining several input signals that generate two independent orthogonal wavefronts, and as such is not limited to circularly symmetric patterns. Electrical wires 216, 218 may be connected to opposing sides of the piezoelectric plates 210, with the "hot" wires 216 electrically connected to the surface of the piezoelectric plate 210 closest to the interior of the lens 200, FIG. 3B. The wires 216, 218 may in turn be electrically connected with a controller that provides the driving voltage for the piezoelectric plates 210.

Figure 42:
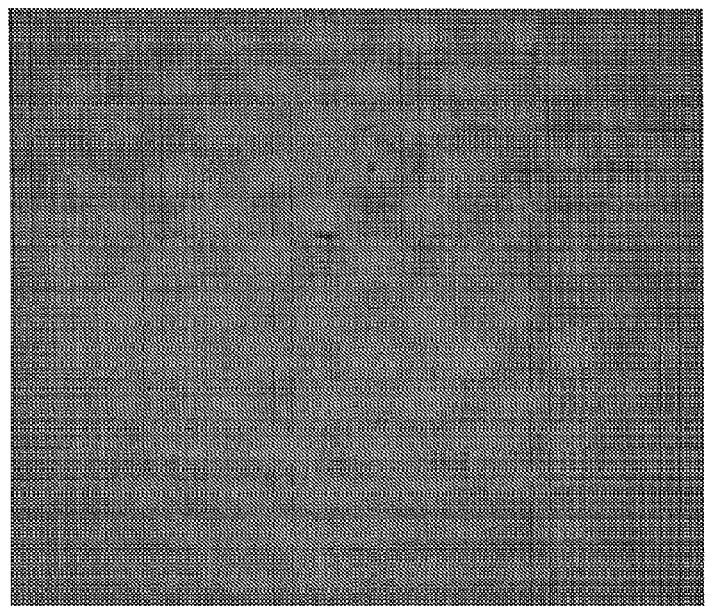
FIG. 42 illustrates the time-average output pattern from the lens of FIGS. 4A, 4B with the periodicity of the spots on the order of 0.1 mm.

The piezoelectric plates 210 and planar walls 212 are enclosed within a center casing 240 which may have threaded holes through which adjustment screws 214 may pass to permit adjustment of the location of the walls 212. The piezoelectric plates 210 in turn may be secured with an adhesive 213 to the center casing 240 to secure them in place. Sealing washers 215 may be provided internally to the center casing 240 on the adjustment screws 214 to help seal a refractive fluid, F, within the center casing 240. The center casing 240 may be provided in the form of an open-ended rectangular tube, to which two end plates 220 may be attached to provide a sealed enclosure 250 in which the refractive fluid, F, may be retained. Attachment may be effected through the means of bolts 242, or other suitable means. The bolts 242 pass through the end plates 220 and center casing 240. To aid in providing a fluid-tight seal between the center casing 240 and the end plates 220, sealing gaskets 226 may be provided between each end face of the center casing 240 and the adjoining end plate 220. The electrical wires 216, 218 may pass between the sealing gaskets 226 and the center casing 240 or end plates 220. The end plates 220 may also include a central square opening 232 in which transparent windows 230 may be mounted (e.g., with an fluid-tight adhesive or other suitable method) to permit optical radiation to pass through the lens 200 and the refractive fluid, F, in the central enclosure 250. The refractive fluid, F, may be introduced into the sealed enclosure 250 via fluid ports or by injecting the refractive fluid, F, into the sealed enclosure 250 by inserting a needle between the sealing gasket 226 and the center casing 240 or end plate 220. The particular exemplary lens 200 fabricated in tested (results in FIG. 42) was 0.5 inches thick, and 2 by 2 inches in the other two dimensions, and used PZT5A3, poled with silver electrodes, Morgan Electro Ceramics as the piezoelectric plates 210. Each of the piezoelectric plates 210 were driven at the same frequency and amplitude, and were in phase. Silicone oils of 0.65 and 5 cS have been used successfully. The patterns seen in FIG. 42 may be seen over a range frequencies (200-1000 kHz) and driving amplitudes (5-100 $V_{p\text{-}p}$), e.g. 400 kHz and 30 $V_{p\text{-}p}$.

Having provided various exemplary configurations of TAG lenses 100, 200, 300 in accordance with the present invention, discussion of their operation follows.

I. Operation of Tag Lens

A predictive model for the steady-state fluid mechanics behind TAG lenses 100, 200, 300 driven with a sinusoidal voltage signal is presented in this section. The model covers inviscid and viscous regimes in both the resonant and off-resonant cases. The density fluctuations from the fluidic model are related to refractive index fluctuations. The entire model is then analyzed to determine the optimal values of lens design parameters for greatest lens refractive power. These design parameters include lens length, radius, static refractive index, fluid viscosity, sound speed, and driving frequency and amplitude. It is found that long lenses 100, 200, 300 filled with a fluid of high refractive index and driven with large amplitude signals form the most effective lenses 100, 200, 300. When dealing with resonant driving conditions, low driving frequencies, smaller lens radii, and fluids with larger sound speeds are optimal. At nonresonant driving conditions, the opposite is true: high driving frequencies, larger radius lenses, and fluids with low sound speeds are beneficial. The ease of tunability of the TAG lens 100, 200, 300 through modifying the driving signal is discussed, as are limitations of the model including cavitation and nonlinearities within the lens 100, 200, 300.

The TAG lens 100, 200, 300 uses acoustic waves to modulate the density of an optically transparent fluid, thereby producing a spatially and temporally varying index of refraction—effectively a time-varying gradient index lens 100, 200, 300. Because the TAG lens 100, 200, 300 operates at frequencies in the order of $10^5$ Hz, the patterns observed (FIG. 5) by passing a CW collimated laser beam through the TAG lens 100, 200, 300 are time-average images of a temporally periodic pattern. The minor rings around each bright major ring approximate nondiffracting axicon-generated Bessel beams. The mechanics behind these patterns is explained below, and the optic of pattern formation are discussed in section III below. The square TAG lens 200 has been seen to produces patterns such as those in FIG. 42.

An exemplary TAG lens 300 used in the analyses of this section is illustrated in FIGS. 3A, 3B, and may comprise a cylindrical cavity formed by a hollow piezoelectric tube 310 with two flat transparent windows 330 on either side for optical access. The cavity may be filled with a refractive fluid and the piezoelectric tube 310 driven with an AC signal generating vibration in several directions, the important of which is the radial direction. This establishes standing-wave density and refractive index oscillations within the fluid, which are used to shape an incident laser beam.

Based on the TAG lens 300 configuration of FIGS. 3A, 3B, a predictive model is developed for the fluid mechanics and local refractive index throughout the lens 300 under steady-state operation. This model is also expected to generally apply to the cylindrical lens 100 of FIGS. 1A, 1B, 2. (A previous model for an acoustically-driven lens had been proposed, however this model had invoked time-invariant nonlinear acoustic theories which ignore the more significant linear effects occurring in these lenses. Cf. Higginson, et al., Applied Physics Letters, 843 (2004).) Experimentation has shown that TAG beams are strongly time-varying, and the following linear acoustic model better explains all characteristics of the TAG lens 300. The results of the present model will be provided using "base case" TAG lens parameters. Optimizing the refractive capabilities of the lens 300 relative to this base case for desired applications is also discussed. The effects of modifying the lens dimensions, filling fluid, and driving signal are all examined, as well as how modifying the driving signal can be used to tune the index of refraction within the lens 300.

Base Case Parameters

Figure 5:
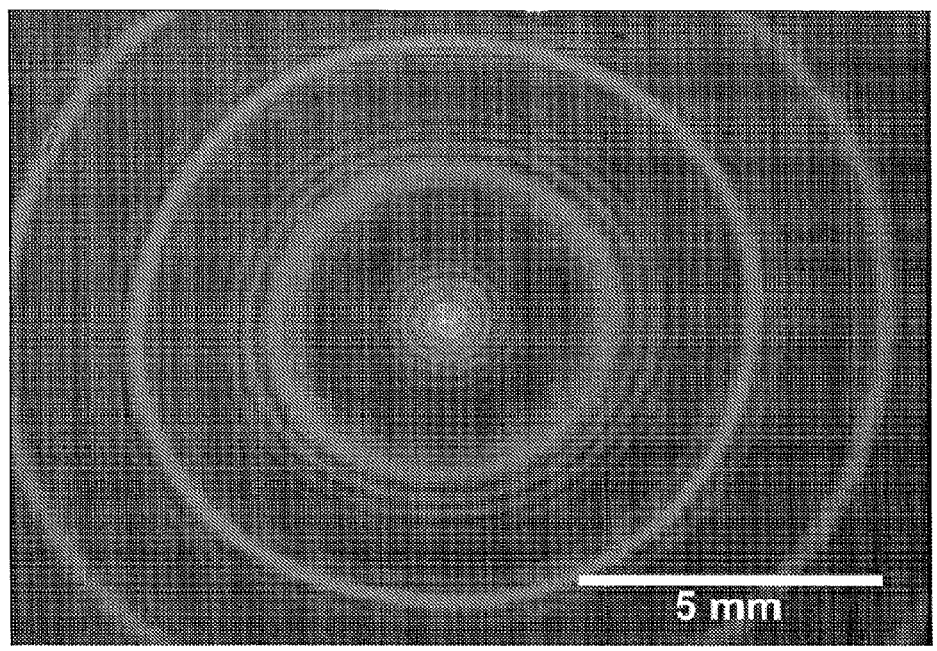
FIG. 5 illustrates a characteristic pattern created by illuminating a circular TAG lens with a wide Gaussian collimated laser beam.

FIG. 5 shows the pattern generated by a "base case" TAG lens 300 (except for a driving frequency shifted to 299.7 kHz) as observed 80 cm behind the lens 300. The lens 300 itself is diagrammed in FIGS. 3A, 3B. The base case parameters for this lens 300 are listed in Table I.

TABLE I

Base case parameters for the TAG lens, divided into geometric, fluid, and driving signal parameters, respectively.

| Parameter | Symbol | Base Case Value |
| --- | --- | --- |
| Lens inner radius | $r_0$ | 3.5 cm |
| Lens length | L | 4.06 cm |

TABLE I-continued

Base case parameters for the TAG lens, divided into geometric, fluid, and driving signal parameters, respectively.

| Parameter | Symbol | Base Case Value |
| --- | --- | --- |
| Fluid Viscosity | v | 100 cs |
| Static refractive Index | $n_0$ | 1.4030 |
| Speed of sound | $c_s$ | 1.00 km/s |
| Fluid Density | $p_n$ | 964 kg/m$^3$ |
| Voltage Amplitude | $V_A$ | 10 V |
| Peak inner wall velocity | $v_A$ | 1 cm/s |
| Resonant Frequency | f | 246.397 kHz |
| Off-Resonant Frequency | f | 253.5 kHz |

The piezoelectric material used for the tube 310 is lead zirconate titanate, PZT-8, and the filling fluid for the lens 300 is a Dow Corning 200 Fluid, a silicone oil. The piezoelectric tube 310 is driven by the controller 390 which includes a function generator (Stanford Research Systems, DS345) passed through an RF amplifier (T&C Power Conversion, AG 1006) and impedance matching circuit, which can produce AC voltages up to 300 $V_{pp}$ at frequencies between 100 kHz and 500 kHz. Other impedance matching circuits could be used to facilitate different frequency ranges. Two different driving frequencies are used, corresponding to resonant and off-resonant cases, listed in Table I.

Mechanics
Piezoelectric Transduction

As indicated above, the piezoelectric transducer used to drive the TAG lens 300 comes in the form of a hollow cylinder or tube 310. The electrodes 312, 314 are placed on the inner and outer circumferences of the tube 310. The driving voltage frequency and amplitude is applied to the piezoelectric tube 310 so that $$V = V_A \sin(\omega t). \qquad (1)$$

The theory behind how a hollow piezoelectric tube 310 will respond to such a driving voltage has already been published (Adelman, et al., Journal of Sound and Vibration, 245 (1975)), which leads to inner wall velocities on the order of $v_A$=1 cm/s, assuming driving voltage amplitudes on the order of 10V. It is important to note that the wall velocity is always proportional to the driving voltage amplitude.

Fluid Mechanics

The mechanics of the fluid within the lens 300 is described by three equations: conservation of mass, conservation of momentum, and an acoustic equation of state. Stated symbolically, these equations are:

$$\frac{\partial \rho}{\partial t} + \nabla \cdot (\rho v) = 0, \qquad (2)$$

$$\frac{\partial}{\partial t}(\rho v) + \nabla \cdot (\rho v \otimes v) + \nabla \cdot D = 0, \qquad (3)$$

$$p - p_o = c_s^2(\rho - \rho_0), \qquad (4)$$

where $\hat{\times}$ represents the tensor product and D is the viscous stress tensor whose elements are given by $$D_{ij} = -(\eta - 2\mu/3)(\nabla \cdot v)\delta_{ij} - \mu\left(\frac{\partial v_i}{\partial x_j} + \frac{\partial v_j}{\partial x_i}\right). \qquad (5)$$

Here, $\rho$ is the local density, v is the local fluid velocity, p is the local pressure, $\mu$ is the dynamic shear viscosity, and $\eta$ is the dynamic bulk viscosity. Bulk viscosities are not generally tabulated and are difficult to measure. For most fluids, $\eta$ is the same order of magnitude as $\mu$. For the base case, it is assumed that $\eta=\mu$. Equation 4 assumes small amplitude waves where $c_s$ is the speed of sound within the fluid at the quiescent density and pressure, $\rho_0$ and $p_0$. This equation represents the linearized form of all fluid equations of state.

Substituting the equation of state (Eq. 4) into the momentum conservation equation (Eq. 3) yields two coupled differential equations for the dependent variables $\rho$ and v. Applying no-slip conditions at the boundaries of the cell translates to these boundary conditions:

$$v|_{r=r_0} = v_A \cos(\omega t)\hat{r}, \qquad (6)$$

$$v|_{z=0} = v|_{z=L} = 0. \qquad (7)$$

$$\delta = \sqrt{\frac{2\mu}{\rho_0 \omega}} \qquad (8)$$

The radial boundary condition is determined from the velocity of the inner wall 312 of the piezoelectric tube 310. This assumes that the piezoelectric tube 310 is stiff compared to the fluid and that acoustic waves within the fluid do not couple back into the piezoelectric motion. Impedance spectroscopy conducted on the TAG lens 300 shows that except near resonances, the TAG lens 300 impedance is the same regardless of the filling fluid chosen. Hence, this assumption is generally true, however some corrections may be needed when near resonance. The presence of the dead space-created by the sealing gaskets 350 between the piezoelectric tube ends and windows 330, especially in the configuration of FIGS. 3A, 3B, will also modify the boundary condition in Eq. 6, however this effect is neglected, because it is expected to only be significant near the sealing gaskets 350 themselves.

Typically, a unique solution for $\rho$ and v at all times would require two initial conditions as well as the above boundary conditions. However for the steady-state response to the vibrating wall, the initial conditions do not affect the steady-state response.

The following assumptions reduce the dimensionality of the problem, making it more tractable. First, the azimuthal dependence can be eliminated because of the lack of angular dependence within the boundary conditions (Eqs. 6 and 7). Second, the z-dependence of the boundary conditions only appears in the no-slip conditions at the transparent windows 330. Physically, this effect is expected to be localized to a boundary layer of approximate thickness $$\delta = \sqrt{\frac{2\mu}{\rho_0 \omega}} \qquad (8)$$

For the base case parameters, this thickness comes out to approximately 10 μm. Thus, the lens 300 is operating in the limit δ<<L, and solving the problem outside the boundary layer will account for virtually all the fluid within the lens 300. Furthermore, because radial gradients are expected to be reduced within the boundary layer, the boundary layer effect can be approximated by simply using a reduced effective lens length. Gradients in the z-direction are expected to be much larger within the boundary layer because the fluid velocity transitions to zero at the wall. However for a normally incident beam of light, all that is significant is the transverse gradient in total optical path length through the lens 300. Optical path length differences due to density gradients in the z-direction within the thin boundary layer are insignificant compared to the optical path length differences within the bulk. The result of these considerations is that an approximate solution can be found by solving the one dimensional problem, assuming ρ is only a function of r and then applying that solution to all values of z within the lens 300.

The problem can be further simplified by linearization. This assumes that the acoustic waves have a small amplitude relative to static conditions. Each variable is expanded in terms of an arbitrary amplitude parameter, λ:

$$\rho(r,t) = \rho_0 + \lambda \rho_1(r,t) + \lambda^2 \rho_2(r,t) + \ldots \quad (9)$$

$$v(r,t) = 0 + \lambda v_1(r,t) + \lambda^2 v_2(r,t) + \ldots \quad (10)$$

$$\lambda \left[ \frac{\partial \rho_1}{\partial t} + \nabla \cdot (\rho_0 v) \right] = 0, \quad (11)$$

$$\lambda \left[ \frac{\partial}{\partial t}(\rho_0 v) + c_s^2 \nabla \rho_1 + \nabla \cdot D_1 \right] = 0, \quad (12)$$

Furthermore, the wave amplitudes are assumed small and therefore any second order or higher term ($\lambda^2$, $\lambda^3$, etc.) is much less than the zeroth or first order terms, so the higher order terms can be dropped from the equations. Keeping only the zeroth and first order terms results in $\rho(r,t)=\rho_0+\lambda\rho_1(r,t)$ and $v(r,t)=\lambda v_1(r,t)$, and Eqs. 2 and 3 can be rewritten as:

$$\lambda \left[ \frac{\partial \rho_1}{\partial t} + \nabla \cdot (\rho_0 v) \right] = 0, \quad (11)$$

$$\lambda \left[ \frac{\partial}{\partial t}(\rho_0 v) + c_s^2 \nabla \rho_1 + \nabla \cdot D_1 \right] = 0, \quad (12)$$

where $D_1$ is defined in the same way as D in Eq. 5, except with v replaced by $v_1$.

Inviscid Solution

One solution of interest is the inviscid solution because it reasonably accurately predicts the lens output patterns for low viscosities in off-resonant conditions while retaining a simple analytic form. This solution is found by setting μ=η=0. In the one dimensional case, the problem becomes:

$$\frac{\partial \rho_1}{\partial t} + \frac{1}{r}\frac{\partial}{\partial r}(r \rho_0 v) = 0, \quad (13)$$

$$\frac{\partial}{\partial t}(\rho_0 v) + c_s^2 \frac{\partial \rho_1}{\partial r} = 0, \quad (14)$$

$$v|_{r=r_0} = v_A \cos(\omega t). \quad (15)$$

It can be directly verified by substitution that the solution to this problem is $$\rho_1(r,t) = \rho_A J_0(\omega r/c_s)\sin(\omega t), \quad (16)$$

$$v(r,t) = -\frac{\rho_A c_s}{\rho_0} J_1(\omega r/c_s)\cos(\omega t), \quad (17)$$

where $\rho_A = -(\rho_o v_A)/(c_s J_1(\omega r_0/c_s))$. For the base case off-resonant frequency, $\rho_A$ is expected to be 0.090 kg/m$^3$.

Viscous Solution

An effective kinematic viscosity is defined as $\nu' \equiv (\eta + 4\mu/3)$. In cases where this viscosity is large compared to $c_s^2/\omega$ or when the lens 300 is driven near a resonant frequency of the cavity, viscosity becomes significant and the solution is somewhat more complex. To put the viscosity threshold in context, the base case fluid, 100 cS silicone oil, is considered low viscosity for frequencies $f \ll c_s^2/(2\pi\sigma')=700$ MHz.

Differentiating Eq. 11 with respect to time and taking the divergence of Eq. 12, the equations can be decoupled and all dependence on v eliminated to yield the damped wave equation, $$\nabla^2 \left( c_s^2 \rho_1 + \nu' \frac{\partial \rho_1}{\partial t} \right) - \frac{\partial^2 \rho_1}{\partial t^2} = 0. \quad (18)$$

By evaluating Eqs. 11 and 12 at $r=r_0$ and assuming a curl-free velocity field there, Eq. 6 can be converted from a boundary condition in velocity to the following Neumann boundary condition in density, $$\left.\frac{\partial \rho_1}{\partial r}\right|_{r=r_0} = \frac{\rho_0 v_A \omega c_s^2}{\nu'^2 \omega^2 + c_s^4}\sin(\omega t) - \frac{\rho_0 v_A \omega^2 \nu'}{\nu'^2 \omega^2 + c_s^4}\cos(\omega t). \quad (19)$$

The steady-state one-dimensional solution to the above wave equation and boundary condition can be expanded as a sum of eigenfunctions:

$$\rho_1(r,t) = \quad (20)$$
$$r(A\sin(\omega t) + B\cos(\omega t)) + \sum_{m=0}^{\infty} J_0(k_m r)[C_m \sin(\omega t) + D_m \cos(\omega t)],$$

where $k_m = x_m/r_0$ with $x_m$ being the location of the $m^{th}$ zero of $J_1(x)$ and $x_0 = 0$. A and B can be found by substituting this solution into Eq. 19, $C_m$ and $D_m$ can be found by substituting the solution into Eq. 18 and integrating against the orthogonal eigenfunction $J_0(k_m r)$ over the entire circular domain. The resulting expressions are:

$$A = \frac{\rho_0 v_A \omega c_s^2}{\nu'^2 \omega^2 + c_s^4}, \quad (21)$$

$$B = \frac{\rho_0 v_A \omega^2 \nu'}{\nu'^2 \omega^2 + c_s^4}, \quad (22)$$

$$C_m = \left(\frac{2\rho_0 v_A \omega}{J_0^2(k_m r_0)}\right) \frac{E_m r_0 \omega^2 \frac{k_m^2(c_s^4 - \omega^2 \nu'^2) - c_s^2 \omega^2}{\nu'^2 \omega^2 + c_s^4} - \frac{F_m}{r_0}(\omega^2 - c_s^2 k_m^2)}{\omega^2(\omega^2 - 2c_s^2 k_m^2) + k_m^4(\nu'^2 \omega^2 + c_s^4)}, \quad (23)$$

$$D_m = \left(\frac{2\rho_0 v_A \omega}{J_0^2(k_m r_0)}\right) \omega \nu' \frac{E_m r_0 \omega^2 \frac{\omega^2 - 2c_s^2 k_m^2}{\nu'^2 \omega^2 + c_s^4} - \frac{F_m}{r_0} k_m^2}{\omega^2(\omega^2 - 2c_s^2 k_m^2) + k_m^4(\nu'^2 \omega^2 + c_s^4)}. \quad (24)$$

In the expressions above, $E_m$ and $F_m$ are the nondimensional integrals, $$E_m = \int_0^1 x^2 J_0(x_m x) dx, \quad (25)$$

$$F_m = \int_0^1 J_0(x_m x) dx. \quad (26)$$

By taking the limit $v' \to 0$ and using the same trick of integrating against an orthogonal eigenfunction, the inviscid solution in Eq. 16 can be recovered.

Resonant Driving Conditions

Another important limit is that of operating near a resonance of the cavity using a relatively low viscosity fluid. Operating at the $n^{th}$ (>0) resonance means that $\omega = c_s k_n$. Note that at resonant frequencies, the inviscid solution in Eq. 16 diverges because $J_1(kr_0) \to 0$ in the denominator of $\rho_A$. Consequently, in order to get a valid solution near resonance, the full viscous solution is necessary—even at low viscosities. As discussed in the previous section, low viscosity means that $v' \ll c_s^2/\omega$. In this limit, the coefficients of the viscous solution look as follows:

$$A \to \frac{\rho_0 v_A k_n}{c_s}, \quad (27)$$

$$B \to -v' \frac{k_n}{c_s} \left( \frac{\rho_0 v_A k_n}{c_s} \right), \quad (28)$$

$$C_{m \neq n} \to \left( \frac{2\rho_0 v_A \omega}{J_0^2(k_m r_0)} \right) \frac{E_m r_0 k_n^2 + \frac{F_m}{r_0}}{c_s^2 (k_m^2 - k_n^2)}, \quad (29)$$

$$C_{m=n} \to -\left( \frac{2\rho_0 v_A \omega}{J_0^2(\omega r_0/c_s)} \right) \frac{E_n r_0}{c_s^2}, \quad (30)$$

$$D_{m \neq n} \to -v' \left( \frac{2\rho_0 v_A \omega}{J_0^2(k_m r_0)} \right) \frac{\omega}{c_s^2} \frac{E_m r_0 k_n^2 (k_m^2 - k_n^2) + \frac{F_m}{r_0} k_m^2}{c_s^2 (k_m^2 - k_n^2)^2}, \quad (31)$$

$$D_{m=n} \to -\frac{1}{v'} \left( \frac{2\rho_0 v_A \omega}{J_0^2(\omega r_0/c_s)} \right) \frac{c_s^2 (E_n r_0 k_n^2 + F_n r_0)}{\omega^3}. \quad (32)$$

Note that as the viscosity vanishes, the only term that diverges is the $D_{m=n}$ term. All the other terms either vanish or do not change. This means that when driving on resonance with a low viscosity fluid only the $D_{m=n}$ term is significant, and the solution for the density becomes, $$\rho_1(r, t) \to -\frac{1}{v'} \left( \frac{2\rho_0 v_A c_s^2 \left( E_n r_0 \frac{\omega^2}{c_s^2} + \frac{F_n}{r_0} \right)}{\omega^2 J_0^2(\omega r_0/c_s)} \right) J_0\left( \frac{\omega r}{c_s} \right) \cos(\omega t). \quad (33)$$

At the resonant base case frequency, the amplitude of $\rho_1$ takes the value 9.1 kg/m³.

From Density to Refractive Index

The Lorentz-Lorenz equation can be used to determine the local index of refraction from the fluid density. This relationship is $$n = \sqrt{\frac{2Q\rho + 1}{1 - Q\rho}}. \quad (34)$$

where Q is the molar refractivity, which can be determined from $n_0$ and $\rho_0$. For small $\rho_1$, this equation can be linearized by a Taylor expansion about the static density and refractive index. Substituting for Q, this takes the form, $$n = n_0 + \frac{n_0^4 + n_0^2 - 2}{6n_0} \left( \frac{\rho_1}{\rho_0} \right). \quad (35)$$

In the resonant base case, the amplitude of oscillation of the density standing wave is less than 1% of the static density. Comparing the true Lorentz-Lorenz equation with the linearized version, one finds that the error in refractive index due to linearization is less than 0.2%.

In the inviscid linearized acoustic case, the refractive index given by Eq. 35 assuming the density distribution in Eq. 16 or 33, depending on resonance, reduces to an expression of the form,
in-the off-resonant case, or $$n = n_0 + n_A J_0(kr)\sin(\omega t) \quad (36)$$

$$n = n_0 + n_A J_0(kr)\cos(\omega t) \quad (37)$$

at resonance. The full expression for $n_A$ in the low-viscosity off-resonant case is:

$$n_A = \left( \frac{n_0^4 + n_0^2 - 2}{6n_0} \right) \left( \frac{-v_A}{c_s J_1(\omega r_0/c_s)} \right), \quad (38)$$

and in the resonant case $n_A$ is given by:

$$n_A = \left( \frac{n_0^4 + n_0^2 - 2}{6n_0} \right) \left( \frac{-2c_s^2 v_A}{v' \omega^2 J_0^2(\omega r_0/c_s)} \right) \left( E_n r_0 \frac{\omega^2}{c_s^2} + \frac{F_n}{r_0} \right). \quad (39)$$

For the base case, $n_A$ is expected to have an off-resonant value of $4.3 \times 10^{-5}$. On resonance, it is expected to have a base case value of $4.3 \times 10^{-3}$. Similar solutions can be obtained for the viscous case.

Optimizing the Figure of Merit: Refractive Power

In order to get the most out of a TAG lens 300 under steady state operation, one wishes to maximize the peak refractive power. The lower bound is always zero, given by the static lens 300 without any input driving signal. Higher refractive powers increase the range of achievable working distances and Bessel beam ring spacings. The refractive power, RP, is defined here to be the magnitude of the transverse gradient in optical path length. This is given by the product of the transverse gradient in refractive index and the length of the lens 300. Under thin lens and small angle approximations, the maximum angle that an incoming collimated ray can be diverted by the TAG lens 300 is equal to its refractive power. For a simple converging lens, its RP is also equal to its numerical aperture.

Maximizing the refractive power can be accomplished by altering the dimensions of the lens 300, the filling fluid, or the driving signal. Because the base case TAG lens 300 is well within the low viscosity range of the parameter space, discussion in this section will be limited to only low-viscosity fluids in the resonant and off-resonant cases so that Eq. 36 or 37 applies with $n_A$ given by Eq. 38 or 39.

The first step is to calculate the TAG lens peak refractive power, $RP_A$, using Eq. 36 and assuming azimuthal symmetry within the lens 300:

$$RP_A \equiv \max_{r>0} |\nabla\ OPL \cdot \hat{r}| \quad (40)$$

$$= \max_{r>0} |L \nabla\ n \cdot \hat{r}|$$

$$= \max_{r>0} |L k n_A J_1(kr)|.$$

Therefore, $RP_A$ is maximized by maximizing $|Lkn_A|$, while the term $J_1(kr)$ only determines at what radial location this maximum is achieved. In order to maximize $|Lkn_A|$, each of the parameters in Eqs. 38 and 39 is considered. Because the dependence on these parameters can vary between resonant and off-resonant driving conditions, the analysis has been divided into the two subsections below.

Optimizing Resonant Conditions

It is first assumed that the lens 300 will be driven under resonant conditions. This will yield the highest refractive, powers. At the resonant base case frequency, $RP_A$ takes the value 0.16. The model for this section uses the refractive index given by Eq. 37 with $n_A$ given by Eq. 39.

Optimizing Lens Dimensions

The size of the TAG lens 300 is considered first. This is determined by the piezoelectric tube length L and inner radius $r_0$. The refractive power of the TAG lens 300 is proportional to L, so longer lenses are desirable. With increasing length, thin lens approximations will become increasingly erroneous, and eventually the TAG lens 300 will function as a waveguide.

Figure 6:
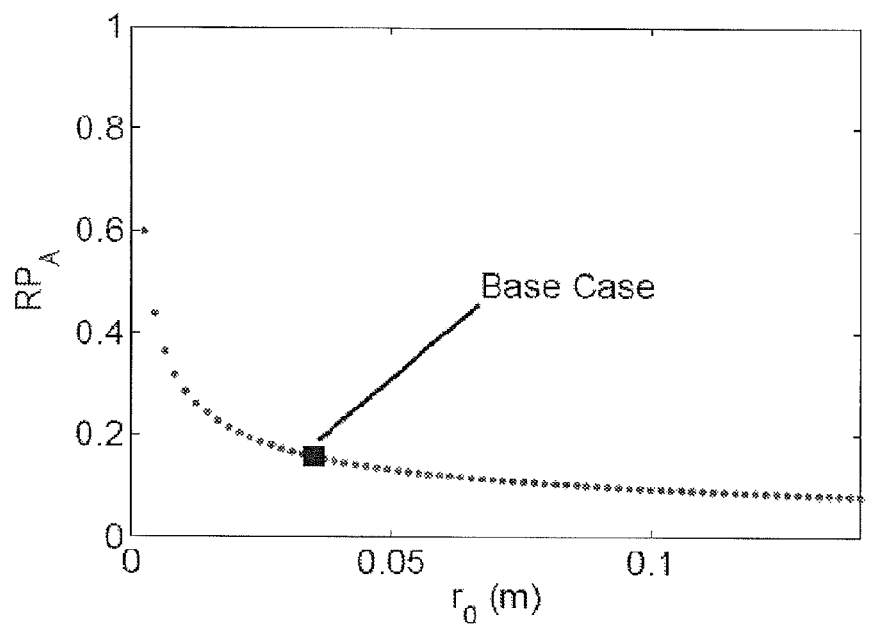
FIG. 6 illustrates the dependence of the peak refractive power of the lens, $RP_A$, on the inner radius of the lens, $r_0$, assuming resonant driving conditions.

The dependence on transverse lens size is not a simple relationship because of the Bessel functions in the denominator of Eq. 39 and the fact that the value of n in $E_n$ and $F_n$ depends on $r_0$. The relationship between the refractive power and the inner lens radius is plotted in FIG. 6. This figure shows that on resonance, higher refractive powers can be achieved with lenses having a smaller radius. Discrete points are plotted because resonance is only achieved at discrete inner radii. This effect can be attributed to increased viscous losses due to increased acoustic wave propagation distance.

Optimizing the Refractive Fluid

The relevant properties of the refractive fluid include its static index of refraction $n_0$, its effective kinematic viscosity $v'$, and the speed of sound within the material, $c_s$.

Figure 7:
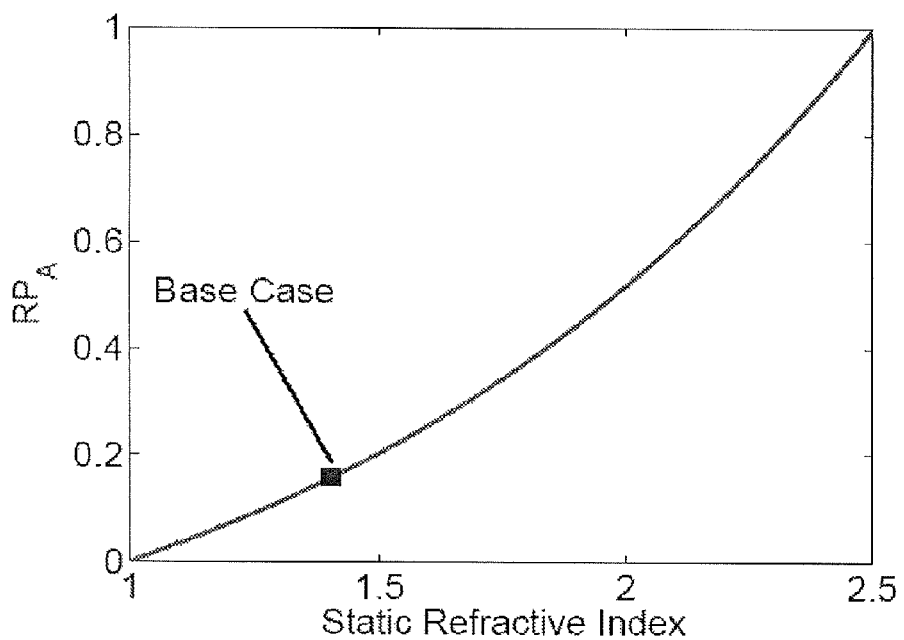
FIG. 7 illustrates the dependence of the peak refractive power of the lens, $RP_A$, on the static refractive index, $n_0$, assuming resonant driving conditions.

Increasing the value of $n_0$ affects only the first term of Eq. 39 and increases the TAG lens refractive power. Due to the nature of the Lorentz-Lorenz equation, the same fractional variation in density will have a greater effect on the refractive index of a material with a naturally high refractive index than it will on a material with a lower refractive index. This effect is plotted in FIG. 7. It is clear that higher static indices of refraction improve lens performance.

In the resonant case, the viscosity of the fluid is significant and lower viscosities are more desirable because the refractive index amplitude is inversely proportional to the effective kinematic viscosity. In symbols, $n_A \propto v'^1$. This result is expected because lower viscosities will mean less viscous loss of energy within the lens 300.

Figure 8:
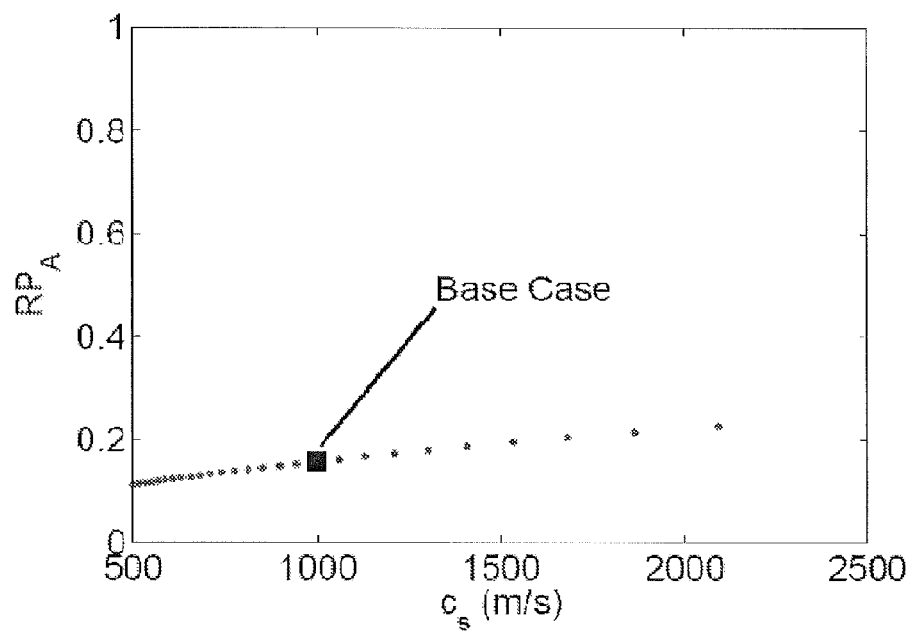
FIG. 8 illustrates the dependence of the peak refractive power, $RP_A$, on fluid sound speed, $c_s$, assuming resonant driving conditions.

As with the inner radius, the effect of the sound speed on the refractive power cannot be easily analytically represented because of the Bessel functions in the denominator of Eq. 39 and the dependence of $E_n$ and $F_n$ on $c_s$. These effects are plotted in FIG. 8. This shows that higher sound speeds are preferable.

Listed in Table II are a variety of filling materials and their relevant properties. For resonant driving conditions, water and 0.65 cS silicone oil are best because of their low viscosities. Nitrogen would make a poor choice because of its very low value of static index of refraction. Because of their high viscosities, Glycerol and 100 cS silicone oil are less desirable for resonant operation.

TABLE II

Properties of potential filling fluids. All values are for temperatures in the 20-30° C. range.

| Fluid | $n_0$ | v (cS) | $c_s$ (m/s) | $p_n$ (kg/m³) |
|---|---|---|---|---|
| Silicone Oil | 1.4030 | 100 | 98.5 | 964 |
| Silicone Oil | 1.375 | 0.65 | 873.2 | 761 |
| Glycerol | 1.4746 | 740 | 1904 | 1260 |
| Water | 1.33 | 1.00 | 1493 | 1000 |
| Nitrogen | 1.0003 | 16.1 | 355 | 1.12 |

Optimizing the Driving Signal

While only sinusoidal driving signals are discussed at present, the controller 390 (or controller 90) can provide more complicated signals to produce arbitrary index profiles that repeat periodically in time as discussed below in section II. There are two variable parameters of the sinusoidal driving signal: its amplitude, $V_A$, and its frequency, $\omega$. These two parameters will determine the inner wall velocity, which are treated herein as a given parameter.

It has been noted that voltage amplitude, $V_A$, is proportional to inner wall velocity, $v_A$. These amplitudes have a very simple effect on the refractive index. From Eqs. 38 and 39, it can be seen that lens refractive power is directly proportional to $v_A$, and hence, $V_A$, and that larger wall velocities and driving voltages are desirable.

Figure 9:
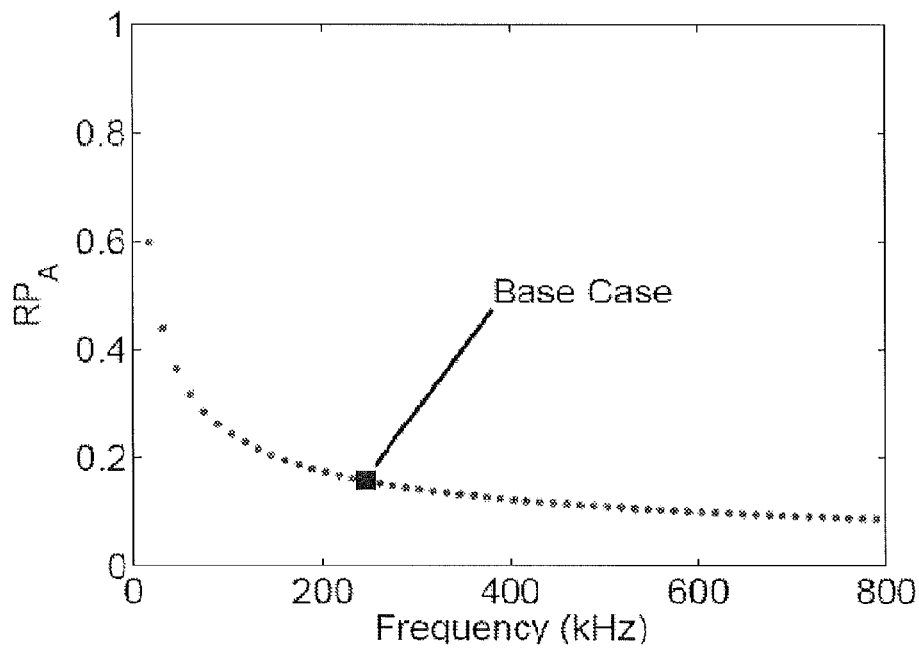
FIG. 9 illustrates the dependence of refractive power on driving frequency $f=\omega/(2\pi)$, assuming resonant driving conditions.

Similar to the lens radius and sound speed, the driving frequency $\omega$ has an effect on the refractive power of the lens 300 that cannot be given in a simple analytic form. This effect is plotted in FIG. 9 and illustrates that lower frequencies yield greater refractive powers. This is because higher frequencies exhibit greater viscous damping.

Optimizing Nonresonant Conditions

There are conditions where driving on resonance is impractical. For example, due to the sharpness of the resonant peaks, a small error in lens properties or driving frequency can result in a large error in refractive index. Operating off resonance can be more forgiving in terms of error, however this comes at the expense of reduced refractive powers. In this section the off-resonant base case frequency is used.

Since the lens 300 is operating off resonance, the refractive index is given by Eq. 36 with $n_A$, given by Eq. 38, which yields an $RP_A$ of 0.0016. The dependencies of $RP_A$ on lens length L, static refractive index $n_0$, and driving amplitude $V_A(v_A)$ are all identical to what was found for resonant driving conditions. This is because these variables only appear in the common prefactors in Eqs. 38 and 39. Hence these parameters will not be reexamined in this section. Note that if referring to FIG. 7 ($RP_A$ vs. $n_0$), the RP axis will have to be scaled appropriately because the values of $RP_A$ differ between the resonant and off-resonant cases.

Figure 10:
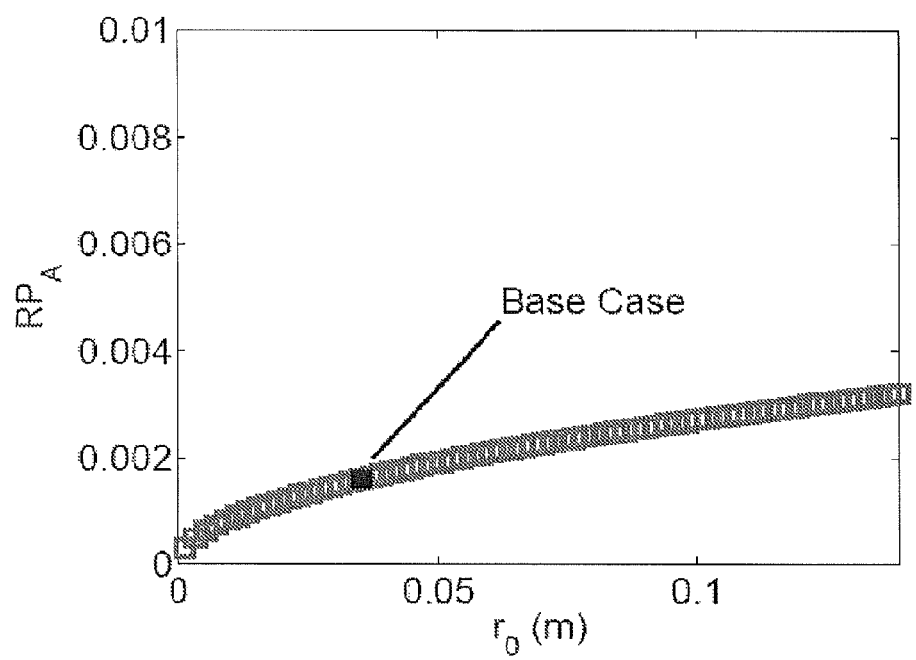
FIG. 10 illustrates the nonresonant dependence of the refractive power of the lens, $RP_A$, on the inner radius of the lens, $r_0$.
Figure 11:
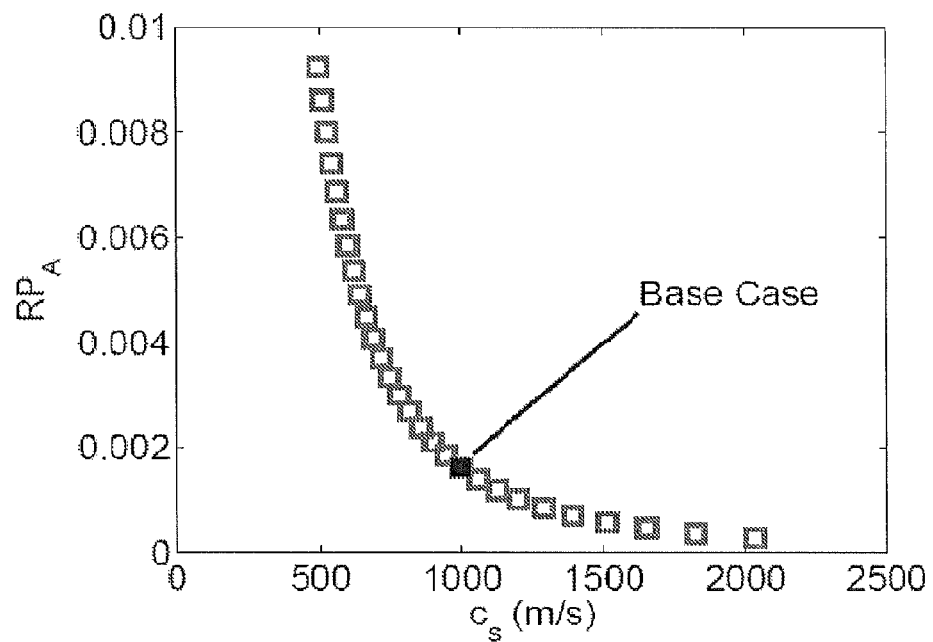
FIG. 11 illustrates the nonresonant dependence of refractive power, $RP_A$, on fluid sound speed, $c_s$.
Figure 12:
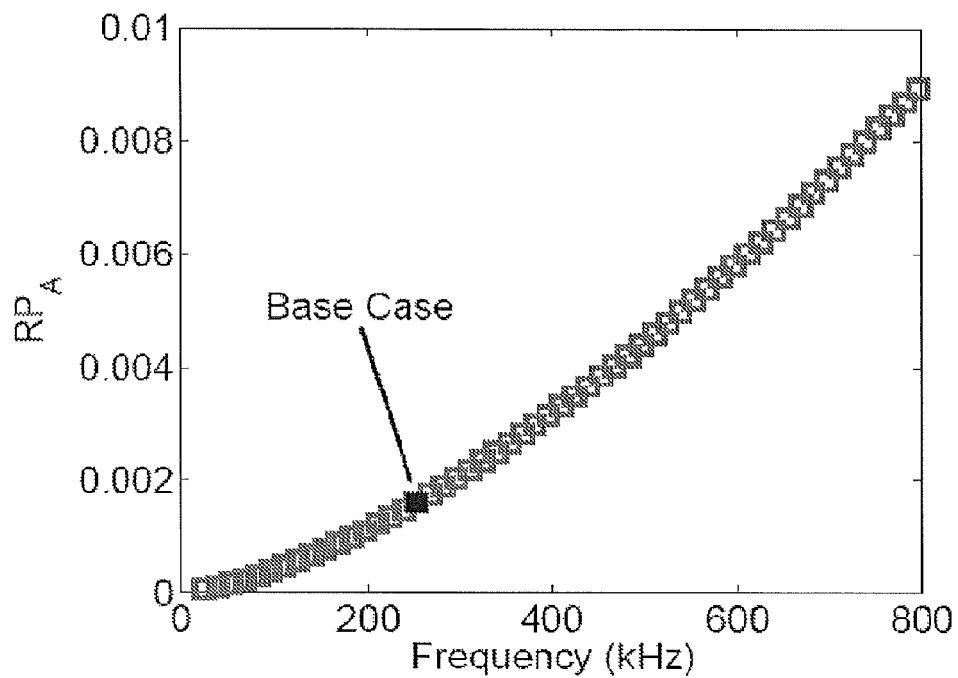
FIG. 12 illustrates the nonresonant dependence of refractive power on driving frequency $f=\omega/(2\pi)$.

The difference between the resonant and off-resonant driving conditions is found in the lens radius $r_0$, the sound speed $c_s$, and the driving frequency $\omega$. These dependencies are plotted in FIGS. 10-12. These parameters all exhibit opposite trends from resonant driving conditions. For best off-resonant performance, large radius lenses filled with low speed of sound fluids driven at high frequencies are desirable. This occurs because viscous damping no longer affects the refractive power. These results are expected because larger lenses vibrating at the same wall speed cause more acoustic power to be focused at the center of the lens 300, increasing refractive powers. Also, higher driving frequencies condenses the spatial oscillations in density, producing higher gradients in refractive index.

Looking at the values in Table II, it is evident that for off-resonant driving, both silicone oils, glycerol, and water all become viable fluid choices now that viscosity is unimportant. These fluids all have appreciable static refractive indices compared to nitrogen. The silicone oils are expected to have somewhat better performance over glycerol and water because of their low sound speeds.

Other Considerations

Preventing cavitation is another consideration involved in selecting a filling material other than simply maximizing the refractive power. If the pressure within the lens 300 drops below the vapor pressure of the fluid, then cavitation can occur, producing bubbles within the lens 300 that disrupt its optical capability. Specifically, this can happen when $$\rho_A > \rho_0 - p_v/c_s^2, \quad (41)$$

where $p_v$ is the vapor pressure of the fluid. There are a couple ways that cavitation can be avoided. First, one can choose a fluid with a low vapor pressure. Second, the lens 300 can be filled to a high static pressure.

Another danger in blindly maximizing the refractive power is that at high RP values, the model may break down. This is because the linearization performed above is only valid at relatively small amplitudes. Once the order of $\rho_A$ or $n_A$ becomes comparable to the order of $\rho_o$ or $n_0$, the linearization loses accuracy. It is likely that the general trends observed in this section will hold to some degree in the nonlinear regime, although the specific form of the dependence of refractive power on all the variables requires further analysis. It is possible to increase the domain of the linear regime by selecting fluids of large density. One should also note that the selection of $n_0$ does not affect the linearization of the fluid mechanics. Therefore, increasing the refractive power via increasing the fluid's refractive index will not endanger the fluid linearization, although it may endanger the Lorentz-Lorenz linearization. However, when the linear models no longer apply, it is still possible to obtain solutions via full numerical simulations.

The results of the predictive model are useful for optimizing the TAG lens design in terms of maximizing its ability to refract light in steady-state operation. A TAG lens 300 is most effective when it is long, filled with a fluid of high refractive index, and driven with large voltage amplitudes. If driving on resonance, lower frequencies, smaller lens radii, and fluids with larger sound speeds and lower viscosities enhance refractive power. Off resonance, higher frequencies, larger lenses, and lower sound speeds are preferred. Viscosity is irrelevant for nonresonant driving.

It is important to note that these choices are only best for optimizing the steady-state refractive power where the linear model is applicable. If wave amplitudes become too great, then a nonlinear model will be required, which could be implemented numerically. Also, different optimization parameters will occur if, for example, one wishes to optimize the TAG lens 300 for pattern switching speed or high damage thresholds—two of the potential advantages of TAG lenses over spatial light modulators.

The above modeling has been done in a circular cross-section geometry so as to model a TAG lens 300 capable of generating Bessel beams. Other geometries are also possible for creating complicated beam patterns. The natural example is that of a rectangular cavity, e.g., FIGS. 4A, 4B, in which the Bessel eigenfunctions would be replaced by sines and cosines. With other geometries that break the circular symmetry, it may also be possible to create Laguerre-Gaussian and higher-order Bessel beams. It has been shown that passing a Laguerre-Gaussian beam through an axicon creates higher-order Bessel beams. This same method can be implemented with the TAG lens 300 replacing the axicon to produce tunable higher order Bessel modes.

II. Determination of Voltage Signal to Create Specific Refractive Index Profile

In the linear regime, the cylindrical TAG lens 100, 300 has the potential to create arbitrary (non-Bessel) axisymmetric beams. By driving the lens 100, 300 with a Fourier series of signals at different frequencies, interesting refractive index distributions within the lens 100, 300 can be generated. This is because the lens 100, 300 effectively performs a Fourier-Bessel transform of the electrical signal into the index pattern. As this pattern will vary periodically in both space and time, it will be best resolved with a pulsed laser synchronized to the TAG lens 100, 300.

This section solves the inverse problem: determining what voltage signal is necessary to generate a desired refractive index profile. However, before directly tackling this question, it is easier first to find the response of the lens 100, 300 to a single frequency, and then to solve the forward problem addressed in the next section: determining the index profile generated by a given voltage input.

The first step of the procedure is to find the frequency response of the TAG lens 100, 300. A linear model of the TAG lens 100, 300 is assumed. That is, the oscillating refractive index created within the lens 100, 300 is assumed linear with respect to the driving frequency. Listed below are the single-frequency input signal and resulting output refractive index within the lens 100, 300.

$$V(t,f) = Re[\hat{V}(f)e^{2\pi i f t}] \quad (42)$$

$$n(r,t,f) = n_0 + Re[\hat{n}(f)J_0(2\pi k r)e^{2\pi i f t}]. \quad (43)$$

Here, f is the electrical driving frequency of the lens 100, 300, $n_o$ is the static refractive index of the lens 100, 300, V(f) is the driving voltage complex amplitude, and k is the spatial frequency given by $f/c_s$ where $c_s$ is the speed of sound within the fluid.

From this frequency response, a transfer function can be defined to relate the index response to the voltage input:

$$\Phi(f) \equiv \frac{\hat{n}(f)}{\hat{V}(f)} \in \mathbb{C}. \quad (44)$$

This transfer function can either be determined empirically, or through modeling, and accounts for both variations in amplitude and phase.

Forward Problem

For the forward problem, it is assumed that the lens 100, 300 is driven with a discrete set of frequencies at varying amplitudes and phase shifts. One could also phrase the problem in terms of a continuous set of input frequencies, however as is seen later, the solution to the discrete set will be more useful when dealing with the inverse problem.

An input signal of the form, $$V(t) = Re\left[\sum_{m=1}^{M} \hat{V}_m e^{2\pi i f_m t}\right], \quad (45)$$

is assumed where each $V_m$ is a given complex amplitude.

By linearity and the results of the frequency response in Eq. 43, the corresponding refractive index in the lens is known to be, $$n(r, t) = n_0 + \text{Re}\left[\sum_{m=1}^{M} \hat{n}_m J_0(2\pi k_m r) e^{2\pi i f_m t}\right]. \quad (46)$$

The coefficients $n_m$, can be determined from the frequency response to be, $$\hat{n}_m = \Phi(f_m)\hat{V}_m. \quad (47)$$

Eqs. 46 and 47 are the solution to the forward problem.

Inverse Problem

The inverse problem is to determine what input voltage signal, V(t), is required to produce a desired refractive index profile, $n_{goal}(r)$. From Eqs. 42 and 43, it is evident that the actual refractive index is a function of both space and time, while the input electrical driving signal is only a function of time. As a result, it is not possible to create any arbitrary index of refraction profile defined in both space and time, however it is possible to approximate an arbitrary spatial profile that repeats periodically in time. It will be assumed that the arbitrary profile is centered around the static index of refraction, $n_0$. The deviation of the goal from $n_0$ is denoted as $n_{goal}(r)$, and the frequency with which it repeats in time as $f_{rep}$.

Figure 13:
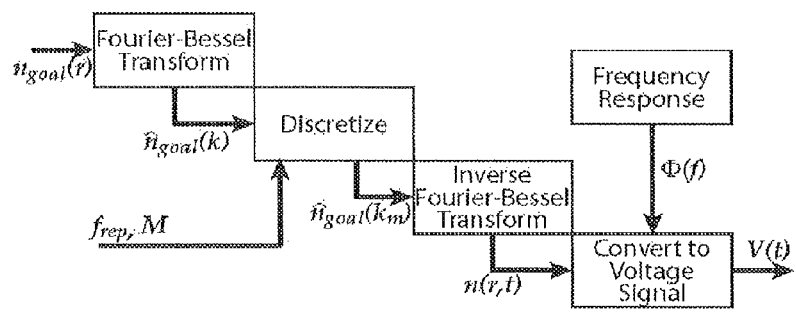
FIG. 13 schematically illustrates a flow chart of a process for solving the inverse problem of specifying the driving waveform required to produce a desired refractive index profile.

The procedure is depicted as a flow chart in FIG. 13. First, $n_{goal}(r)$ is decomposed into its spatial frequencies using a Fourier-Bessel transform. This result is then discretized so that only spatial frequencies that are integer multiples of $f_{rep}/c_s$ are included. Then, in order to write the index response in the form of Eq. 46, an inverse Fourier-Bessel transform is applied to the discrete series. This gives the coefficients $n_m$, which are used in conjunction with the frequency response to yield the required voltage signal in the frequency domain. Summing over all modes provides the final answer, V(t).

The first step is to decompose the desired index profile into its spatial frequencies using a windowed Fourier-Bessel transform because of the circular geometry of the lens 100, 300. Given $n_{goal}(r)$, $n_{goal}(k)$ can be computed as, $$\hat{n}_{goal}(k) = \int_0^{r_0} n_{goal}(r) J_0(2\pi r k) 2\pi r \, dr, \quad (48)$$

$$n_{goal}(r) = \int_0^\infty \hat{n}_{goal}(k) J_0(2\pi k r) 2\pi k \, dk. \quad (49)$$

$$n_{goal}(r,t) = \text{Re}[\int_0^\infty \hat{n}_{goal}(k) J_0(2\pi k r) 2\pi k \, e^{2\pi i f(k) t} dk], \quad (50)$$

where $r_0$ is the inner radius of the lens 100, 300, Depending on the desired index goal, $n_{goal}(r)$, this windowing may introduce undesirable Gibbs phenomenon effects near the edge of the lens 100, 300 if $n_{goal}(r)$ does not smoothly transition to zero at $r=r_0$. However, the significance of these effects can be reduced by either modifying the goal signal, extending the limit of integration beyond $r_0$, or simply using an optical aperture to obscure the outer region of the lens 100, 300.

From inverse-transforming it is known that, $$\hat{n}_{goal}(k) = \int_0^{r_0} n_{goal}(r) J_0(2\pi r k) 2\pi r \, dr, \quad (48)$$

$$n_{goal}(r) = \int_0^\infty \hat{n}_{goal}(k) J_0(2\pi k r) 2\pi k \, dk. \quad (49)$$

$$n_{goal}(r,t) = \text{Re}[\int_0^\infty \hat{n}_{goal}(k) J_0(2\pi k r) 2\pi k \, e^{2\pi i f(k) t} dk], \quad (50)$$

However, each of the spatial frequencies will oscillate in time at its own frequency given by $f=c_s k$. As a result, the goal pattern can only generated at one point in time. If this time is t=0, then the time dependent index of refraction will be given by, $$\hat{n}_{goal}(k) = \int_0^{r_0} n_{goal}(r) J_0(2\pi r k) 2\pi r \, dr, \quad (48)$$

$$n_{goal}(r) = \int_0^\infty \hat{n}_{goal}(k) J_0(2\pi k r) 2\pi k \, dk. \quad (49)$$

$$n_{goal}(r,t) = \text{Re}[\int_0^\infty \hat{n}_{goal}(k) J_0(2\pi k r) 2\pi k \, e^{2\pi i f(k) t} dk], \quad (50)$$

In practice, one would wish the goal index pattern to repeat periodically in time, as opposed to achieving it only at one instant in time. Therefore, the second step of the procedure is to discretize the spatial frequencies used so that the $n_{goal}(r)$ can be guaranteed to repeat, with temporal frequency $f_{rep}$. This is achieved by only selecting spatial frequencies that are multiples of $f_{rep}/c_s$. That is, it is assumed that, $$k \in \{k_m\}_{m=1}^M = \left\{m\frac{f_{rep}}{c_s}\right\}_{m=1}^M. \quad (51)$$

The upper limit, M, is set sufficiently large so that the contribution to $n_{goal}(r)$ is negligible from spatial frequencies higher than $Mf_{rep}/c_s$. It is also required that $n_{goal}(r)$ and $f_{rep}$ are chosen so that the contribution is negligible from spatial frequencies lower than $f_{rep}/c_s$ and so that the discretization accurately approximates the continuous function. The lower $f_{rep}$, the more accurately the discretization will reflect the continuous solution, however it also means that there will be longer intervals between pattern repetition.

This discretization changes the integral in Eq. 50 into a sum:

$$n(r, t) = n_0 + \text{Re}\left[\sum_{m=1}^{M} \hat{n}_{goal}(k_m) J_0(2\pi k_m r) 2\pi k_m e^{2\pi i f_m t} \Delta k\right], \quad (52)$$

where $\Delta k$ is the spacing between spatial frequencies, in this case given by $f_{rep}/c_s$. The third step of the procedure is to compute this sum. At this point, one should compare $n_{goal}(r)$ with n(r, 0) to ensure good agreement. If the agreement is poor, lowering $f_{rep}$, raising M, smoothing $n_{goal}(r)$, and continuing the integration in Eq. 48 beyond $r_0$ can all improve the approximation.

By comparing Eq. 52 with Eq. 46, it is evident that, $$\hat{n}_m = 2\pi k_m \Delta k \hat{n}_{goal}(k_m). \quad (53)$$

Using the frequency response in Eq. 47 and rewriting $k_m$ and $\Delta k$ in terms of $f_{rep}$, this expression can be used to find the voltage signal coefficients:

$$\hat{V}_m = \frac{2\pi m f_{rep}^2 \hat{n}_{goal}(k_m)}{c_s^2 \Phi(f_m)}. \quad (54)$$

The time domain signal is given by the same expression as Eq. 45, $$V(t) = \text{Re}\left[\sum_{m=1}^{M} \hat{V}_m e^{2\pi i f_m t}\right]. \quad (55)$$

Eqs. 54 and 55 represent the last step and solution to the inverse problem.

In fact, discretization is not absolutely necessary to provide this transformation. One can analytically perform the same functions resulting in a temporal spectrum of the voltage function. In this case, the equations presented above would replace summations and series with definite integrals. However, the resulting voltage function would not necessarily repeat periodically in time.

Figure 14:
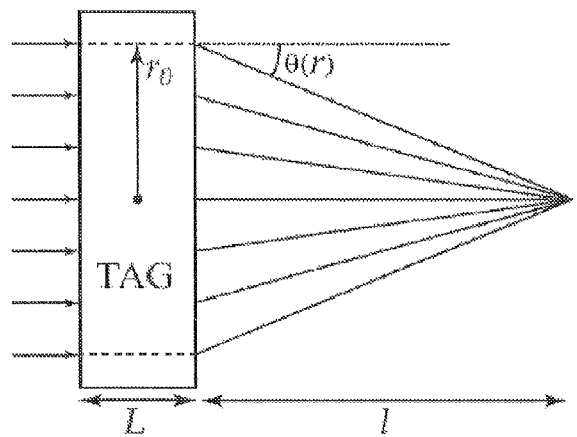
FIG. 14 schematically illustrates a ray diagram showing a TAG lens acting as a simple converging lens.

As a theoretical, exemplary problem, a simple converging lens with a specific focal length, l, is created, as shown in FIG. 14. Given this criteria, the goal is to determine the voltage signal to be supplied to the TAG lens 100, 300 so that it adopts this converging lens configuration with temporal period $t_{rep}$. The parameters for the TAG lens 100, 300 in this example are given in Table 3. For the sake of simplicity in illustrating the above procedure, a constant frequency response, $\Phi(f)$, is assumed. Note that in reality, $\Phi(f)$ would vary greatly with frequency near resonances within the lens 100, 300. However, since this affects only the last step of the procedure, the exact form of the function, while important for practical implementation, is unimportant here in demonstrating the solution process.

TABLE 3

Parameters used in the example inverse problem.

| Name | Symbol | Value |
| --- | --- | --- |
| Focal Length | l | 1 m |
| Temporal Period | $t_{rep}$ | 1 ms |
| Inner Radius | $r_0$ | 5 cm |
| Lens Length | L | 5 cm |
| Sound Speed | $c_s$ | 1000 ms$^{-1}$ |
| Transfer Func. | $\Phi(f)$ | 10$^{-2}$ V$^{-1}$ |
| Largest Mode | M | 300 |

The first step of this example is to determine the refractive index profile for a simple converging lens with this focal length. Using small angle approximations, the angle by which normally incident incoming rays should be deflected is given by, $$\theta_{goal}(r) = -r/l. \quad (56)$$

Figure 15:
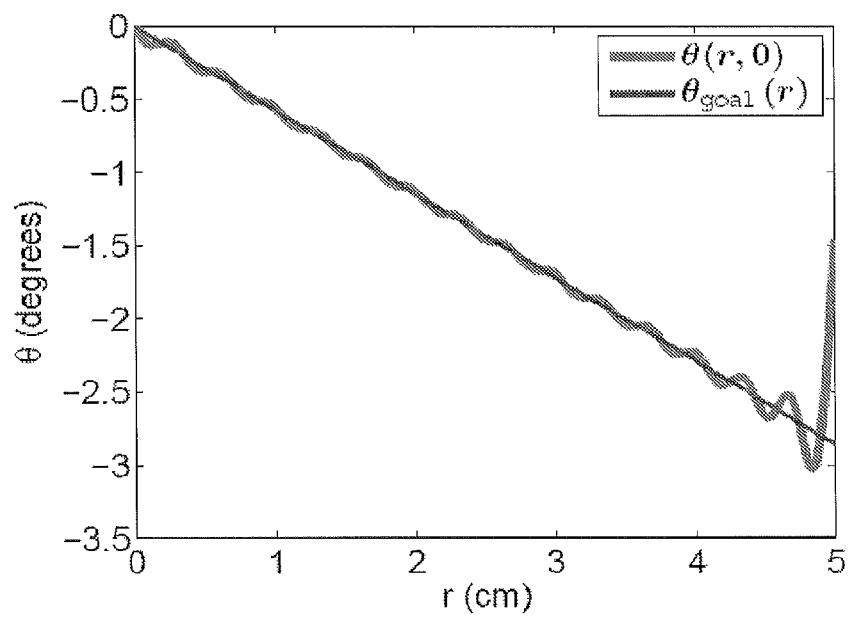
FIG. 15 illustrates both the goal and the actual deflection angle as a function of radius at time $t=0$.

This goal angular deflection is shown in FIG. 15.

The corresponding refractive index profile required to deflect rays by this angle is given by, $$n_{goal}(r) = \frac{1}{L}\int_0^r \theta_{goal}(r')dr' = -\frac{r^2}{2Ll}. \quad (57)$$

Figure 16:
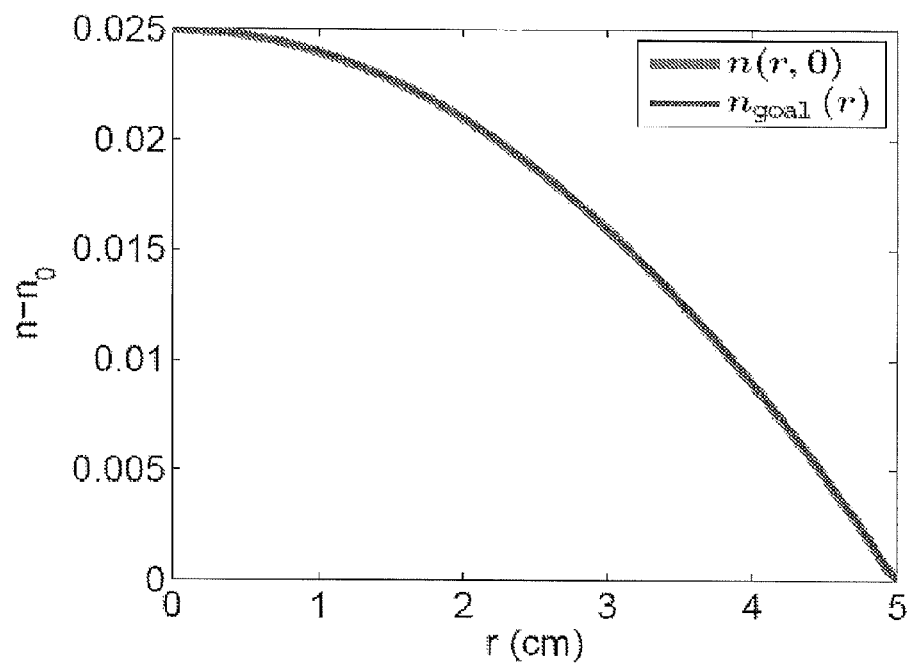
FIG. 16 illustrates both the goal and the actual refractive index as a function of radius at time $t=0$.

This function is plotted in FIG. 16. If the effective converging lens were to have a high numerical aperture, were optically thick, or were used in a situation where the small angle approximations were not accurate enough, then the goal refractive index would no longer be parabolic. However, the TAG lens could still be used to emulate the new goal function.

Figure 17:
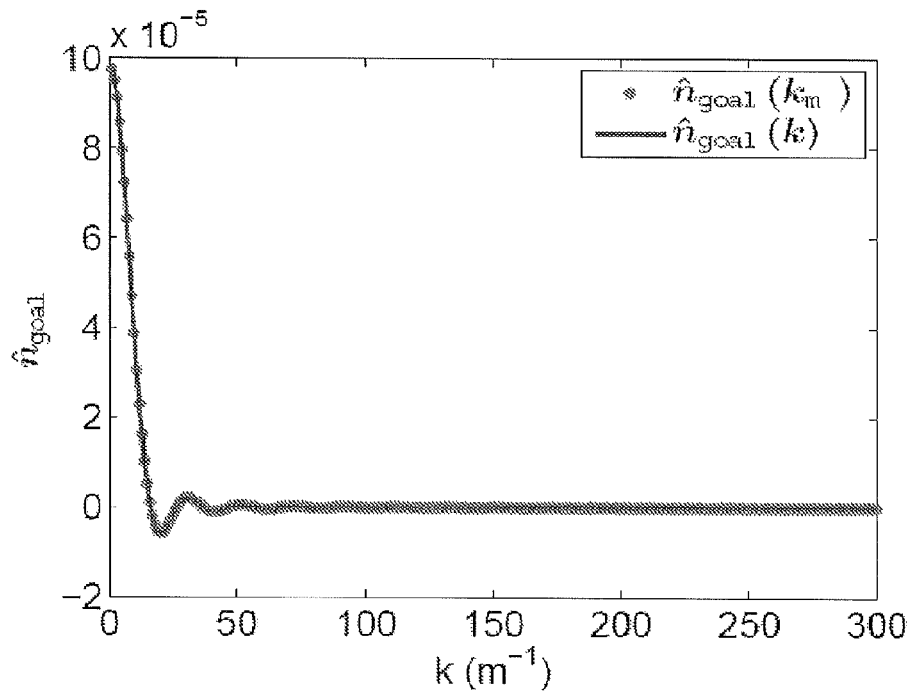
FIG. 17 illustrates both the continuous and discretized spatial frequencies of $n_{goal}(r)$.

The procedure described above is now followed to obtain V(t). Equation 48 is used to decompose the goal refractive index into its spatial frequencies. These spatial frequencies are then discretized with the lower bound and spacing between frequencies given by $f_{rep}=1/t_{rep}=1$ kHz. The upper bound is chosen to be 300 kHz, which corresponds to M=300. Both the continuous and discretized spatial frequencies are plotted in FIG. 17. The value of M was chosen large enough so that the actual angular deflection reasonably approximates the goal, as shown in FIG. 15.

The actual index of refraction at time t=0 is obtained from the discretized frequencies using Eq. 52 and is plotted in FIG. 16. Note the very good agreement between the goal and actual refractive index profiles. This good agreement is due to $f_{rep}$ being relatively small, and M being relatively large.

The angular deflection is obtained by differentiating the refractive index profile. This deflection is plotted in FIG. 15. Note that the discrepancy between the goal and actual angular deflections is amplified relative to the refractive index profile. This is because of the amplifying properties of the derivative. However, there is still good agreement between the goal and actual deflections, except at the edge of the lens 100, 300 where the Gibbs phenomenon can be observed because the refractive index does not smoothly transition to zero there. Better agreement could be achieved by choosing a larger M or smoothing out the desired index goal. In some situations, choosing a larger $t_{rep}$ would also be helpful.

Figure 18:
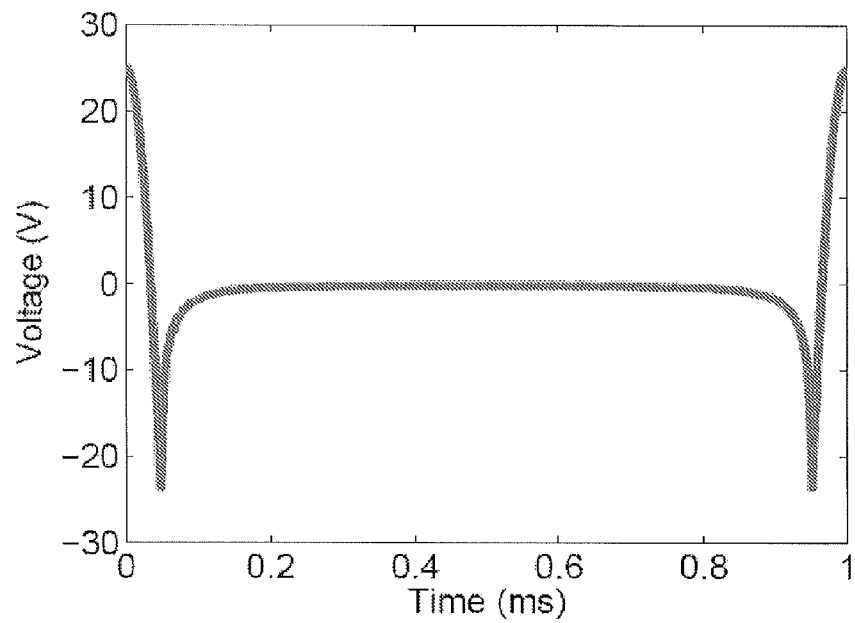
FIG. 18 illustrates one period of the time domain voltage signal required to generate the actual lensing effects portrayed in FIGS. 15 and 16.

Using Eqs. 54 and 55, the actual voltage signal to be generated by the controller 90, 390 can be computed. It is periodic with period $t_{rep}$. One period is plotted in FIG. 18. It is important to note that changes in $\Phi(f)$ can change the form of this function. This signal can be output from the controller 90, 390 to drive the lens 100, 300.

The above method to approximately generate arbitrary axisymmetric index patterns which repeat at regular intervals allows a cylindrical TAG lens 100, 300 to act as an axisymmetric spatial light modulator. If instead of a cylindrical geometry, a rectangular, triangular, hexagonal or other geometry were used for the TAG lens 200 with two or more piezoelectric actuators 210, then arbitrary two dimensional patterns may be approximated without the axisymmetric limitation. The only mathematical difference will be the use of Fourier transforms instead of using Fourier-Bessel transforms to determine the spatial frequencies. As such, the TAG lenses 100, 200, 300 may be used as a tunable phase mask (or hologram generator) or the adaptive element in a wavefront correction scheme.

Compared to nematic liquid crystal SLMs, TAG lenses 100, 300 can have much faster frame rates limited only by the liquid viscosity and sound speed. The frame rate of the theoretical example presented above was 1 kHz. If the voltage signal was not precisely periodic in time, but varied slightly with each repetition, then pattern variations could be achieved at this rate. This method used only steady state modeling, however with fully transient modeling even higher frame rates would be possible. Because of the simplicity and flexibility in the optical materials used in a TAG lens 100, 300, it is possible to design one to withstand extremely large incident laser energies. Due to its analog nature, TAG lenses also avoid pixilation issues.

In addition to their advantages, TAG lenses do have some limitations that may make SLMs more suitable in certain applications. Specifically, TAG lenses may work best when illuminated periodically with a small duty cycle, whereas SLMs are "always-on" devices. In some special cases, continuous wave illumination of TAG lenses may be acceptable if the index pattern in the middle of the cycle is not disruptive. Moreover, TAG lenses may be operated in modes other than that of a simple positive lens with fixed focal length, for example, in modes where multiscale Bessel beams are created.

III. Optical Analysis of Multiscale Bessel Beams

In this section multiscale Bessel beams are analyzed which are created using the TAG lens 300 of FIGS. 3A, 3B as a rapidly switchable device. The shape of the beams and their nondiffracting and self-healing characteristics are studied experimentally and explained theoretically using both geometric and Fourier optics. The spatially and temporally varying refractive index within the TAG lens 300 leading to the observed tunable Bessel beams are explained. As discussed below, experiments demonstrate the existence of rings, and the physical theory (geometric and diffractive) accurately predicts their locations. By adjusting the electrical driving signal, one can tune the ring spacings, the size of the central spot, and the working distance of the lens 300. The results presented here will enable researchers to employ dynamic Bessel beams generated by TAG lenses. In addition, this section discusses in detail how to tune the electrical driving signal to alter the observed patterns.

Figure 19:
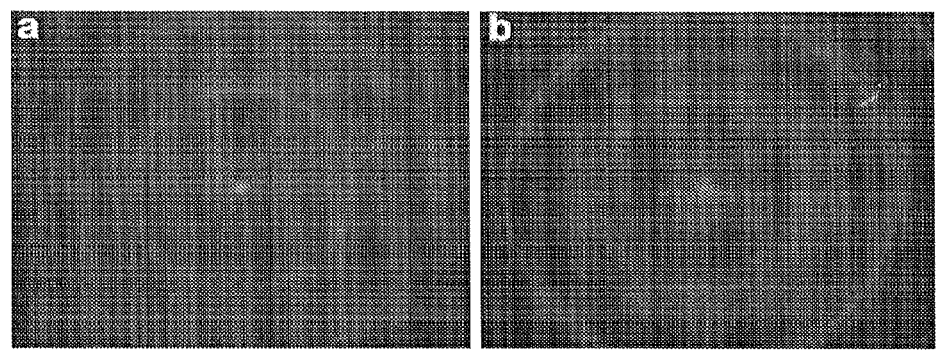
FIGS. 19A and 19B illustrate characteristic TAG-generated multiscale Bessel beams, with each figure showing two major rings plus the central major spot, FIG. 19A showing the pattern at a low driving amplitude (30 V) without minor rings and FIG. 19B showing the pattern at a higher driving amplitude (65 V) with many minor rings.

Experimentally, it has been observed that the TAG beam has bright major rings that may each be surrounded by multiple minor rings, depending on driving conditions (see FIG. 19). On the large scale, the periodicity of the major rings is that of the square of a Bessel function. When driven at a sufficiently high amplitude, minor rings become evident. The periodicity of the minor rings around the central spot is also given by the square of a Bessel function. Therefore, the TAG lens 300 beam can be thought of as a multiscale Bessel beam, i.e., one having at least one bright major ring surrounded by at least one minor ring. The images of FIGS. 19A and 19B are both taken 50 cm behind the lens 300 with driving frequency 257.0 kHz.

Figure 34:
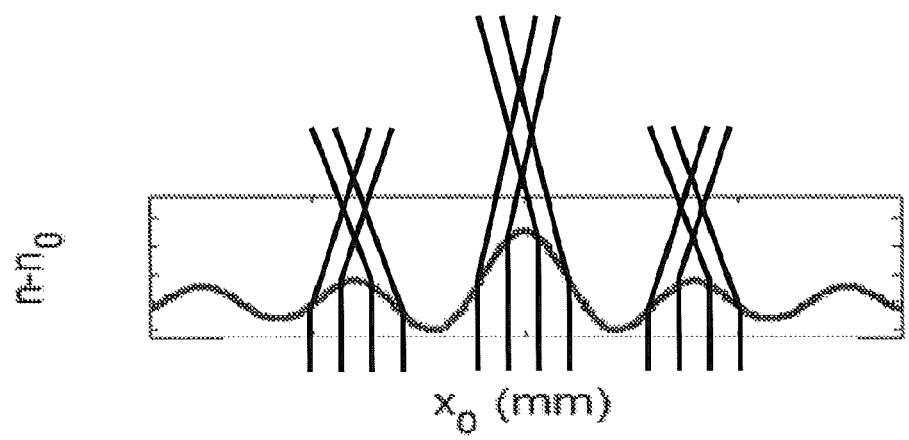
FIG. 34 schematically illustrates the index of refraction in a cylindrical TAG lens, which is a zeroth order Bessel function due to the acoustic wave in a cylindrical geometry and showing that as light enters this modulated-index field, it will be bent according to the local gradients.

As shown in FIG. 34, the density variations in the standing wave result in refractive-index variations that focus the light passing through the lens 300. The acoustic standing wave is created by an alternating voltage, typically in the radio-frequency range, applied to the piezoelectric element 310 by the controller 390. The relations between the drive frequency and amplitude, and the resulting refractive-index modulation, are nonlinear and complex, but are predictable as shown in section I.

Although the refractive-index variation induced by the voltage is small, the lens 100, 200, 300 is thick enough to allow significant focusing. Because the index variation is periodic, the TAG lens 100, 300 is able not only to shape a single beam of light, but in a rectangular configuration the TAG lens 220 can also take a single beam and create an array of smaller beams as do other adaptive optical devices.

The optical properties of the lens 300 are determined by a number of experimentally controllable variables. First and foremost, the geometry and symmetry of the lens 300 determine the symmetries of the patterns that can be established. For instance, a square shaped lens 200 can produce a square array of beamlets, while a cylindrical geometry can produce Bessel-like patterns of light. The density and viscosity of the refractive fluid, the static filling pressure, as well as the type of piezoelectric material, will all play a role in determining the static and dynamic optical properties of the TAG lens 300. These properties can be designed and optimized for different applications.

The two "knobs" that control the TAG lens 300 effect on a continuous (CW) beam are the amplitude and frequency of the electrical signal applied to the piezoelectric transducer 310. For a pulsed beam or detector, extra control is provided by the timing of pulse, as discussed in section V. The amplitude determines the volume of the sound wave and the corresponding amplitude of the index variation. Of course, there are fundamental limitations to how much index amplitude is possible due to the relatively small compressibility of liquids. However, the lens 300 does not need to be filled with a liquid at all. The physics of this device should work equally well on a gas, solid, plasma, or a multicomponent, complex material. The frequency of the drive signal determines the location of the maxima and minima in the index function. Multiple driving frequencies and segmented piezoelectric elements can be used to give full functionality to this device and enable creation of arbitrary patterns.

Figure 20:
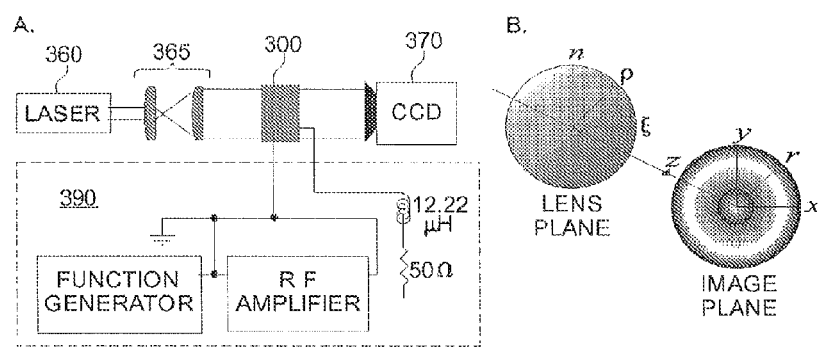
FIGS. 20A and 20B schematically illustrate an experimental setup used to study the TAG beam characteristics and the coordinate system utilized, respectively.

FIG. 20A depicts the experimental setup. The TAG lens 300 is primarily studied by illuminating it with a wide Gaussian beam of collimated 532 nm CW laser light. (Although in the next section the effects of pulsed illumination are discussed.) The intensity pattern produced by the lens 300 is then sampled at various distances using a ½" CCD camera 370 (Cohu 2622). In order to achieve intensity profiles as a function of radius, azimuthal averaging was used to filter out CCD noise. In order to observe the time dependence of the beam, a pulsed 355 nm laser with 20 ns pulse length is also used to strobe the pattern.

The TAG lens 300 has an inner diameter of 7.1 cm and a length of 4.1 cm including the piezoelectric element 310, contact ring 320, and gaskets 350, 352. The fluid used is 0.65 cS Dow Corning 200 Fluid (silicone oil), which has an index of refraction of $n_0=1.375$, and speed of sound of 873 ms$^{-1}$ under standard conditions. The TAG lens 300 is driven by a controller 390 comprising a function generator (Stanford Research Systems, DS345) passed through an RF amplifier (T&C Power Conversion, AG 1006). An impedance-matching circuit of the controller 390 is used to match the impedance of the TAG lens 300 at its operating frequencies with the 50Ω output impedance of the RF amplifier. A fixed component impedance matching circuit is used, which works well over the range 100 kHz-500 kHz. Most of the data presented here is acquired at a frequency of 257.0 kHz. If driven near an acoustic resonance of the lens 300, then the amplifier and impedance matching circuit are unnecessary, and this modified setup has been used to acquire data over larger frequency ranges. The data presented herein cover the range 250 kHz-500 kHz at amplitudes from 0-100 V peak-to-peak.

The driving parameters were chosen to best illustrate the multiscale nature of the Bessel beam. The TAG lens frequencies are chosen so that the lens 300 appears to be operating close to a single-mode resonance. Driving amplitude was chosen to provide well-defined major and minor rings for this example. The imaging distance for fixed-z figures was chosen to be approximately at the midpoint of the multi-scale Bessel beam.

The coordinate system used for presenting the theoretical calculations and experimental results is defined with z in the direction of the propagation of the light, x and y being transverse coordinates at the image plane, and $\xi$ and $\eta$ being transverse coordinates at the lens plane, as shown in FIG. 20B. The radial coordinates are given by $$r=\sqrt{x^2+y^2} \text{ and } \rho=\sqrt{\xi^2+\eta^2}.$$

Theory and Numerical Methods

The ultimate goal of the following theory is to describe the physics of light propagation through the lens 300, particularly in the case when coherent, collimated light is shone through it.

Refractive Index Profile

Figure 21:
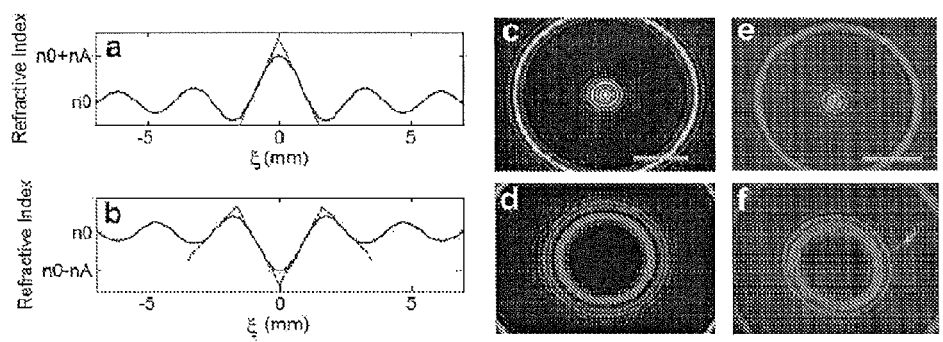
FIG. 21)

The first step in modeling the TAG lens 300 is to determine the index of refraction profile. It has been calculated in section I above that the refractive index within the TAG lens 300 is of the form, $$n(\rho, t) = n_0 + n_A J_0\left(\frac{\omega\rho}{c_s}\right)\sin(\omega t), \qquad (58)$$

assuming a low viscosity filling fluid (kinematic viscosity much less than the speed of sound squared divided by the driving frequency) with linearized fluid mechanics, where $n_0$ is the static index of refraction of the filling fluid, $\omega$ is the driving frequency of the lens 300, $c_s$ is the speed of sound of the filling fluid, and $\rho$ is the radial coordinate in the lens plane. This function is plotted in FIGS. 21A and 21B, at two different times. If driven on resonance, then the sine changes to a cosine, however as this section focuses on the standing waves within the cavity, and not on transient effects, the temporal phase shift is irrelevant.

The only parameter in Eq. 58 with some uncertainty is $n_A$. The modeling in section I estimates its value, however $n_A$ is very sensitive to a number of experimental parameters, most notably how close the driving frequency is to a resonance. Because of this high sensitivity and experimental uncertainty in some of the modeling parameters, here $n_A$ is treated as a fitting parameter, adjusting its value in order to achieve the best agreement between the theory and the experiments. This results in values for $n_A$ on the order of $10^{-5}$ to $10^{-4}$, in good agreement with modeling predictions of section I above.

It is important to note that the refractive index is a standing wave that oscillates in time. This time-dependent index is illustrated in FIGS. 21A and 21B. The theoretical predictions for the corresponding time-dependent patterns are presented in FIGS. 21C and 21D. Experimental images are also presented for comparison in FIGS. 21E and 21F. The experimental images were acquired by operating a pulsed 20 ns laser at a repetition rate synchronized to the TAG lens driving frequency. This synchronization was implemented so that the laser fired at the same relative phase in each period of the TAG lens oscillation, however the laser did not fire on every TAG period, resulting in effective laser repetition rates below 1 kHz. By adjusting the relative phase between the TAG lens 300 and the laser, one can shift the pattern from FIG. 21E to FIG. 21F and back to FIG. 21E. The phase delay between these two patterns corresponds to half the period of the driving signal of the TAG lens 300. As expected, one sees bright regions at local maxima in the refractive index, and dark regions at local minima. This time-varying nature of the beam presents interesting opportunities for generating annular patterns in pulsed-laser applications. The theoretical and experimental CW patterns presented in the remainder of this section are a time-average of the intensity patterns resulting from both upward and downward pointing index profiles (and the continuously varying intermediate profiles). As a result, major scale rings are observed with Bessel-squared periodicity.

Geometric Optics

The TAG lens 300 is modeled using the thin lens approximation, that is, a light ray exits the lens 300 at the same transverse location where it entered the lens 300. The conditions where this approximation is valid are examined below. Under the thin lens approximation, the phase transformation for light passing through a lens 300 is given by:

$$t_1(\xi,\eta) = \exp(ik_0(nL+L_0-L)), \quad (59)$$

where $k_0$ is the free-space propagation constant ($2\pi/\lambda$), $L_0$ is the maximum thickness of the lens 300, L is the thickness at any given point in the lens 300, and n is the index of refraction at any given point in the lens 300. Since the lens 300 is a gradient index lens, $L=L_0$ throughout the lens 300, and it is only n that varies transversally.

In some cases, it may be useful to express the phase transformation in Eq. 59 as the angle at which a collimated light ray would leave the lens 300. After having traveled through the bulk of the lens 300, but just before exiting, the equation for the wavefront is $k_0 n(\rho)(L_0+z)=\text{const}$. At this point, an incident light ray would have been deflected by an angle, $\theta$, that is perpendicular to the wavefront and is hence given by:

$$\tan(\tilde{\theta}(\rho)) = -\frac{L_0}{n(\rho)} \frac{dn(\rho)}{d\rho}, \quad (60)$$

assuming the thin lens approximation. To get the angle of a light ray leaving the lens 300, Snell's law is applied to the fluid-air interface (since the transparent window 330 of the lens 300 is flat, it has no effect on the angle of an exiting ray). This yields $\theta$, the angle that a ray will propagate after leaving the lens 300.

$$\sin(\theta(\rho)) = n(\rho)\sin(\tilde{\theta}(\rho)), \quad (61)$$

assuming that $n(\rho)/n_{air} \approx n(\rho)$. Applying small angle approximations to Eqs. 60 and 61 yields $$\theta(\rho) = -L_0 \frac{dn}{d\rho}. \quad (62)$$

In order to illustrate the physics behind the minor ring interference patterns created by the TAG lens 300, it is useful to consider a linear approximation to one of the peaks, as is shown in FIG. 21A. In this case, linearization about the inflection point of the central peak has been performed. A gradient index of refraction lens 300 with this linear profile is fundamentally equivalent to a uniform-index conical axicon. As long as the input beam completely covers the central peak, this approximation is valid and reproduces the key elements of the observed beam. However, if one apertured the lens 300 so that the input beam only covered the rounded tip of the central peak, then the linear/axicon approximation would not be sufficient, and a second-order parabolic approximation would be required.

The equivalence between the TAG lens 300 and an axicon can be shown quantitatively. To determine the angle that a light ray leaves an axicon, Snell's law is used:

$$\sin(\phi+\theta_{ax}) = n_0 \sin\phi. \quad (63)$$

Here, $\theta_{ax}$ is the angle from the z-axis that a light ray leaves the axicon, and $\phi$ is the angle between the z-axis and the normal to the output face of the axicon. The cone angle of this axicon is given by $\alpha=\pi-2\phi$. Substituting in for $\phi$ from Eq. 63, setting $\theta_{ax}=\theta$ from Eq. 62, and applying small angle approximations, it is possible to express the cone angle of the corresponding axicon in terms of the parameters of the linear gradient in index of refraction lens:

$$\alpha = \pi - 2\varphi = \pi - 2\left|\frac{L_0}{1-n_0}\frac{dn}{d\rho}\right|. \quad (64)$$

This equation forms the basis for the effects of tuning the lens 300 by changing the driving amplitude. Increasing the driving amplitude increases $dn/d\rho$ and is therefore identical to increasing the cone angle of the equivalent axicon.

Even though this model of the TAG lens 300 ignores the curvature of the refractive index, it does a good job of qualitatively explaining the visible features, and furthermore the experimental pattern around the central spot does closely resemble Bessel beams generated by axicons, as shown below in the section labeled "Beam characteristics". This model has so far neglected the time dependence of the refractive index. However, simulations show that the periodicity of the time-average pattern surrounding the central spot is closely approximated by the instantaneous pattern produced when the refractive index at the center of the lens 300 is at its peak. While not significantly shifting their positions, the time-averaging does decrease the contrast of the minor rings.

The major rings and their surrounding minor rings can be explained in a similar way. The only difference between these minor rings and those surrounding the central spot is that these rings are derived from circular ridges in the refractive index as opposed to a single peak. For example, the first major ring is established from the peaks highlighted in FIG. 21B, a half-period later in time with respect to the central spot from FIG. 21A. Due to the time-averaging CW nature of the imaging method, images such as FIG. 19 exhibit major rings at the locations of the peaks in FIG. 21A, as well as the peaks in FIG. 21B. The result is that the major ring locations have a Bessel-squared periodicity—the same periodicity as conventional Bessel beams.

Fourier Optics

Using the phase transformation for light passing through the lens 300 given by Eq. 59, the electric field of the light upon exiting the lens 300 is given by:

$$U_{TAG}(\xi,\eta) = t_1(\xi,\eta) U_0(\xi,\eta), \quad (65)$$

where $U_0(\xi,\eta)$ is the electric field of the light entering the lens 300.

In order to find the intensity profile at the image plane, the field $U_{TAG}(\xi,\eta)$ must be propagated using a diffraction integral. The Rayleigh-Sommerfeld diffraction integral is used in this simulation. The assumptions involved in this integral are that the observation point is many wavelengths away from the lens 300 ($r \gg \lambda$) and the commonly accepted assumptions of all scalar diffraction theories. The field at a distance z from the lens plane is given by:

$$U_{img}(x, y, z) = \frac{z}{i\lambda} U_{TAG}(\xi, \eta) \frac{\exp(ik_0 s(x, y, \xi, \eta))}{s^2(x, y, \xi, \eta)} d\xi d\eta, \quad (66)$$

where the integration is performed over the entire aperture of the lens 300 and $s(x, y, \xi, \eta)$ is the distance between a point $(\xi,\eta)$ on the lens plane and a point $(x, y)$ on the image plane, given by:

$$s = \sqrt{z^2 + (x-\xi)^2 + (y-\eta)^2}. \quad (67)$$

Computationally, the integral in Eq. 66 can be difficult to evaluate because the magnitude of $k_0$ (on the order of $10^7$ m$^{-1}$) leads to a phase factor in the integrand that varies rapidly in $\xi$ and $\eta$. Numerical approximations therefore require a sufficient number of points in the transverse directions to accurately represent the variation of this phase factor in the domain of interest. The closer the image plane to the lens plane, the more quickly that phase factor will vary (because s becomes more strongly dependent on $\xi$ and $\eta$ now that z is small), and the more points are required to accurately compute the integral. Note that the integral is a convolution as the integrand is a product of two functions, one of ($\xi,\eta$) and another of ($x-\xi$, $y-\eta$). In this study the convolution integral is computed using fast Fourier transforms (FFTs).

Finally, the intensity profile at the image plane is found from the electric field as follows:

$$I_{img}(x, y, z) = \frac{1}{2}\sqrt{\frac{\varepsilon_0}{\mu_0}} |U_{img}(x, y, z)|^2. \quad (68)$$

In the following section, all theoretical figures are obtained using this Fourier method, assuming a refractive index of the form of Eq. 58 and averaging many images corresponding to instantaneous patterns generated at different times within one period of oscillation.

Beam Characteristics

This section describes the characteristics of the TAG-generated time-average multiscale Bessel beam. The TAG beam characteristics are divided into two categories: the nature of the beam propagation and the ability to tune the beam. In each category, theoretical predictions, experimental results, and comparisons between the two are presented. The specific propagation characteristics are the beam profile, the axial intensity variation, the beam's nondiffracting nature, and the beam's self-healing nature. The parameters of the beam that are tunable include the major ring locations, the minor rings locations, the central spot size, and the working distance. Intensity values in all plots (except on-axis intensity) have been normalized so that the wide Gaussian beam (full width at half-maximum greater than 1 cm) incident to the TAG lens 300 has a peak intensity of 1.

Beam Propagation

Figure 22:
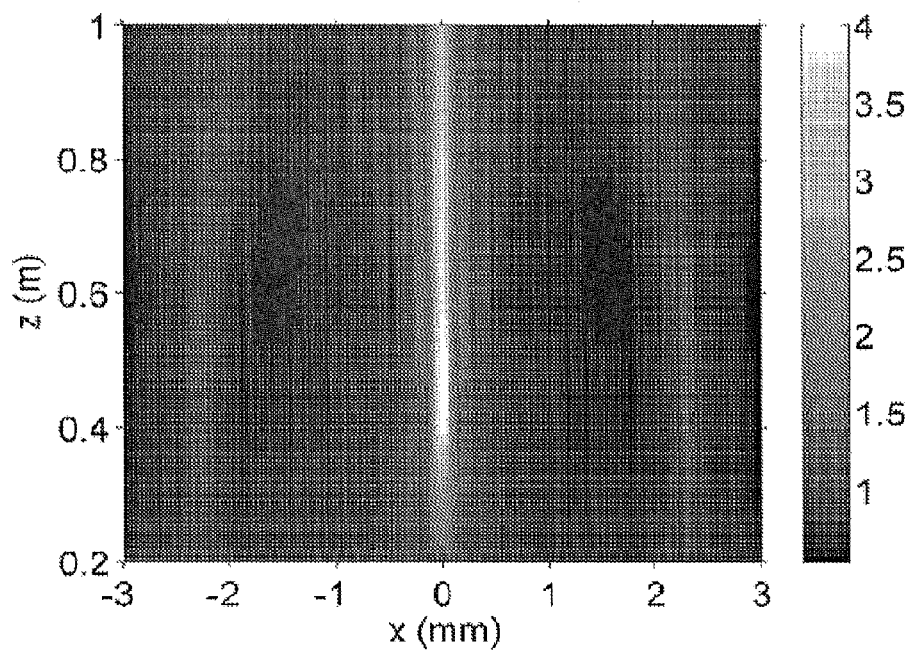
FIG. 22 illustrates the experimentally determined time-average intensity enhancement and propagation of the TAG central spot and first major ring with the lens driven at 257.0 kHz with an amplitude of 37.2 V, and with the x and z axes having significantly different scales—note the characteristic fringe patterns emanating from each peak in the index profile (cf.

The first important demonstration is that the lens 300 does produce a multiscale Bessel beam. FIG. 19 shows the multiscale nature of the intensity pattern, while FIG. 22 shows how the minor scale and first major ring of the experimental TAG beam propagate. Note that the central lobe of the beam propagates over a meter without significant diffraction—one of the key properties of a Bessel beam. No experimental method of creating an approximate Bessel beam creates a truly nondiffracting beam because all experimental methods limit beams with finite apertures, whereas a true Bessel beam is infinite in transverse extent.

Figure 23:
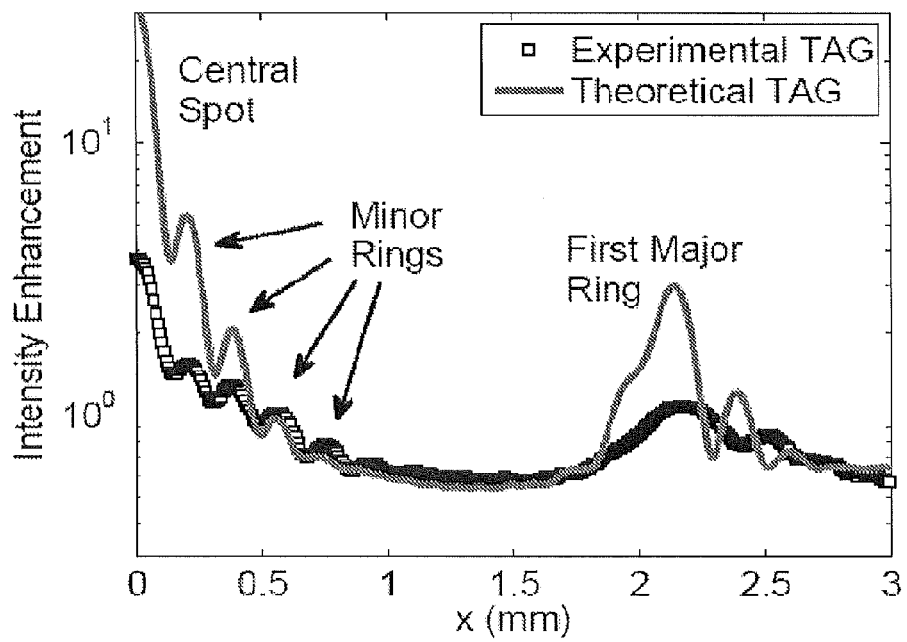
FIG. 23 illustrates the experimental and theoretical intensity profile of the TAG beam imaged 70 cm behind the lens showing that the fringe patterns extend similar to what one would expect from an axicon, with the lens driven at 257.0 kHz with an amplitude of 37.2 V, and for the theory, the value of $n_A$ is $4 \times 10^{-5}$.

An intensity profile of the multiscale Bessel beam is plotted in FIG. 23. This is a slice of FIG. 22, 70 cm behind the lens 300. One can observe four minor rings with radius less than 1 mm. The location of these rings is consistent between the experimental and theoretical curves, however the peak intensity is significantly lower in the experiment, most likely due to wavefront errors either from the incident beam or from scattering within the TAG lens fluid or windows. Another possible explanation is a discrepancy between Eq. 58 and the real system, perhaps because of nonlinear acoustic effects within the lens 300, or because of the excitation of higher order acoustic Bessel modes ($J_n(\ )$,n>0) because of slight nonuniformities in the piezoelectric. Despite this error in peak intensity, good theoretical-experimental agreement was found in the minor ring location by fitting $n_A$ from Eq. 58 to the experimental data. The resulting value of $n_A$ is $4\times10^{-5}$. Neglecting the intensity difference, the following figures will show that this single parameter fit accurately describes all the spatial characteristics of the observed TAG beam. Note that the location of the first major ring is accurately predicted by the model.

The minor ring fringes in FIG. 23 are similar to the fringes one would expect from an axicon. Performing the linear approximation illustrated in FIG. 21A, and using Eq. 64, the cone angle of the corresponding axicon is 179.5°. For many applications, cone angles close to 180° are used because of their long working distance and large ring spacing. Experimentally so far, equivalent cone angles as sharp as 178° have been achieved, however sharper cone angles can be achieved by increasing the thickness of the lens 300 ($L_0$) or further increasing the driving amplitude, which are both linearly proportional to the range of cone angles (Eq. 58). In addition, optimizing the driving frequency can lead to sharper effective cone angles by taking advantage of the acoustic resonances at certain frequencies.

Figure 24:
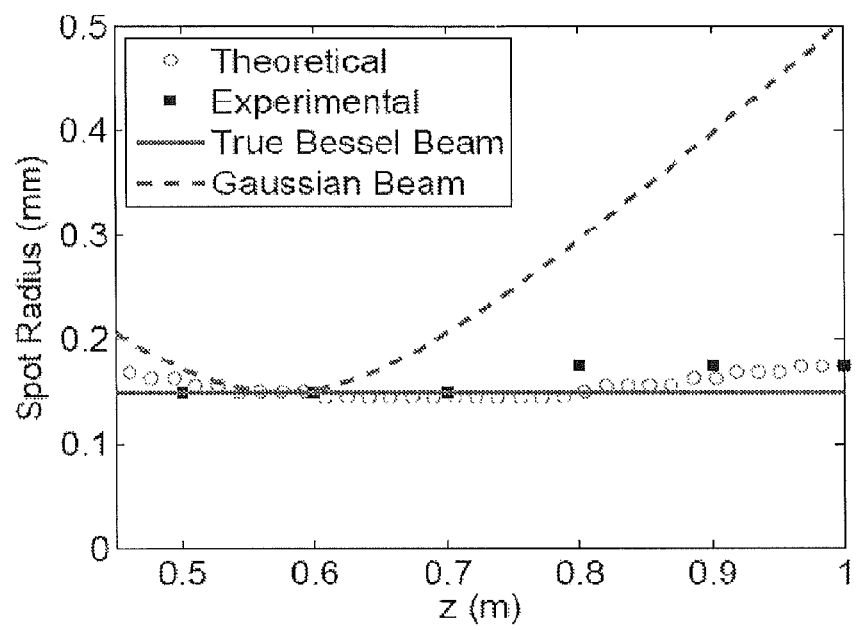
FIG. 24 illustrates the beam divergence of the theoretical TAG, experimental TAG, Gaussian, and exact Bessel beams, with the TAG and Gaussian beams achieve their maximum intensity approximately 58 cm behind the lens, all beams having the same beam width at this location, and with the TAG lens driven at 257.0 kHz with an amplitude of 37.2 V, and for the theory, the value of $n_A$ is $4 \times 10^{-5}$.

The essential characteristic of nondiffracting beams is that the transverse dimensions of the central lobe remain relatively constant in z. From FIG. 22, one can see that this is the case for the TAG beam. This property is plotted quantitatively in FIG. 24. Although the TAG beam does diverge in both theory and experiment because it is not an exact Bessel beam, this divergence is small compared to that of a Gaussian beam, and similar to that of an axicon-generated beam.

If a conventional collimated Gaussian beam is focused so that it has a minimum spot size (radius at which the electric field amplitude falls to 1/e of its peak value) of 150 μm at z=58 cm, then by the time the light reaches z=100 cm, the spot size will be more than 500 μm. In contrast, a TAG beam with this beam waist would only diverge to a size of 175 μm after this distance. This Gaussian beam waist is chosen to match the experimental width of the TAG beam at the location where the theoretical TAG beam reaches its peak intensity.

Figure 25:
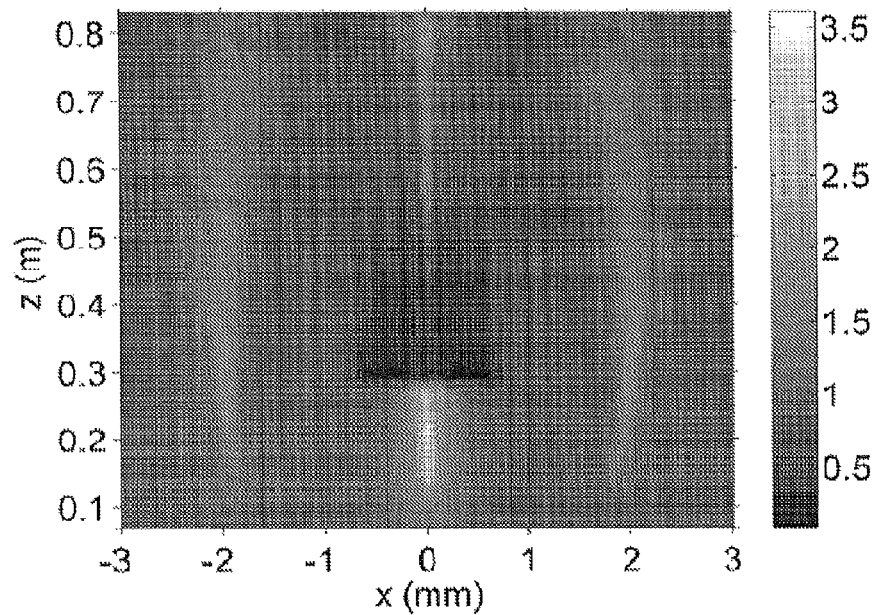
FIG. 25 illustrates propagation similar to FIG. 22 with a 1.25 mm diameter circular obstruction placed 27 cm behind the lens, with the TAG lens driven at 332.1 kHz with an amplitude of 5 V.

Apart from being nondiffracting, the other major feature of Bessel beams is their ability to self-heal. Because the wavevectors of the beam are conical and not parallel to the apparent propagation direction of the central lobe of the beam, the intensity pattern of Bessel beams is capable of reforming behind obstacles placed on-axis. This feature is experimentally demonstrated for a TAG beam in FIG. 25. An obstruction is placed slightly after the initial formation of the TAG minor scale Bessel beam. This obscures the beam for a short distance, however the Bessel beam eventually heals itself and reforms approximately 30 cm beyond the obstruction.

Tunability

One of the most innovative features about the TAG lens 300 is the ability to control the shape of the emitted beam. One can directly tune the major and minor ring sizes and spacings without physically moving any optical components. The major and minor scales of the Bessel beam are both adjustable because of the two degrees of freedom in the time-average pattern: the driving frequency and the driving amplitude. Changing the driving amplitude modifies only the minor scale, while changing the driving frequency excites different cavity modes and will affect both scales of the beam. Independent tunability of the major and minor rings is useful in applications such as optical tweezing for manipulating trapped particles relative to each other, laser materials processing for fabricating features of different size, and scanning beam microscopy for switching between high-speed coarse images and slow-speed high-resolution images.

Figure 26:
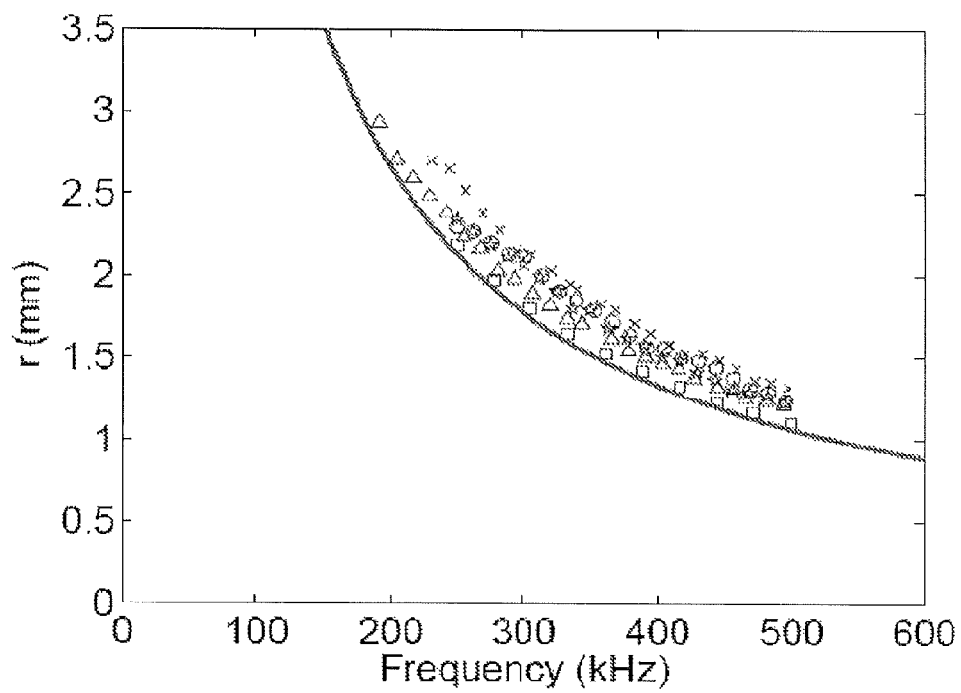
FIG. 26 illustrates experimental and theoretical locations of the first major ring as a function of driving frequency, with the solid line representing the theory given by Eq. 69, the squares representing this theory, but also account for deflection in optical propagation due to the asymmetry of the refractive index on either side of the major ring, and with the remaining symbols representing experimental results from various trials.

Tuning the major ring spacing can be achieved by modulating the driving frequency as shown in section I above. This is because the major rings occur near the extrema of $J_0(\omega\rho/c_s)$ from Eq. 58. Increasing the driving frequency compresses the major rings, while decreasing the driving frequency increases their spacing. The radial coordinate of the first major ring, $\rho^*$, is approximately given by $$\rho^* = \frac{3.832 c_s}{\omega}, \quad (69)$$

where 3.832 is the radial coordinate of the first minimum of $J_0(\rho)$. This function is plotted in FIG. 26, along with experimental measurements. Optical propagation slightly shifts the theoretical position of the intensity maximum relative to the index maximum because the refractive index profile is not locally symmetric between the inside and the outside of the first major ring. The experimental results agree closely to the predictions, however they do exhibit some variability between trials. This is attributed to different filling conditions of the prototype lens 300. When refilling the lens 300 between trials, small changes in the pattern are noticed, and also some azimuthal asymmetries. Any asymmetries represent the contribution of non-$J_0$ modes within the lens 300. These modes exhibit different radial index distributions and therefore result in slight shifting of the first major ring. The effects of changing the driving frequency on the minor scale pattern are complicated due to resonant amplitude enhancement at certain driving frequencies.

Figure 27A:
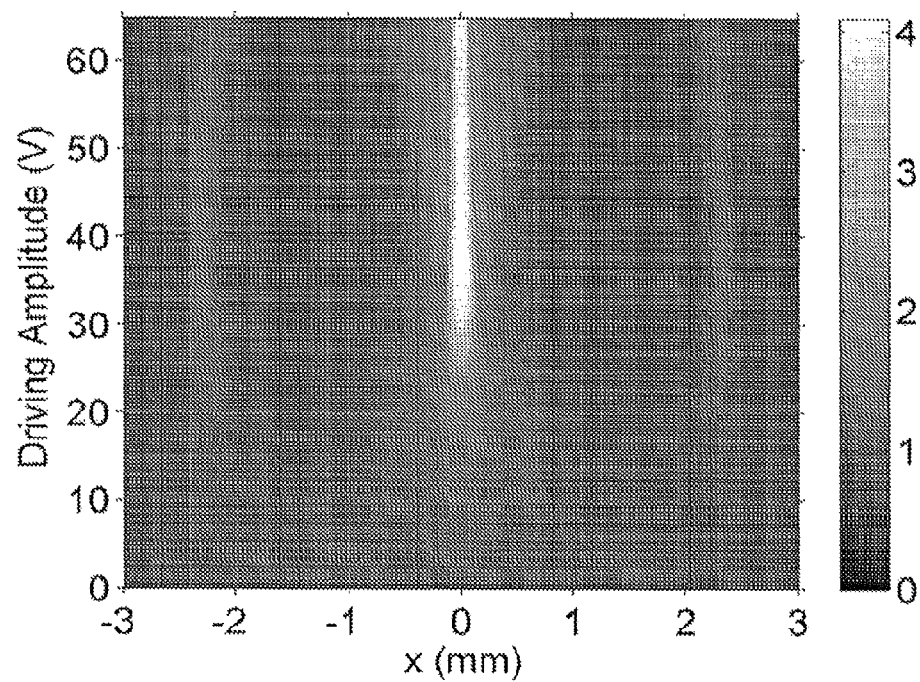
FIG. 27A illustrates experimental variation in the intensity enhancement 50 cm behind the lens as a function of driving amplitude, with the TAG lens driven at 257.0 kHz.
Figure 27B:
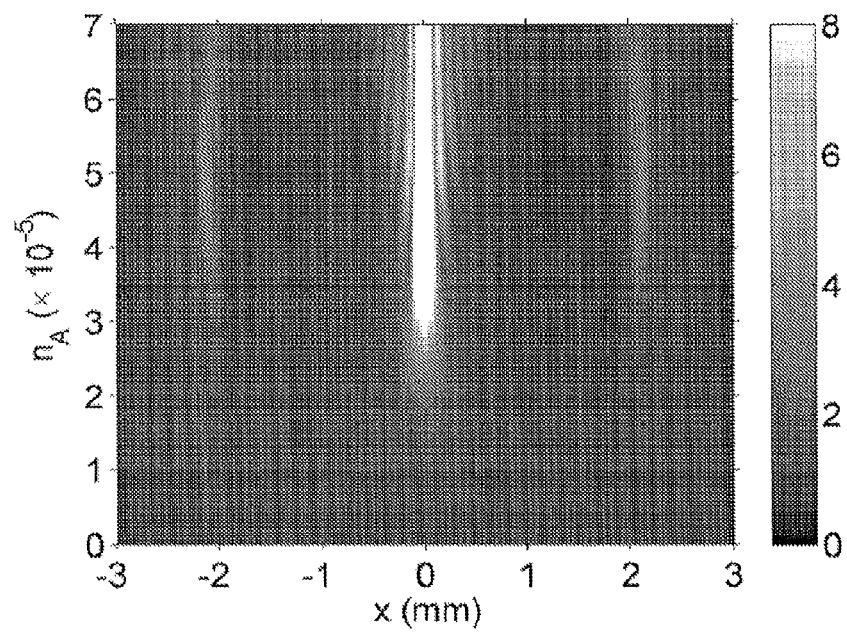
FIG. 27B illustrates theoretical variation in the intensity enhancement 50 cm behind the lens as a function of driving amplitude when driving the lens at 257.0 kHz, showing good agreement with FIG. 27A.

The continuous tunability of the minor Bessel rings is demonstrated experimentally (FIGS. 19A, 19B, 27A, 33A, 33B) and theoretically (FIG. 27B) by varying the driving amplitude of the TAG lens 300. The refractive index amplitude, $n_A$, is directly proportional to the driving voltage amplitude. This conclusion is qualitatively supported by the similarity between FIGS. 27A and 27B. The theoretical change in the pattern with increasing index amplitude closely resembles the experimentally observed change in the pattern with increased voltage amplitude.

Figure 28:
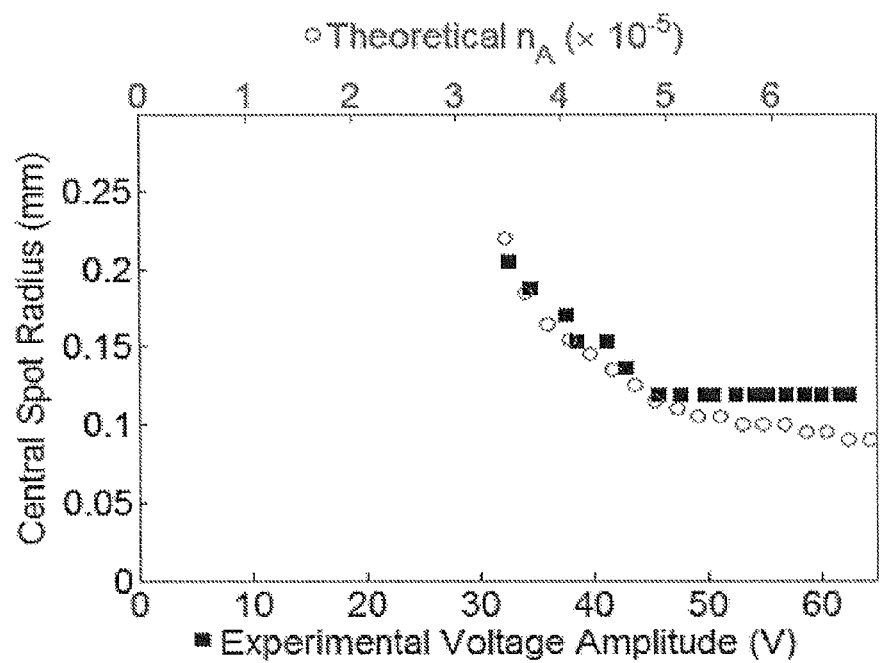
FIG. 28 illustrates an experimental and theoretical central spot size as a function of driving amplitude when the lens is driven at 257.0 kHz and the beam is imaged 50 cm behind the lens, with error bars representing the size of a camera pixel.

Increasing the driving amplitude increases the number of discernable minor rings (FIGS. 27A, 27B, 33B) and decreases the spacing between those rings (FIGS. 28, 33A) because it alters the angle that light rays surrounding a peak are deflected, similar to sharpening the cone angle of an axicon and increasing the spatial frequency of the resulting interference fringes. (Note in FIGS. 27A and 27B the grayscale map has been scaled down for clarity. The actual peak intensity is 51.) The range of plotted refractive index amplitudes corresponds (at this frequency) to equivalent cone angles from 180° (lens off) to 179°. Eventually, a large enough amplitude results in interference between the minor rings surrounding adjacent major rings. Driving amplitude does not affect the major scale beam because it does not alter which acoustic modes are excited within the lens 300. Such changes directly correspond to changing the axicon's cone angle.

The driving amplitude can also be used to tune the working distance. Here, the working distance is defined as the smallest distance behind the TAG lens 300 where a minor ring is observed surrounding the central peak (the distance until the start of the Bessel beam). This can be inferred from FIGS. 27A and 27B. At low amplitudes, the Bessel interference pattern is not apparent, implying that the working distance at these amplitudes is greater than 50 cm, the distance behind the lens 300 that these plots were obtained. As the driving amplitude increases, the working distance decreases, and the multiscale Bessel beam forms nearer the lens 300. This ability to tune working distance should be especially useful for dynamic metrological applications, such as those involved in long range straightness measurements. The TAG lens 300 would be helpful for using a single optical setup to very quickly switch between straightness measurements on the order of centimeters to straightness measurements on the order of hundreds of meters. In addition, being able to tune the long working distance of the Bessel beam should prove useful for scanning beam microscopy.

This section has modeled and experimentally characterized TAG-generated multiscale Bessel beams. This characterization has verified the refractive index model for the TAG lens 300 presented earlier. In addition, the connection between the minor scale of the TAG beam and refractive axicons has been established. The nondiffracting and self-healing characteristics of the TAG lens beam have been experimentally proven and theoretically justified. The ability to independently tune the major and minor scales of the beam through driving frequency and amplitude has also been presented, along with the tunability of the central spot size and working distance.

Because of this tunability, TAG lenses may be used in applications where dynamic Bessel beam shaping is required. In particular, applications include optical micromanipulation, laser-materials processing, scanning beam microscopy, and metrology and others.

Figure 43:
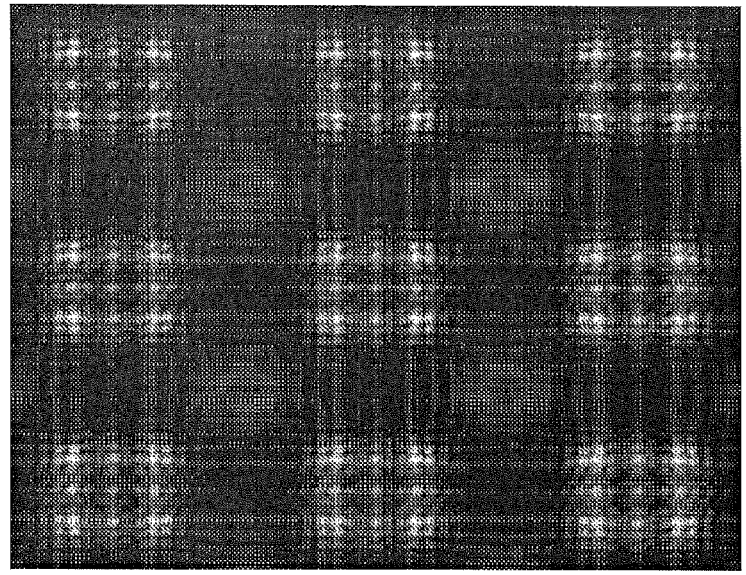
FIG. 43 illustrates a theoretical plot of an instantaneous pattern from a rectangular TAG lens driven at a frequency of 250 kHz, with the amplitude of the refractive index wave (both horizontal and vertical) being $3.65 \times 10^{-5}$.
Figure 44:
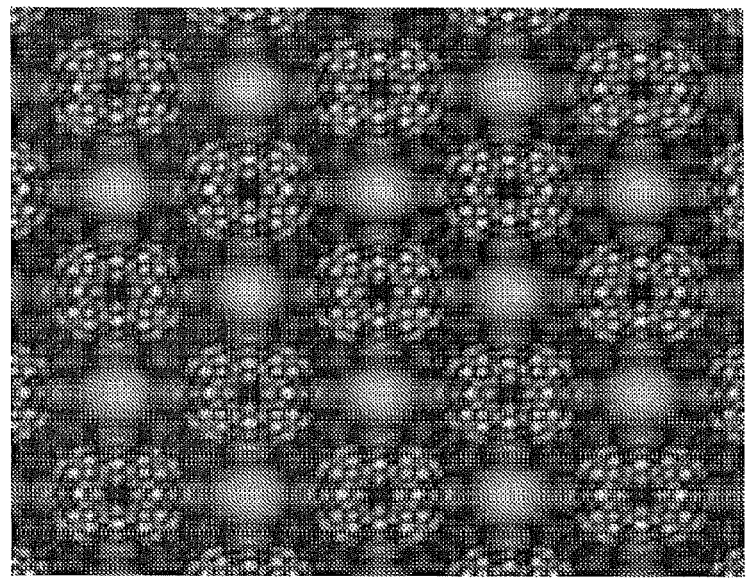
FIG. 44 illustrates the time-averaged pattern of the theoretical plot of FIG. 31.

If a similar analysis is performed for a TAG lens 200 with a square chamber, then instantaneous patterns such as those in FIG. 43 would be predicted, while time average patterns would look like those shown in FIG. 44. Indeed similar time-average patterns are seen experimentally (FIG. 42), if without the fine detail, due to system aberrations. One sees that this pattern is similar to that created by a square array of lenslets.

Justification for Approximation that TAG Lens is a Thin Lens

The TAG lens 300 can be approximated as a thin lens. This approximation is valid if a ray of light does not significantly deflect while passing through the lens 300. A corollary to this is that a ray experiences a constant transverse gradient in index of refraction throughout its travel within the lens 300. A specific definition for what it means for a deflection to be "significant" is provided below.

A bounding argument is used to justify the thin lens approximation. It can be shown that the actual transverse deflection of a ray passing through the lens 300 is less than the deflection predicted by a thin lens model, which is in turn much less than the characteristic transverse length scale: the spatial wavelength of the acoustic Bessel modes within the lens 300. This length scale is chosen because it implies that the deflected ray experiences a relatively constant gradient in refractive index while passing through the lens 300:

Let $|\delta|_{max}$ be the maximum deflection experienced by a ray. If the lens 300 is thin then the corresponding exit angle of the ray (before the fluid-window interface) is given by $\theta(\rho)$ from Eq. 60, reproduced here:

$$\tan(\tilde{\theta}(\rho)) = -\frac{L_0}{n(\rho)}\frac{dn(\rho)}{d\rho}. \tag{A1}$$

In the thin lens case, there is a one-to-one correspondence between the ray with the largest exit angle, $\theta_{max}$, and the ray with the largest deflection, $|\delta|_{thin,max}$. Furthermore, from Eq. A1, one can see that this ray passes through the region of the lens 300 with the greatest gradient in refractive index, $(dn/d\rho)_{max}$.

If the lens 300 was not a thin lens, light rays passing through it would deflect and therefore a single ray could not experience a refractive gradient of $(dn/d\rho)_{max}$ during its entire trip. In fact, in some regions it must experience smaller gradients, and hence the deflection of a ray passing through the same lens 300 with thick lens modeling would actually be smaller than calculated with thin lens modeling. The deflection predicted under the thin lens model, $|\delta|_{hrmthin,max}$, therefore serves as an upper bound for the true deflection, $|\delta|_{max}$.

Going back to the thin lens model, one can bound the transverse deflection based on the exit angle. The angle of the light ray monotonically increases as it passes through the lens 300 until it reaches the value of the exit angle. Hence, the total deflection, $|\delta|$, must be less than the length of the lens 300 times the tangent of the exit angle.

Putting all of the above inequalities together, one can now bound the total deflection in the lens 300 assuming a thick lens model:

$$|\delta|_{max} < |\delta|_{thin,max} < |L_0 \tan(\tilde{\theta}_{max})| = \left|-\frac{L_0^2}{n_{min}}\left(\frac{dn}{d\rho}\right)_{max}\right|. \tag{A2}$$

One can easily compute the value of the term on the right hand side of Eq. A2. If this turns out to be much less than the spatial wavelength of the acoustic fluid mode, then one can conclude that the TAG lens 300 is a thin lens. For the patterns studied here, the spatial wavelength of the acoustic mode is approximately 3 mm. For $n_A 4 \times 10^{-5}$ (best fit value from experimental data), the maximum gradient in index of refraction is 0.043 $m^{-1}$. Eq. A2 then gives $|\delta|_{max} < 50$ µm, which is much less than 3 mm. Therefore the thin lens approximations made throughout this section are justified, and one can build on the results of this section to exploit TAG lenses to effect dynamic pulsed-beam shaping.

IV. Dynamic Pulsed-Beam Shaping

The ability to dynamically shape the spatial intensity profile of an incident laser beam enables new ways to modify and structure surfaces through pulsed laser processing. In one of its aspects, the present invention provides a device and method for generating doughnut-shaped Bessel beams from an input Gaussian source. The TAG lens 100, 300 is capable of modulating between focused beams and annular rings of variable size, using sinusoidal driving frequencies. Laser micromachining may be accomplished by synchronizing the TAG lens to a 355 nm pulsed nanosecond laser. Results in polyimide demonstrate the ability to generate adjacent surface features with different shapes and sizes.

Figure 29:
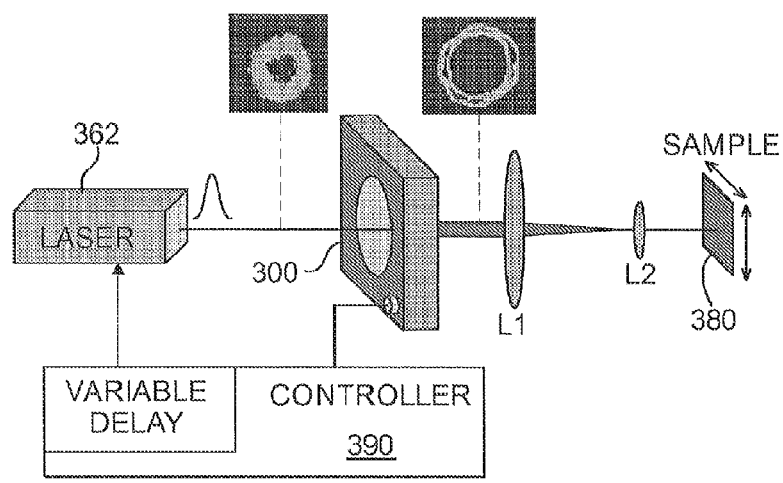
FIG. 29 schematically illustrates an experimental setup with a pair of lenses $L_1$ and $L_2$ forming a telescope to reduce the size of the beam for micromachining, and with the delay between the AC signal and the laser pulse set by a pulse delay generator, the inset image on the left showing the spatial profile of the incident Gaussian beam, and the inset image on the right showing the resulting annular beam after passing through the TAG lens.

The experimental setup used for dynamic pulsed-beam shaping is shown in FIG. 29. The light source is a Nd:YVO$_4$ laser 362 (Coherent AVIA) delivering 15 ns duration pulses at a 355 nm wavelength and maximum repetition rate of 250 kHz. The output beam has a Gaussian profile, with a measured diameter of about 3.5 mm at $1/e^2$ and an $M^2$ approximately 1.3. The beam is directed into the 3.5 cm radius TAG lens 300 of FIGS. 3A, 3B filled with silicone oil (0.65 cS Dow Corning 200 Fluids). The controller 390 comprising a wave-function generator (Stanford Research Systems Model DS 345) provides a radio frequency (RF) sinusoidal signal between 0.33 and 1.20 MHz to drive the piezoelectric crystal, generating vibrations inside the silicone oil, though other signals than a single frequency sinusoid may be used, such as a sum of two or more sinusoids of differing frequency, or a Fourier series per Eqs. 54 and 55, for example. The refractive index of the TAG lens cavity continuously changes with the instantaneous value of the AC signal.

Synchronization of the laser 362 and TAG lens 300 is accomplished using a pulse delay generator triggered off the same AC signal. A pulse delay generator (Stanford Research Systems Model DG 535), which may be provided as part of the controller 390, is programmed to provide a specific phase shift from the trigger signal that can be much greater than $2\pi$. In this way, it is possible to synchronize the laser pulses with the TAG lens 300 so that each pulse meets the lens 300 in the same state of vibration. Because the phase shift is greater than one period, the effective repetition rate of the laser pulse can be arbitrarily controlled within the specifications of the laser source.

For micromachining, the size of the shaped laser beam is reduced by a pair of lenses, $L_1$, $L_2$, with focal lengths of 500 mm and 6 mm respectively. The demagnified laser beam illuminates the surface of a thin layer (about 4.7 µm) of polyimide coated on a glass plate 380, which is mounted on an x-y-z translation system. Photomodified samples are then observed under an optical microscope and characterized by profilometry.

Results, Instantaneous Patterns (Basis)

There are three main parameters of the TAG lens 300 that affect the dimensions and shapes of the patterns that can be generated: the driving amplitude, the driving frequency, and the phase shift between the driving signal and the laser trigger. For this section, attention focuses on simple shapes including annuli and single spots, although the TAG lens 300 is capable of more complex patterns. These instantaneous patterns are denoted herein as the "basis". In general, the frequency affects the diameter of the ring, the amplitude affects the sharpness and width of the rings. The phase selects the nature of the instantaneous pattern. For instance, when the index of refraction is at a global maximum in the center, the instantaneous pattern is a spot, but at half a period later when it becomes a global minimum, the instantaneous pattern is doughnut or annular shaped.

Figure 30:
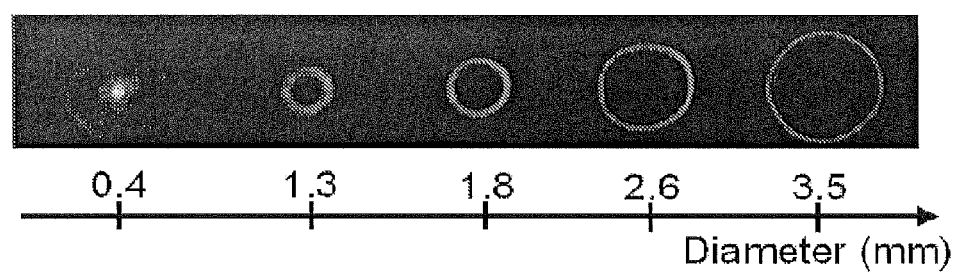
FIG. 30 illustrates intensity images of instantaneous patterns obtained by changing the TAG lens driving frequency, with pictures taken at a distance of 50 cm away from the lens, and frequencies from left to right of 719 (bright spot), 980, 730, 457, 367, 337 kHz and amplitude of the driving signal fixed at 9.8 V peak to peak; the ring diameter listed at the bottom, and there is a half a period phase shift between the spot and the ring pattern.

In FIG. 30, a few elements of the basis are presented. These patterns are acquired 50 cm away from the TAG lens 300 but without the reducing telescope lenses $L_1$ $L_2$. Rings with various diameters, ranging over an order of magnitude from a single bright spot to about 4 mm dimension are obtained. Different driving frequencies ranging from 0.33 to 1.29 MHz are used to generate the annular shapes shown in the figure with fixed amplitude (9.8 V peak to peak) and phase angle chosen to optimize the ring shape. For high throughput micromachining, one would use this basis to define a lookup table that establishes the correspondence between driving amplitude, frequency, phase shift and the observed instantaneous intensity distribution. A slight eccentricity in the micromachined rings is noted due to minor imperfections and nonuniformities in fabricating the piezoelectric tube 310. Furthermore, these asymmetries depend on the driving frequency due to resonance behavior in the tube 310. The configuration of the TAG lens 100 of FIGS. 1A, 1B may cancel this unwanted effect.

Sample Micromachining

The TAG lens 300 is capable of high energy throughput without damage and can therefore be used for pulsed laser micromachining. FIGS. 31A, 31B demonstrates this point for a polyimide film. In this case, the incident laser energy on the sample is 8.2 µJ and the driving frequency is 700 kHz resulting in a 15 µm diameter ring in the film. Calculating the actual fluence is difficult because the background of the beam, although subthreshold, still carries significant energy as expected for a Bessel-like beam. A profilometry analysis of the irradiated polyimide thin film shows a well defined annular structure with depth of 0.9 µm and a width of approximately 3.5 µm. Additional studies could be performed to assess the heat affected zone surrounding the laser-induced structures using these non-traditional intensity profiles.

Figure 32:
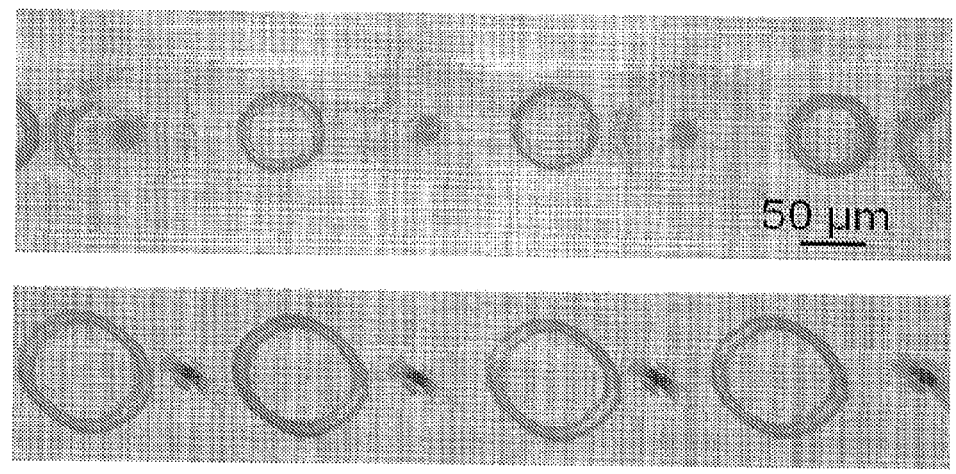
FIG. 32 illustrates a different intensity distribution at each laser spot, with a two pattern basis and demagnification of 50× used, and with the lens is driven at 989 kHz in the upper image and driven at 531 kHz in the lower image.
Figure 33A:
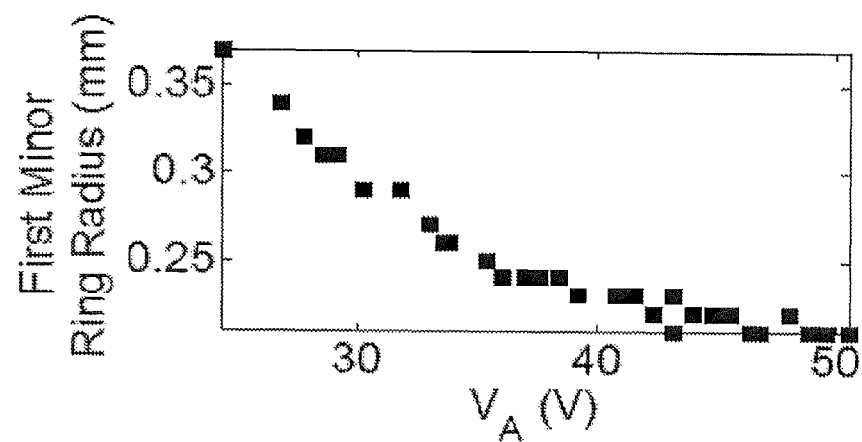
FIGS. 33A and 33B illustrate the relation between driving voltage, and ring radius, FIG. 33A, and number of rings, FIG. 33B.
Figure 33B:
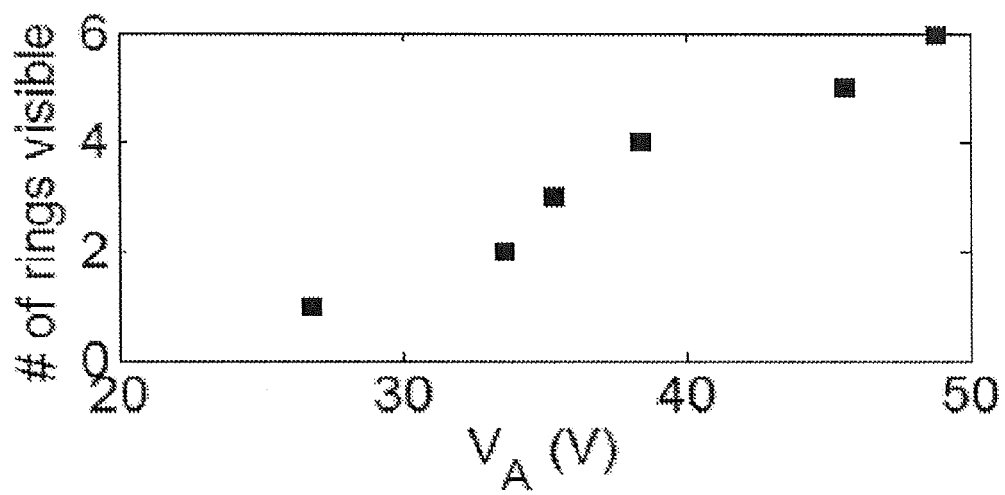

In contrast to many other methods of producing annular beams, the TAG lens 300 gives the added ability to rapidly change the pattern according to the structure or pattern required. To demonstrate this effect, FIG. 32 gives an example of adjacent laser-induced surface structures that alternate between a central spot and an annular beam. For this figure, the two basis elements are selected by varying the phase shift such that the index function is at either a maximum or minimum while the substrate is manually translated. In the upper image of the figure, a driving frequency of 989 kHz is used. The bright central spot shows indication of a second ring that causes damage to the polyimide film. However, when driven at lower frequencies as in the lower image (531 kHz), one is able to obtain single spots in the image. This effect can be ameliorated by better optimization of the phase shift and amplitude in order to maximize the energy difference between the central spot and the outer rings. Furthermore, aperturing or reducing the size of the beam incident on the TAG lens 300 can be used to remove unwanted outer rings.

Switching Time of the TAG Lens

The ability to switch rapidly between two distinct intensity distributions is a key parameter in evaluating the relevance of a beam shaping strategy for micromachining or laser marking purposes. When using a TAG lens 100, 200, 300, two situations have to be considered. Either the elements of the basis can be reached by driving the TAG lens 300 at a single frequency (FIG. 32), or the lens 300 may be operated at different frequencies, as illustrated in FIG. 30.

When all the desired shapes can be generated by using the same lens driving frequency, the theoretical minimum switching time is given by half of the driving signal period. In FIG. 32, the TAG lens 300 was driven at a frequency of 989 kHz (upper picture) and 531 kHz (lower picture) implying that toggling times between two adjacent patterns are theoretically as short as 0.5 µs and 0.9 µs, respectively, or twice the driving frequency. This converts to a switching frequency of approximately 1-2 MHz. Although these values are too low for optical communication and switching requirements, these rates are more than sufficient for pulsed laser processing.

In the case that frequency changes are needed, the minimum amount of time required to switch the pattern is equal to the amount of time it takes to propagate the sound wave from the piezoelectric to the center of the lens 300. This is denoted as the TAG lens 300 response time. The instantaneous pattern is established at this time, followed by a transient to reach steady state. In the context of pulsed laser processing, it is the response time that is the relevant test of lens speed. As an example, considering the sound velocity in the silicone oil to be about 900 ms$^{-1}$ and a radius of 3.5 cm for the lens 300, the response time is as short as 40 µs. However, by changing temperature or the refractive filling fluid, the speed of sound can be increased and the response time can be significantly decreased.

Figure 39:
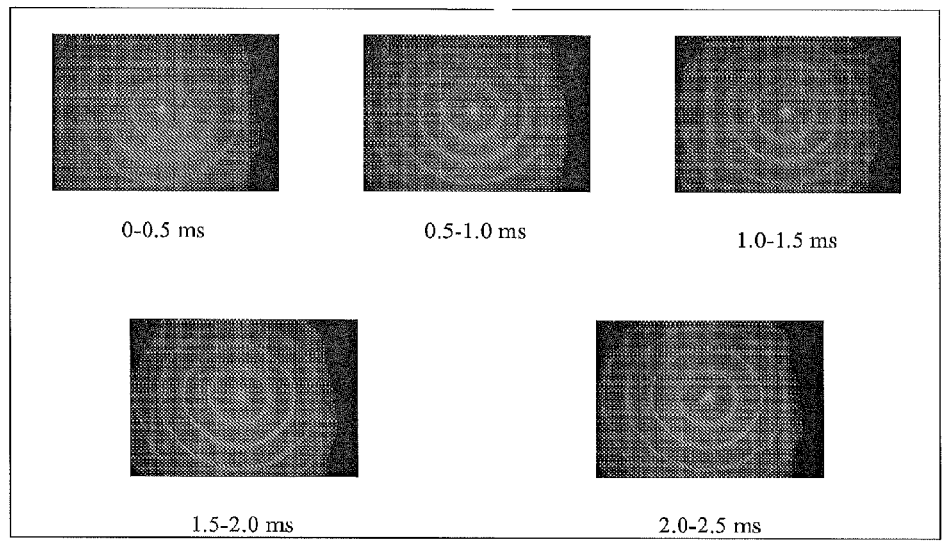
FIG. 39 illustrates images of a Bessel beam taken 70 cm behind the lens of FIGS. 3A, 3B to illustrate the time from which the driving frequency is first changed to which the beam reaches a steady state, with the driving frequency being 300 kHz and amplitude 60 $V_{p-p}$, and each image exposed for 0.5 ms.

The effects of transients in the output of the TAG lens 300 to reach steady state using the silicone oil with a viscosity of 0.65 cS are relatively fast ranging from 2-3 ms is shown in FIG. 39. The first picture in the upper left hand corner shows the TAG output when the driving frequency is first turned on. Within the first 0.5 ms, the pattern begins to establish a bright central spot with emerging major rings. These rings continue to sharpen over the next 0.5 ms as does the central spot. After 1 ins, the minor rings begin to form and continue developing for the next 0.5 ms. Finally after 2.0 ms, the pattern remains steady.

Figure 40:
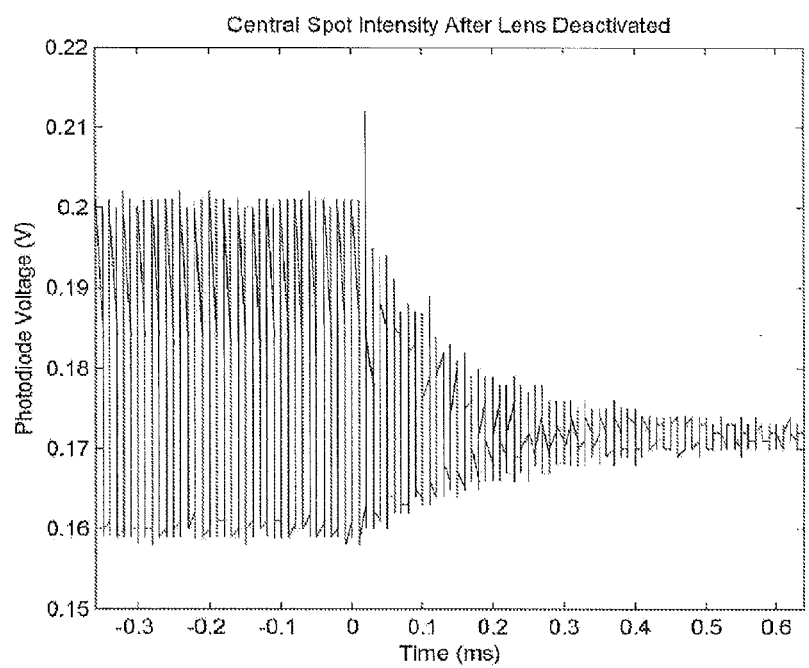
FIG. 40 illustrates the intensity of a TAG lens generated beam with respect to time after the driving voltage is switched off at t=0.

To gain more precise information about the time needed to reach steady state, a high speed photodiode was used to measure the intensity of the central, spot. FIG. 40 illustrates this measurement as the lens 300 is turned off and the acoustic wave dissipates in glycerol. The TAG lens's driving voltage is set to zero at t=0. The liquid in the TAG lens 300 was replaced with glycerol although results with the silicone oils were also obtained. The plots are similar but, due to viscosity differences, have different time scales. At negative times, the lens 300 is operating in the steady state producing the oscillatory behavior discussed in Section I. Once the driving frequency is shut off, the oscillations rapidly decay toward the constant value. The decay time is quantified by extracting the time for the voltage to decrease to 1/e of the initial steady state. FIG.

41 shows these results for different filling liquids and different initial driving frequencies.

Figure 41:
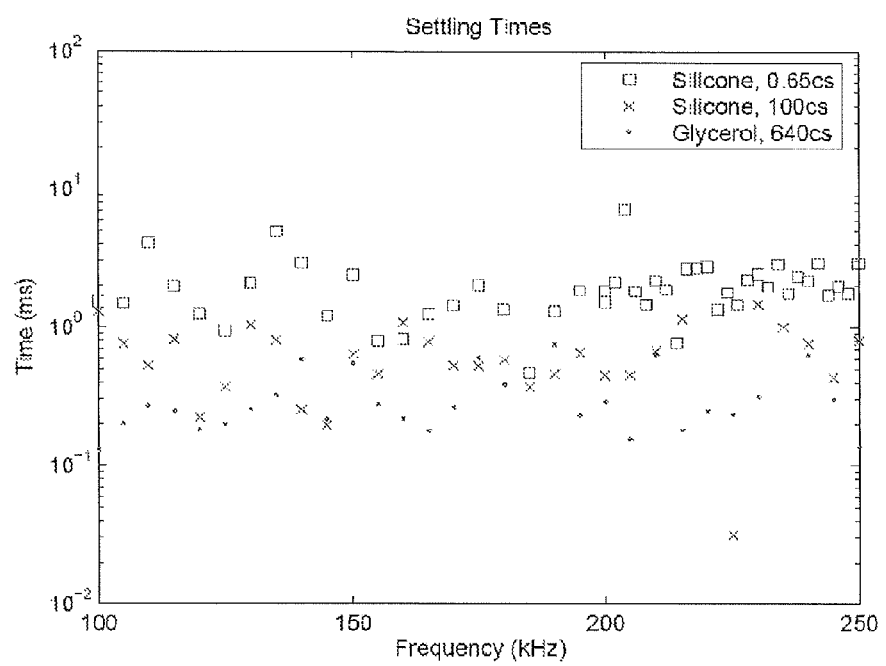
FIG. 41 illustrates three plots with differing viscosities of switching speed with respect to the driving frequency.

The steady state time is expected to be dependent on the viscosity of the fluid and the driving frequency. The data in FIG. 41 show a modest dependence on driving frequency that is within the measurement noise. A higher viscosity fluid damps out transients and reaches steady state more quickly as shown in the figure. The average time constant is 2.1 ms, 650 µs, and 320 µs for 0.65 cS silicone oil, 100 cS silicone oil, and glycerol respectively. The images of FIG. 39. showing silicone oil at 0.65 cS agree with the decay time measured in this manner. Therefore one can expect switching rates of 1/decay time or 500-3000 Hz.

V. Dynamic Focusing and Imaging

In another of its aspects, the present invention provides a TAG lens 100, 300 and method for a rapidly changing the focal length. The TAG lens 100, 300 is capable of tuning the focal length of converging or diverging beams by using an aperture to isolate portions of the index profile and synchronizing the TAG lens 100, 300 with either a pulsed illumination source, or a pulsed imaging device (camera).

The experimental setup is similar to that described earlier in FIG. 29. In this experiment, a pulsed UV laser 560 is used at 355 nm with 15 ns pulse durations and a maximum of 250 kHz repetition rate to illuminate an object of interest 510, FIG. 35. In order to improve imaging and reduce interference, a diffuser or scattering plate, SP, is used. The light may be directed using a mirror 512 and beam splitter 514 through the object of interest 510 which for this example is a US Air Force calibration standard (USAF 1951) that is located at a position, d, away from the entrance to the TAG lens 300. An aperture 520, or iris, with approximately 1.5 mm interior diameter, is co-axially located on either the input or output side of the TAG lens 300 to restrict optical access to the portion of the TAG lens 300 at which the desired index of refraction is located (cf. FIGS. 21A, 21B, 34 showing refractive index versus lens radius). Finally a lens, L1, may be disposed in the output path of the TAG lens 300 after the aperture 520 to produce an image at an image plane 530 where a detector 540, e.g. CCD camera, is located to record the image. The filling materials, details of the electronic circuitry, and the typical driving frequencies for the TAG lens 300 are given in paragraph [00204] above.

In order to successfully use the TAG lens 300 as a dynamic focusing and imaging device, it is necessary to synchronize the incident laser pulse (or camera shutter) to trigger at the appropriate temporal phase location of the TAG lens driving signal. This is accomplished and described in detail in paragraph [00205] by using a pulse delay generator that is triggered from the RF signal driving the TAG lens 300. It is possible to accurately control the exact phase difference between the laser and the TAG driving signals and therefore, the instantaneous state of the index of refraction profile when light is passing through it.

The detailed physics of the lens operation is described earlier in section I and with the driving voltage at 334 kHz and 9.8 $V_{p-p}$. However, in order to understand this implementation of the TAG lens 300, it is instructive to refer to FIG. 21. As can be seen, at a time t=0 (FIG. 21A), the index of refraction profile is at a global maximum in the center of the lens 300 ($\rho$ or $\xi$=0) and at half a period later, t=T/2 (FIG. 21B), the index of refraction is at a global minimum in the center. Based on the sinusoidal temporal dependence of equation for the index of refraction profile Eq. 58, one can easily see that the instantaneous profile will oscillate continuously between this global maximum and global minimum at $\rho$=0. At times in between, the index profile will be either a local maximum or minimum at $\rho$=0.

As noted in FIGS. 21A, 21B, if one were to look at the inflection points in the index profile, one can approximate the index as linear and produce a Bessel beam. However, if instead, one were to look only in the small region near $\rho$=0 this region of the index profile is more accurately represented as a parabolic function. This result can be seen by taking a Taylor expansion of a Bessel function about $\rho$=0 and keeping the lowest order term in $\rho$ which for a Bessel function is $\rho^2$. Therefore, if one were to use an aperture to filter out the region of the lens 300 that is not within this parabolic region, one is left with an index of refraction profile that resembles a simple converging (or diverging) lens 300 with a focal length given by the amplitude and width of this region.

What is notable about this interpretation of the TAG lens index of refraction profile is that since the curvature, and therefore the effective focal length, depends on the instantaneous amplitude and driving frequency of the acoustic wave within the lens 300, the effective focal length will change continuously in time. Thus in the same manner that one can synchronize individual patterns of the TAG lens 300, one can synchronize the light source, e.g. laser 560, or imaging device to select any focal length that is needed subject to the limitations of the driving signal. For example, synchronizing the light source to the pattern in FIG. 21A would give the shortest converging focal length while synchronizing to the pattern in FIG. 21B would give the shortest diverging (negative) focal length.

Figure 35:
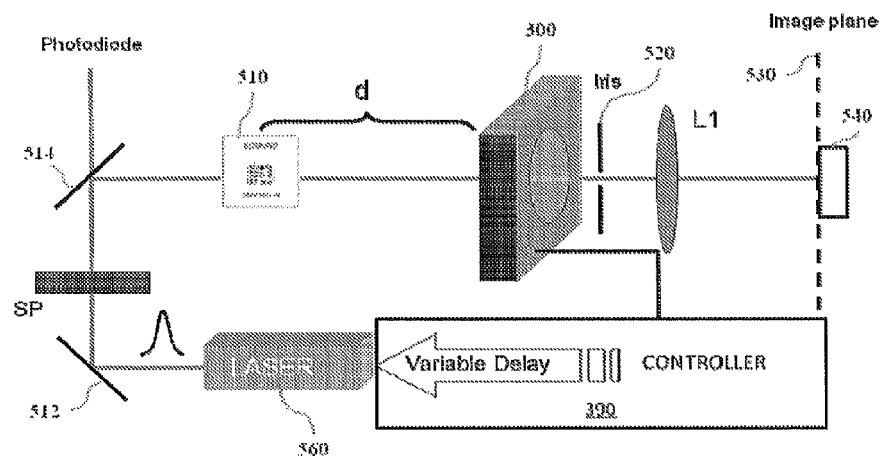
FIG. 35 schematically illustrates an experimental setup of a TAG system in accordance with the present invention for dynamic focusing and imaging of an object of interest.
Figure 36:
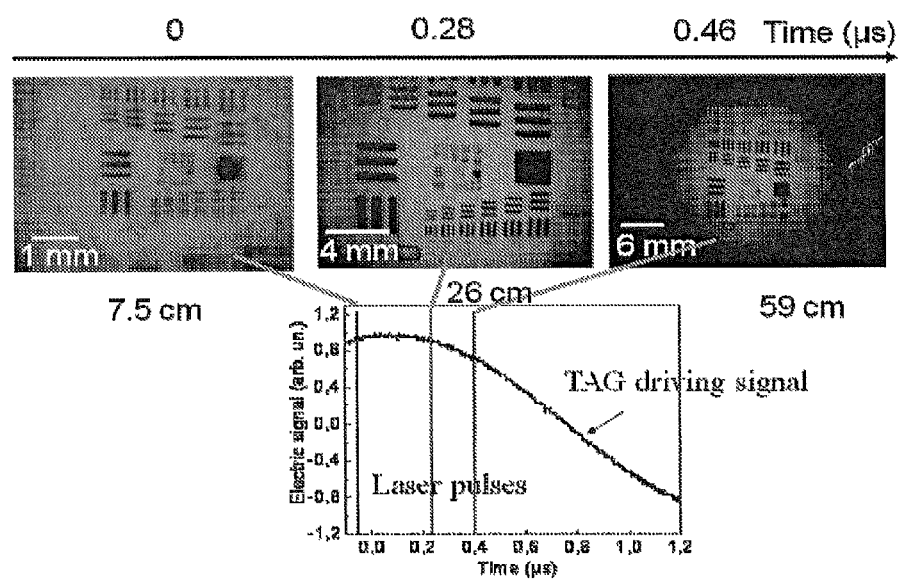
FIG. 36 illustrates images of the object of interest at three object locations as a function of TAG driving signal and laser pulse timing for the TAG system of FIG. 35.

In order to demonstrate this point, the described apparatus of FIG. 35 has been used to image a calibration standard 510 at various locations along the optical path. FIG. 36 shows three images of the resolution standard 510 located at positions, d=7.5, 26, and 59 cm, from the entrance to the TAG lens 300. As can be seen from the images, at each location, it is possible to accurately generate an image at the image plane 350 with the CCD array of the camera is located, without changing the position of the lens 300 relative to the image plane 530. Each of the three images in FIG. 35 is taken with a different temporal phase delay between the TAG and the light source, as illustrated in the graph of FIG. 36 showing the laser pulse timing against TAG driving signal. This result indicates that it is possible to synchronize the lens 300 so that an object 510 located an arbitrary distance away can be imaged.

In carefully looking at the images in FIG. 36, one notices that not only are the images brought into focus at the different locations, but that the magnification of the image changes as a function of the position along the optical axis as-would be expected. Such an effect is consistent with the fact that the focal length of a single lens 300 is being changed and is a benefit for those desiring not only the ability to image an object 510 at an arbitrary distance, but also to change the size of the image. However, one can remove the change in magnification with the appropriate combination of standard optical elements and additional, synchronized TAG lenses in the optical path, if desired.

The speed at which one can move between the different object locations is exceedingly fast compared to any other adaptive optical element since one only needs to change the phase difference between the TAG lens 300 and laser driving signal. Therefore, times that are mere fractions of the oscillation period can accommodate large changes in the location of the object plane. For instance, in FIG. 21A, the amount of time needed to switch between the first image at d=0 and the other two images is 0.28 and 0.48 microseconds, respectively. A more complete discussion on the switching time is presented in section IV above.

Figure 37:
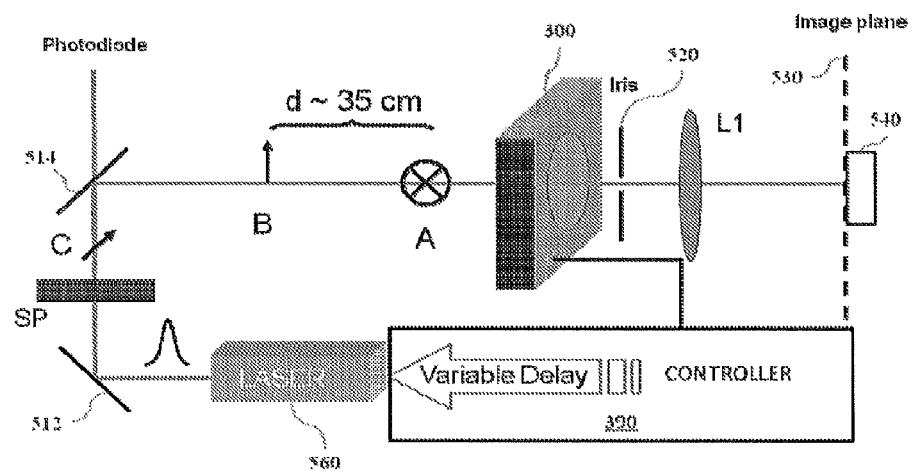
FIG. 37 schematically illustrates another experimental setup of a TAG system in accordance with the present invention for dynamic focusing and imaging of an object of interest.

In addition to being able to move an object and image it at a different location, it is possible to rapidly switch between existing objects located at different places on the optical axis. In FIG. 37, an experimental setup similar to that of FIG. 35 is shown, but instead of a calibration standard 510, there is a series of wires A, B, C positioned at different locations in front of the TAG lens 300 with different offset angles to render each wire A, B, C identifiable in the image plane 530. In this setup, the lens 300 can be synchronized with the laser pulse to bring any one of the three wires A, B, C, into focus on the image plane 530 without the need to remove the other two non-imaged wires. This also indicates that the apertured TAG lens 300 is not just acting as a pinhole camera because only one wire A, B, C is in focus in any given image.

Figure 38A:
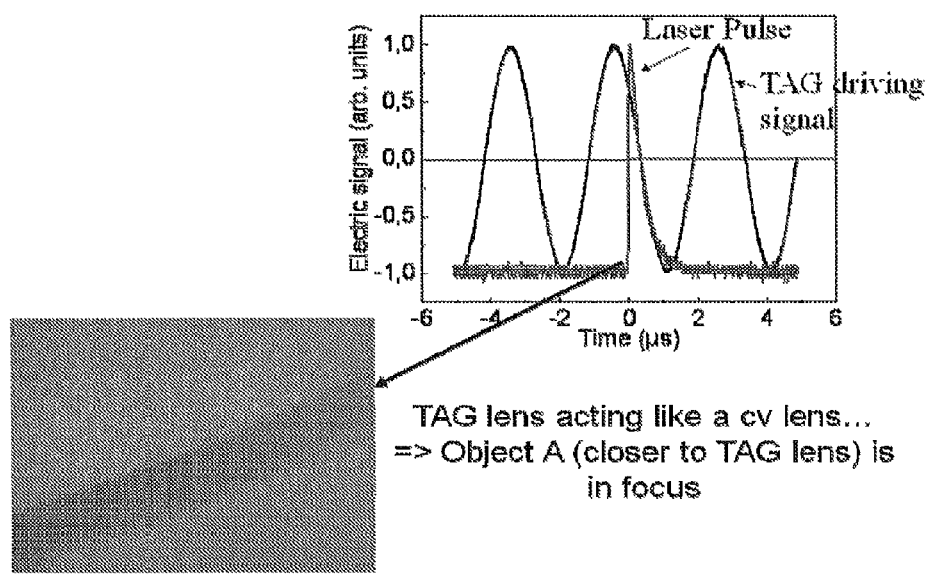
FIGS. 38A-38C illustrate images of the object of interest at three object locations, respectively, as a function of TAG driving signal and laser pulse timing for the TAG system of FIG. 37.
Figure 38B:
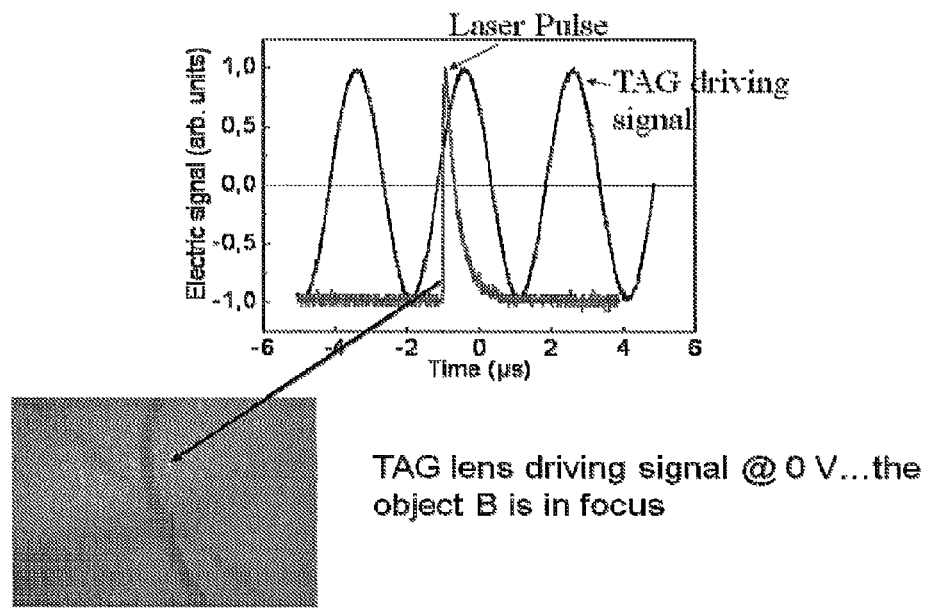
Figure 38C:
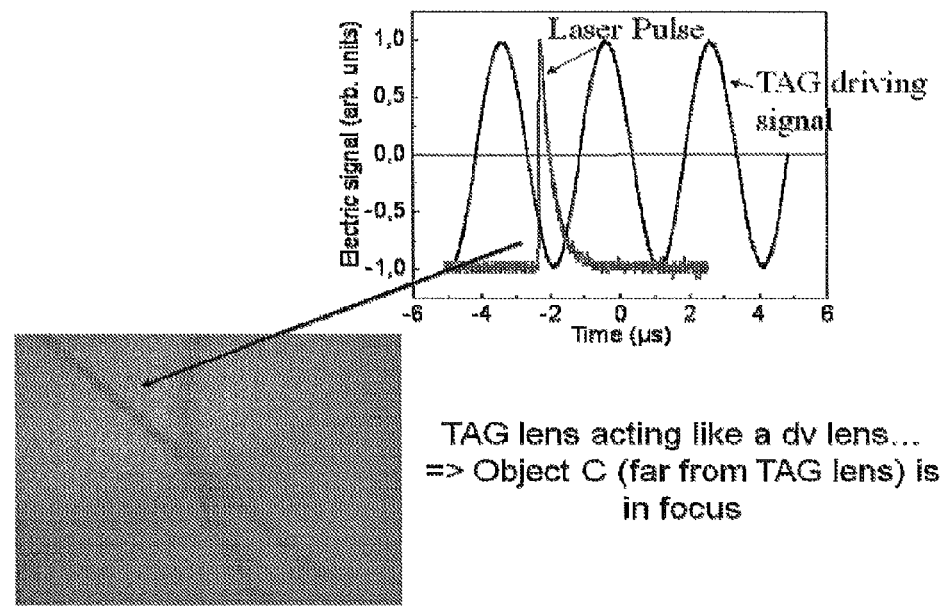

The other notable aspect of this experiment is that the TAG lens 300 can be synchronized to be either a converging or diverging lens 300 depending upon the phase difference. In the experimental setup with the three wires A, B, C, the focal length of the lens L1 and the distances on the optical axis are configured so that it is necessary for the TAG lens 300 to be either converging, diverging, or planar in order to bring one of the wires A, B, C into focus. As can be seen from the image in FIG. 38A, when the laser 560 is synchronized so that it illuminates the TAG lens 300 while the instantaneous index of refraction shows negative curvature, a converging lens 300 is encountered and the wire A closest to the lens 300 is brought into focus. When the laser is synchronized to pass through the TAG lens 300 when the index function has zero amplitude, the TAG lens 300 acts as a flat plate and therefore does not disrupt the wavefront curvature. Thus, the middle wire B is in focus by operation of the lens L1 alone, FIG. 38B. Finally, when the synchronization is done such that the instantaneous index of refraction exhibits positive curvature and the laser pulse passes through the lens 300, it behaves as a diverging lens 300 and the furthest wire C is brought into focus, FIG. 38C. Thus, ability to dynamically position the focal position of a converging or diverging TAG lens 300, or to rapidly change the location of and magnification in an image plane, enables fundamentally new methods of imaging with great potential in the fields of industrial controls, homeland security, biological imaging and many other important areas.

VI. Tunable Axicon Lens

The present invention may additionally include a tunable axicon lens. The tunable axicon lens may comprise the tunable acoustic gradient index of refraction optical system discussed hereinthroughout. Such a system may include a tunable acoustic gradient index of refraction lens, at least one of a source of electromagnetic radiation and a detector of electromagnetic radiation, and a controller in electrical communication with the tunable acoustic gradient index of refraction lens and at least one of the source and the detector. The controller may provide a driving signal to control the index of refraction of the lens, and a synchronizing signal to time at least one of the emission from the source or the detection by the detector relative to the electrical signal controlling the lens to a time when a desired refractive index distribution is present within the lens.

A tunable axicon lens is herein defined to include at least a specialized lens that provides the optical equivalent of a conical surface. The axicon may image a point source into a line along the optic axis, and/or transform a laser beam into a ring. An axicon may be used, for example, to turn a Gaussian beam to approximate a Bessel beam, with greatly reduced diffraction. The tunable axicon of the present invention may allow for a polarizing device for converting a circularly polarized light beam into a radial polarized light beam. For example, the circularly polarized light beam may be obtained by passing a linearly polarized light beam oscillated from a laser Oscillator through a quarter-wave plate.

More particularly, the present invention may provide a tunable axicon that provides multiple advantages over a fixed axicon. For example, a tunable axicon in accordance with the present invention may be tuned to any "axicon angle equivalent" that is optimal for a particular application.

By way of non-limiting example, an optical device wafer may be cut along its "streets" into a plurality of optical devices, such as light emitting diodes (LEDs) or laser diodes (LDs), which are widely used for electrical equipment. A technique for dividing such a wafer along the streets includes applying a laser beam along the streets. The wafer may be formed of silicon, sapphire, or silicon carbide, for example, and a laser beam having a wavelength suitable to cut the particular wafer material may be selected. By way of example, the linearly polarized light beam oscillated from a laser oscillator may be converted into a circularly polarized light beam by a quarter-wave plate, so as to improve the wafer processing capabilities by the laser beam. The circularly polarized light beam may then be converted into a radial polarized light beam superior in focusing characteristics by a polarizing device.

Such a polarizing device for converting the circularly polarized light beam into a radial polarized light beam may be preferably be tunably configured, such as in order to account for the various wafer types referenced above. Further, the present invention may provide a polarizing device which can convert a circularly polarized light beam into a radial polarized light beam having a circular cross section. This allows for the providing of a laser unit using this polarizing device.

In accordance with another aspect of the present invention, there is provided a laser unit that may include, for example, a laser oscillator; a quarter-wave plate for converting a linearly polarized light beam oscillated from the laser oscillator into a circularly polarized light beam; and a polarizing device for converting the circularly polarized light beam obtained by the quarter-wave plate into a radial polarized light beam. The polarizing device may include or be in addition to the tunable axicon lens as discussed herein.

The laser unit may further include a half-wave plate provided downstream of the polarizing device in the propagation direction of light, the half-wave plate being rotatable between a first position where the radial polarized light beam obtained by the polarizing device is passed, and a second position where the radial polarized light beam is converted into an azimuthal polarized light beam.

The polarizing device according to the present invention may thus be tunable in accordance with the discussion herein. Accordingly, the radial polarized light beam converted from the circularly polarized light beam by the polarizing device may have a circular cross section or a polygonal cross section.

Figure 45:
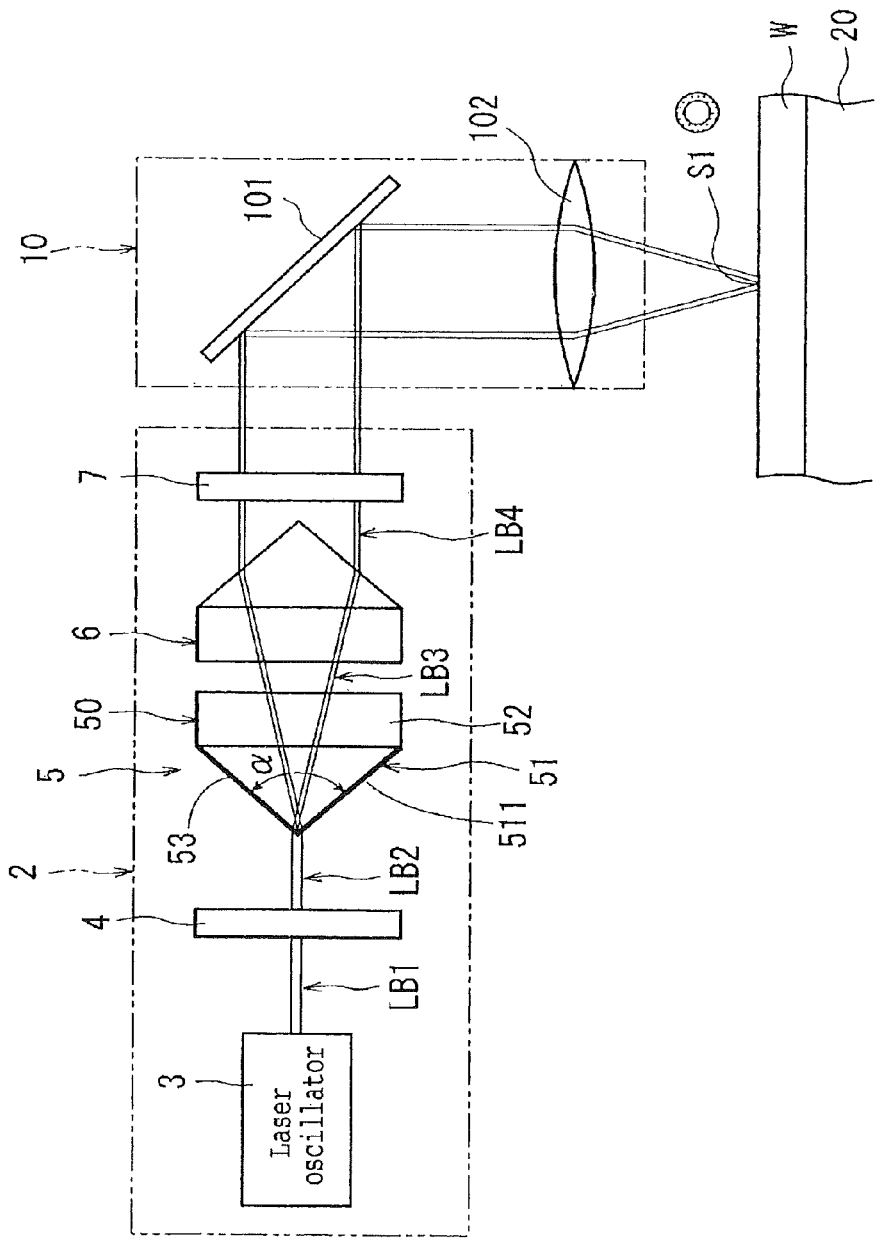
FIG. 45 is a schematic diagram showing the configuration of a laser processing apparatus including a laser unit using a polarizing device according to a first preferred embodiment of the present invention.

An exemplary embodiment of the present invention will now be described in detail with reference to FIG. 45. FIG. 45 shows a laser processing apparatus including a laser unit 2 using a tunable polarizing device 5 according to a first preferred embodiment of the present invention. The laser processing apparatus shown in FIG. 45 is composed of the laser unit 2 and a focusing apparatus 10 for focusing a laser beam applied from the laser unit 2 onto a workpiece W.

The laser unit 2 shown in FIG. 45 may also include a laser oscillator 3, a quarter-wave plate 4, the polarizing device 5 a tunable axicon lens 6 included with or in addition to polarizing device 5, and a half-wave plate 7 arranged in series in this order in the propagation direction of light The laser oscillator 3 oscillates a linearly polarized light beam LB1. The quarter-wave plate 4 converts the linearly polarized light beam LB1 oscillated from the laser oscillator 3 into a circularly polarized light beam LB2. More particularly, the polarizing device 5 converts the circularly polarized light beam LB2 obtained by the quarter-wave plate 4 into a radial polarized light beam LB3. The polarizing device 5 includes the tunable axicon lens.

The tunable axicon lens 6 may convert the divergent radial polarized light beam LB3 into a parallel (cylindrical) radial polarized light beam LB4. The half-wave plate 7 is rotatable between a first position where the radial polarized light beam LB4 obtained by the axicon lens 6 is passed without being changed, and a second position where the radial polarized light beam LB4 is converted into an azimuthal polarized light beam, wherein the second position is 90 degrees shifted from the first position. Thus, the radial polarized light beam LB4 or the azimuthal polarized light beam obtained by the half-wave plate 7 is applied toward the focusing apparatus or condenser 10.

VII. Asynchronous Lensing

The controller discussed hereinthroughout may also be configured to provide asynchronous or non-synchronous timing for at least one of the emission of electromagnetic radiation from the source or the detection of electromagnetic radiation by the detector relative to the electrical signal controlling the lens. In so doing, the controller may specify that the source irradiates the lens (or the detector detects the lens output) asynchronously or non-synchronously. In this regard, the source may include a shutter electrically connected to the controller (or detector) for receiving the asynchronous or non-synchronous timing of the emission of radiation from the source (or detector).

By way of non-limiting example, the present invention may thus provide developing camera system to image fast moving objects. Thereby, a high-speed gated camera may be provided using the TAG Lens, if the camera exposure time is suitably short in duration.

VIII. Microscopy Lensing

Figure 46:
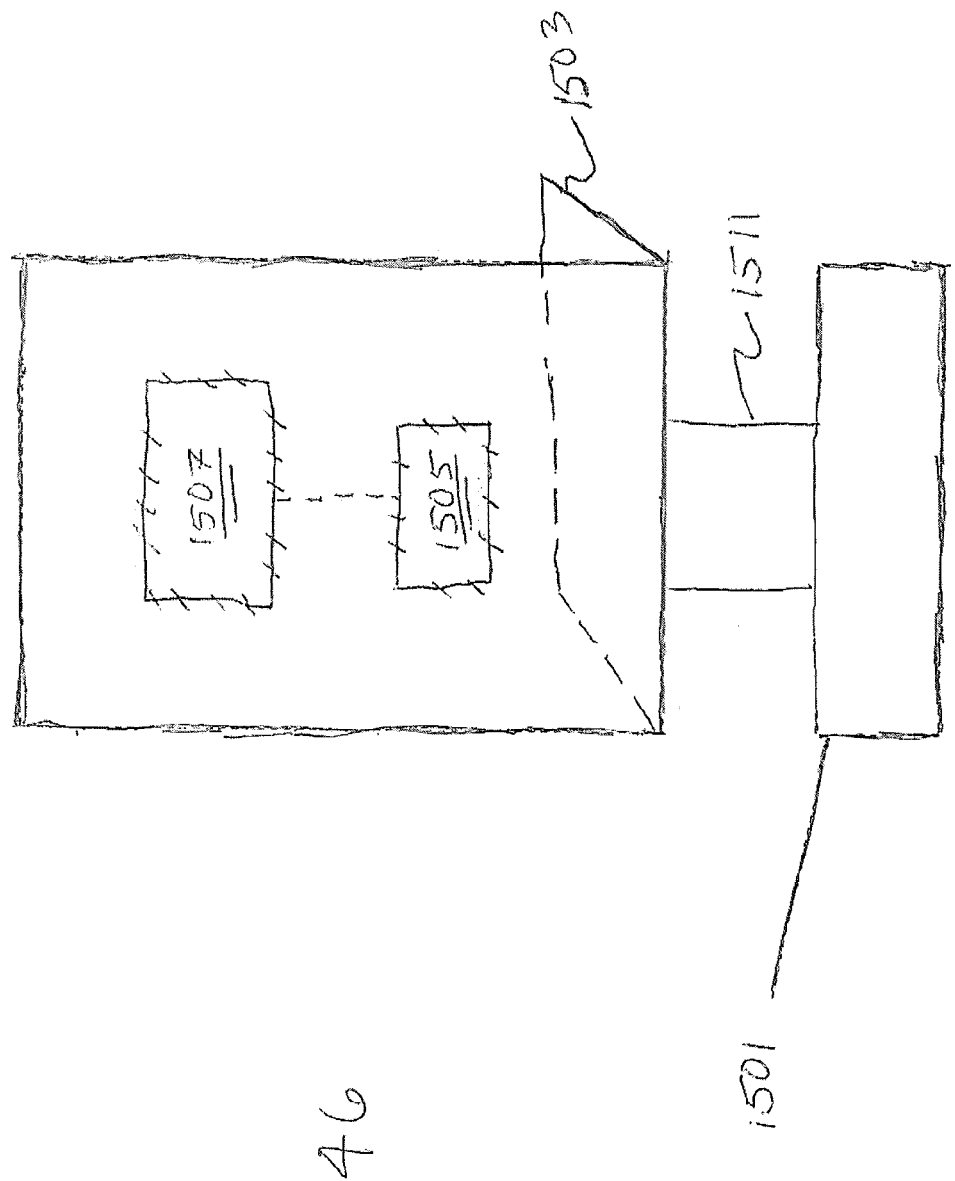
FIG. 46 illustrates an exemplary microscopy embodiment of the present invention.

In an additional specific exemplary embodiment, the lens provided by the instant invention may be used to provide a microscoping lens. For example, FIG. 46 illustrates the presence of the lens, and its exemplary and alternative embodiment, as discussed hereinthroughout to provide lensing for microscopy. Because it is assumed that one skilled in the art will have an understanding of the principles of microscopy, a detailed explanation of such principles is not provided herein. Nevertheless, selected principles necessary for an understanding of this exemplary embodiment are provided below, although these select principles are in no way limiting with respect to microscopy embodiments of the present invention.

As shown in FIG. 46, a typical microscope includes a viewing point 1501, such as an eyepiece, a stage 1503, such as a microscope base surface, and a TAG lens 1505 to magnify an image of the item on the stage and to direct, directly or obliquely, the magnified image to the viewing point. As will be understood in light of the discussion herein, the lens of the present invention, when used in a microscopy system, may provide a single stage lens, such as with a desired level of magnification, such as 100×, or a compound lens, such as in multi-stage lens embodiments discussed hereinabove with respect to FIGS. 1B and 1C. In prior art embodiments, a compound microscope typically required two lenses for the greater magnification: an ocular, or viewing point, lens into which the viewer looks; an objective, or item-proximate, lens that is closest to the object to be viewed. Those skilled in the art will thus appreciate the improved efficiency provided by a compound lens in accordance with the present invention.

Likewise, a typical microscope may include objective lenses (not shown), such as 3 or 4 objective lenses, such as to provide additional optical powers to the aforementioned single stage or compound lens. Additionally, a condenser lens may be provided to focus light onto the item. Condenser lenses are generally most useful at the highest powers. These lenses, too, may be replaced by the lens of the present invention, and/or these lenses may be used in microscopy embodiments in conjunction with the lens of the present invention.

FIG. 46 additionally illustrates an optional camera and/or control electronics 1507, which may be provided for electronically control/tuning of the instant lens, and/or to record, photograph, or the like the performed microscopy. Likewise illustrated is a tube 1511, or mount, which is typically provided in microscopy to at least partially optically connect the stage field to the lens and the viewing point. Further shown is an illuminator, which provides a light source to illuminate the stage, and to thereby allow for the providing of the image to the lens 1505.

In a preferred embodiment, the light source may be coherent or incoherent and is pulsed synchronously with the frequency at which the lens 1505 disclosed herein is operated. Further, the light source pulse is of a predetermined duration. The synchronous nature of the illuminating pulse allows light to arrive at the wavefront of the lens 1505 at the same or very substantially the same time as the lensing function occurs, thereby generating a fixed focal length and magnification in accordance with predetermined parameters.

Additionally, the aforementioned pulse duration determines the sharpness of the image in the depth, or "Z," axis. That is, a long pulse duration yields a high depth of field, and a shorter pulse duration yields a lesser depth of field, i.e., a smaller portion of the information along the Z axis. Thereby, lens focus may be changed by changing when the pulse is triggered, i.e., by adding a delay, or by changing the amplitude of the driving signal of the lens 1505. More particularly, in the first case the added delay changes the focus at which the light hits the lens; and in the second case the modified amplitude of the driving signal of the lens changes the generated wavefront, thus ch changing the focal point.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

What is claimed is:

1. A microscope, comprising:
    a stage onto which is placed an item;
    a tunable acoustic gradient index of refraction (TAG) lens sufficiently proximate to said stage to magnify an image of the item;
    a viewing point for viewing of the magnified image; and
    an pulsed illuminator capable of illuminating said stage and synchronously pulsed with an operating frequency of said TAG lens.

2. The microscope of claim 1, wherein the tunable acoustic gradient index of refraction lens comprises:
    a casing having a cavity disposed therein for containing a refractive fluid capable of changing its refractive index in response to application of an acoustic wave;

at least one compressible component disposed in the cavity for modifying the change in the refractive index of the refractive fluid.

3. The microscope of claim 2, wherein the tunable acoustic gradient index of refraction lens comprises a device for providing modified performance of the lens responsive to pressure changes in the casing, the device comprising:
- a closed, sealed cavity;
- a fluid in said cavity for providing the modified performance responsive to the pressure changes; and
- a relief bubble comprised of air, wherein said relief bubble at least buffers the pressure changes in relation to the closed, sealed cavity.

* * * * *